(12) United States Patent
Chandler, Jr. et al.

(10) Patent No.: US 10,494,267 B1
(45) Date of Patent: Dec. 3, 2019

(54) VALVE CONTROL APPARATUS

(71) Applicant: Chandler Systems, Inc., Ashland, OH (US)

(72) Inventors: William D. Chandler, Jr., Ashland, OH (US); Aaron R. Wolfe, Ashland, OH (US); Cody A. Harbaugh, Ashland, OH (US)

(73) Assignee: CHANDLER SYSTEMS, INC., Ashland, OH (US)

(*) Notice: Subject to any disclaimer, the term of this patent is extended or adjusted under 35 U.S.C. 154(b) by 0 days.

(21) Appl. No.: 15/973,879

(22) Filed: May 8, 2018

Related U.S. Application Data

(63) Continuation of application No. 15/590,733, filed on May 9, 2017, now Pat. No. 10,011,500, which is a continuation-in-part of application No. 15/261,442, filed on Sep. 9, 2016, now Pat. No. 9,970,558, and a continuation-in-part of application No. 14/882,613, (Continued)

(51) Int. Cl.

| C02F 1/42 | (2006.01) |
|---|---|
| C02F 1/00 | (2006.01) |
| C02F 1/32 | (2006.01) |
| C02F 1/78 | (2006.01) |
| F16K 31/04 | (2006.01) |
| F16K 11/07 | (2006.01) |
| C02F 103/00 | (2006.01) |

(52) U.S. Cl.
CPC .............. *C02F 1/008* (2013.01); *C02F 1/004* (2013.01); *C02F 1/325* (2013.01); *C02F 1/78* (2013.01); *F16K 11/0716* (2013.01); *F16K 31/04* (2013.01); *C02F 2103/002* (2013.01); *C02F 2201/005* (2013.01); *C02F 2209/008* (2013.01); *C02F 2209/02* (2013.01); *C02F 2209/03* (2013.01); *C02F 2209/05* (2013.01); *C02F 2209/40* (2013.01); *C02F 2303/16* (2013.01)

(58) Field of Classification Search
CPC .... F16K 11/0716; B01D 24/383; B01J 4/007; B01J 4/008
USPC .................................................. 210/190, 191
See application file for complete search history.

(56) References Cited

U.S. PATENT DOCUMENTS

| 4,374,025 A * | 2/1983 | Loke ........................ C02F 1/42 |
| | | 210/140 |
| 4,919,314 A * | 4/1990 | Nishiyama ................ C02F 1/42 |
| | | 137/624.13 |

(Continued)

*Primary Examiner* — Marina A Tietjen
*Assistant Examiner* — Paul J Gray
(74) *Attorney, Agent, or Firm* — Ralph E. Jocke; Walker & Jocke

(57) ABSTRACT

A control valve (10) includes a valve body with a plurality of ports (A, B, C, D, E, F) and a plurality of annular flow passages (53, 55, 57). A piston (34) which includes a plurality of annular flow passages and a longitudinal flow passage is selectively movable within a bore (32) within the valve body through operation of a valve controller (70). The valve controller is selectively operative to control the position of the piston so as to enable liquid flow through a plurality of flow paths. The valve controller further includes a installable and removable valve controller housing (74) which is releasably engageable with a valve base (72). The valve may include a changeable piston and changeable injector and plug components to adapt the valve to different flow and fluid mixing requirements.

20 Claims, 36 Drawing Sheets

Related U.S. Application Data filed on Oct. 14, 2015, now Pat. No. 9,714,715, and a continuation-in-part of application No. 14/698,399, filed on Apr. 28, 2015, now abandoned, and a continuation-in-part of application No. 14/698,381, filed on Apr. 28, 2015, now abandoned, said application No. 15/261,442 is a continuation of application No. 14/882,613, which is a continuation-in-part of application No. 14/698,381, and a continuation-in-part of application No. 14/024,918, filed on Sep. 12, 2013, now abandoned, said application No. 14/698,399 is a continuation-in-part of application No. 14/024,918, filed on Sep. 12, 2013, now abandoned, which is a continuation-in-part of application No. 13/492,354, filed on Jun. 8, 2012, now Pat. No. 8,535,540.

(60) Provisional application No. 62/119,507, filed on Feb. 23, 2015, provisional application No. 62/069,897, filed on Oct. 29, 2014, provisional application No. 61/986,423, filed on Apr. 30, 2014, provisional application No. 61/607,343, filed on Mar. 6, 2012, provisional application No. 61/513,450, filed on Jul. 29, 2011, provisional application No. 61/494,449, filed on Jun. 8, 2011.

(56) References Cited

U.S. PATENT DOCUMENTS

| | | | | |
|---|---|---|---|---|
| 5,096,596 | A * | 3/1992 | Hellenbrand | C02F 1/004 210/721 |
| 5,919,373 | A * | 7/1999 | Naaktgeboren | C02F 1/74 210/109 |
| 6,383,389 | B1 * | 5/2002 | Pilgram | C02F 3/006 210/110 |
| 6,402,944 | B1 * | 6/2002 | Vaughan | C02F 1/42 137/597 |
| 6,596,159 | B1 * | 7/2003 | Maruyama | B01J 49/85 137/624.11 |
| 6,696,963 | B2 * | 2/2004 | Zimmerman | C02F 1/42 210/89 |
| 7,718,054 | B2 * | 5/2010 | Duplessis | C02F 1/008 210/103 |
| 2005/0247634 | A1 * | 11/2005 | Petty | C02F 1/008 210/673 |
| 2010/0200522 | A1 * | 8/2010 | Tischendorf | C02F 1/001 210/798 |

* cited by examiner

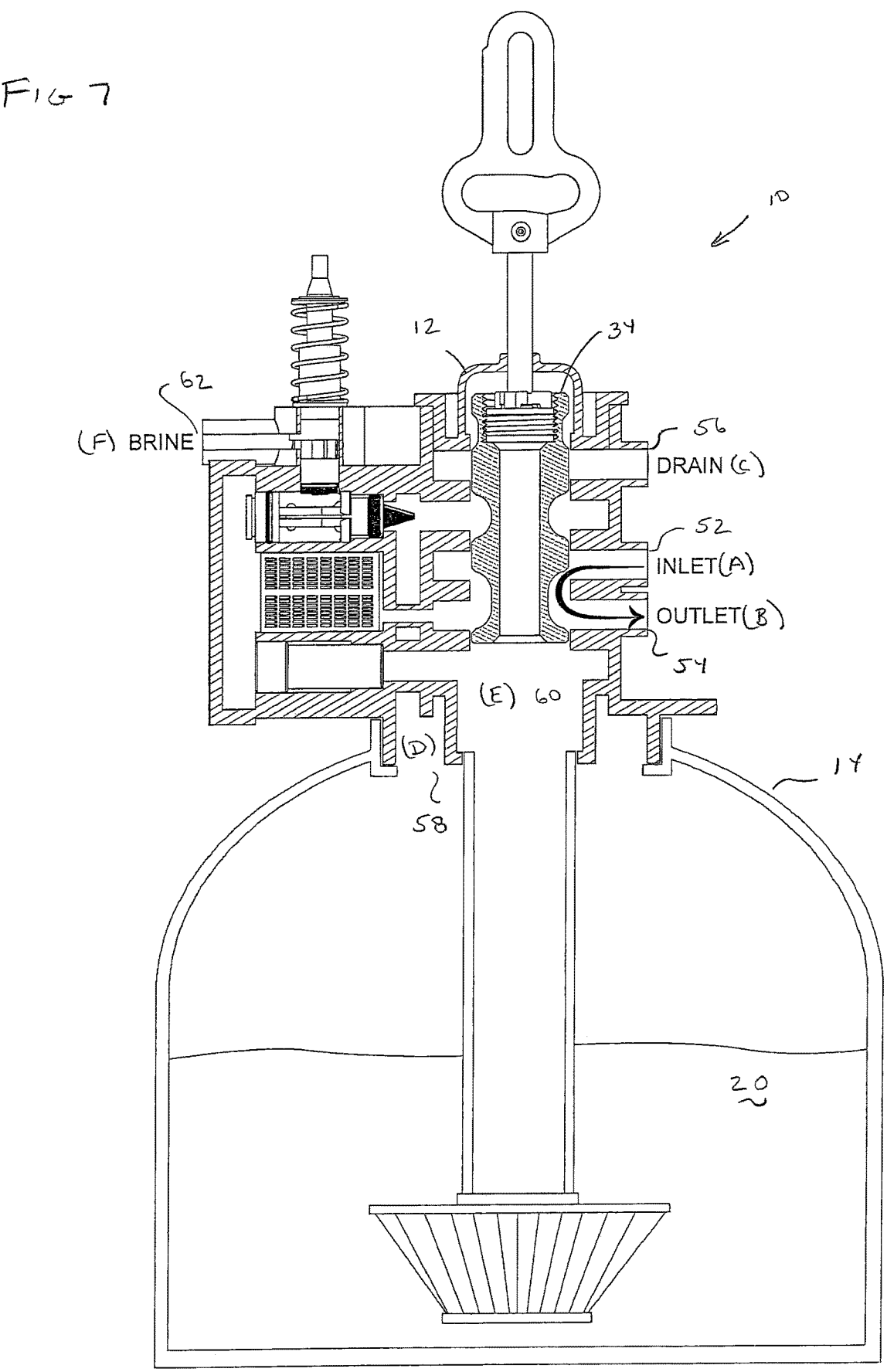

VALVE CONTROL APPARATUS

TECHNICAL FIELD

This invention relates to piston valves with annular passages which may be classified in CPC Class F16K 11/0716; US Class 137, Subclass 625.69. Exemplary embodiments relate to valve arrangements that are utilized in connection with devices which require fluid flow through multiple flow paths, for example, systems for water treatment.

BACKGROUND

Valve arrangements for controlling the flow of liquids may have numerous different forms. In situations where the liquid is required to be selectively directed to multiple different flow paths, such arrangements can be complex. Additional complexity may arise when different flow sequences and flow paths are required in connection with different process steps involving a liquid. Further complexity arises when liquids are required to be mixed with other fluids in connection with carrying out process flows.

Valve arrangements may benefit from improvements.

SUMMARY

Exemplary embodiments include a valve arrangement that is capable of selectively directing a liquid to multiple different flow paths. The exemplary embodiment includes a control valve having a valve body. The exemplary valve body includes an elongated longitudinal cylinder bore. The cylinder bore is in fluid communication with a plurality of different liquid ports which include inlet and outlet ports. The ports are in fluid connection with a plurality of respective generally annular passages extending adjacent to the bore within the valve.

A valve element comprising piston is movably positionable longitudinally within the cylinder bore. The exemplary piston includes a profile configuration which includes a plurality of longitudinally disposed annular flow cavities. Selectively positioning the piston longitudinally in the bore through operation of a valve controller causes the different ports of the valve to be placed in fluid communication. The exemplary valve controller is operative to enable the valve to be used in conjunction with other process equipment for purposes of selectively directing the flow of liquid through the equipment in different flow paths during a plurality of process steps. Such process steps may include steps involving mixing of the liquid with other fluids and materials as required. The exemplary valve further includes the capability to selectively shut off liquid flow and to provide bypass flow in order to stop and bypass the flow of liquid from certain process equipment associated with the valve.

Exemplary arrangements specifically relate to a water control valve that is selectively operative to enable the removal of undesirable chemicals from water. The exemplary valve is operative to enable flow conditions to be changed to regenerate a resin material in a tank when necessary to maintain optimal performance of the system in removing undesirable substances. Exemplary arrangements further provide a valve that includes the functionality of an integrated water shutoff valve and a bypass valve. This exemplary valve arrangement eliminates the need for separate valves and piping to accomplish such functions.

Further exemplary arrangements include a readily changed or modified valve controller for operation of the exemplary valve. The exemplary valve controller enables the valve controller to be readily installed, removed and replaced when necessary for maintenance or repair purposes. Further the exemplary arrangement provides a means for readily operatively connecting the valve controller and the valve body so that they may operate together.

Numerous other novel arrangements and features are described in connection with the exemplary embodiments discussed herein.

BRIEF DESCRIPTION OF DRAWINGS

FIG. 7 is a view similar to FIG. 1 which shows the flow of liquid through the treatment tank bypassed through the valve.

DETAILED DESCRIPTION

The exemplary arrangements of the embodiments described herein may be used in conjunction with the components, features, systems and methods described in U.S. patent application Ser. No. 14/698,381 and/or 14,698,399 filed Apr. 28, 2015, the disclosures of each of which are incorporated herein by reference in their entirety.

Figure 1:
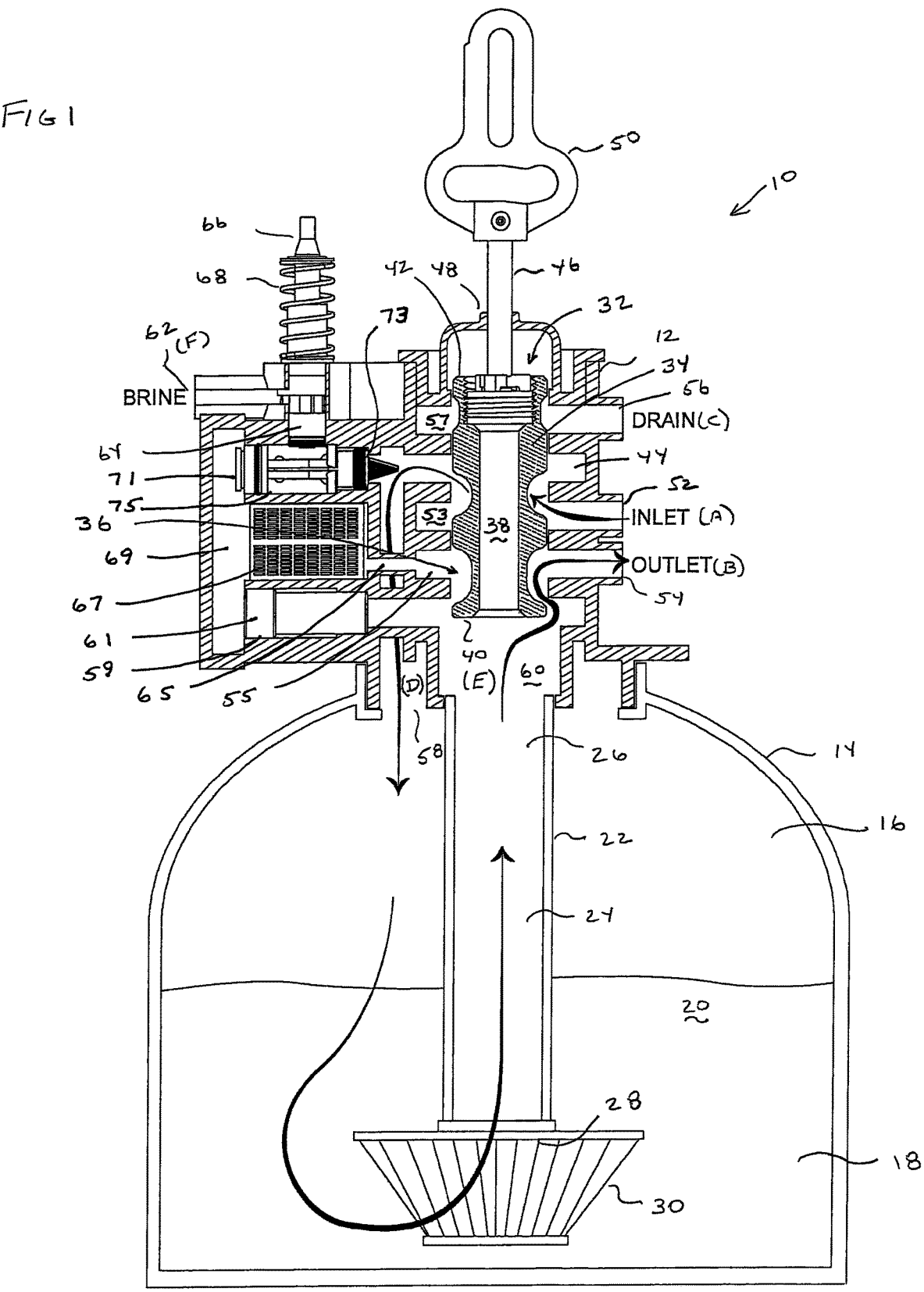
FIG. 1 is a schematic cross-sectional view of an exemplary control valve including a movable piston and a plurality of annular flow passages configured for use in connection with a water treatment tank.

Referring now to the drawings and particularly FIG. 1, it is shown therein an exemplary control valve generally indicated 10. Control valve 10 includes a valve body 12. The valve body 12 is schematically represented and is comprised of one or more parts which function in the manner that is represented schematically in FIGS. 1-8.

The exemplary valve is used in operative connection with a water treatment tank 14. Tank 14 of the exemplary arrangement is a water softener tank that extends generally vertically with the valve 10 positioned at the top thereof via a threaded or other releasable connection. It should be appreciated that the water treatment application is only an exemplary use for the control valve configuration and that the proportions of the tank as shown in the Figures are not necessarily representative of tanks that may be utilized in connection with the control valve described. Rather, in most water treatment arrangements the exemplary valve will be used with a vertically elongated tank which is many times longer than the height of the valve body. Further the exemplary valve may be used in conjunction with other types of processing systems and equipment.

The exemplary water treatment tank includes a top portion 16 and a bottom portion 18. The exemplary tank includes a water treatment material 20 therein. In some exemplary arrangements, the water treatment material 20 comprises resin material that is suitable for ion exchange with mineral laden water that is treated by flowing therethrough. Such resin material may be comprised of plastic beads or zeolite material that has a negative charge. The exemplary operation of the water treatment tank includes capturing ions in water that make the water "hard" such as calcium and magnesium ions and replacing such ions in the water with ions that are not undesirable such as sodium ions. In other embodiments other types of treatment materials other than ion exchange resin materials may be used. These materials may include absorbent materials, filtration materials, catalytic materials, dissolving materials, reacting materials or other types of materials. Of course it should be understood that the types of liquid processing, treatment materials and methods described are exemplary and in other arrangements, other types or additional types of equipment, materials, structures and elements for treating water or other liquids may be used.

In the exemplary arrangement, the tank 14 includes a central tube 22 extending vertically therein. Tube 22 includes an internal tube conduit 24. The exemplary tube conduit extends between a top end 26 of the tube and a bottom end 28 of the tube. The bottom end of the tube is fluidly open to the area of the tank that includes the resin material. The bottom end of the tube is in operative connection with a strainer 30. Strainer 30 operates to prevent the resin from entering the fluid conduit inside the tube.

The exemplary valve body includes at least one valve element that selectively places ports of the valve in fluid communication. An exemplary valve body includes an elongated cylindrical bore 32. The bore 32 is elongated in a longitudinal direction which is the vertical direction as the valve is shown in FIG. 1. The longitudinal direction may alternatively be referred to as an axial direction herein. The bore 32 has a movable piston 34 therein. The piston 34 includes on its outer circumferential surface, a plurality of longitudinally spaced recessed annular flow cavities such as cavity 36. The exemplary piston 34 also includes a longitudinal flow cavity 38. Longitudinal flow cavity 38 extends through the piston from a first longitudinal end 40 to a second longitudinal end 42.

The exemplary valve body further includes a plurality of annular flow cavities 44 for example, that extend in at least partially surrounding relation of the bore 32. Although not shown in the drawings, but as described in the incorporated disclosures, exemplary embodiments include resilient seals that operatively extend between the piston and the walls of the valve body that extend radially inward toward the bore. The resilient seals are operative to prevent fluid flow between the radially outwardly disposed annular surfaces of the piston and the annular radially inward extending walls bounding the flow cavities of the valve body. In exemplary arrangements, the seals are configured to prevent fluid flow other than through flow cavities that are in operative fluid connection through the selective longitudinal positioning of the piston as described herein.

In the exemplary embodiment, the piston 34 is in operative connection with a piston rod 46. The piston rod 46 is operatively connected to the second longitudinal end of the piston. The exemplary piston rod is operatively connected to the piston through a releasable threaded connection as shown. In the exemplary embodiment the threaded connection includes a coupling with fluid openings therethrough that enables the flow of liquid through the longitudinal flow passage. The coupling also enables the piston to be removed and replaced with a piston of a different configuration.

The exemplary piston rod extends through an opening 48 in the valve body. A suitable resilient seal is provided adjacent the opening so as to prevent the escape of liquid from the inside of the valve body around the piston rod. The piston rod is operatively connected at the end outside the valve body to an actuator bracket 50. The actuator bracket 50 is in operative connection with a valve controller of a type later described herein and/or as described in the incorporated disclosures. The valve controller is operative to selectively longitudinally move the actuator bracket and the piston rod so as to selectively position the piston to provide different flow conditions. Of course it should be understood that this valve element configuration is exemplary and that in other embodiments other at least one valve element configurations such as rotating elements, shutter elements or other types of fluid flow directing elements may be used.

The exemplary valve body includes a plurality of ports. The ports include an inlet port 52 which is designated with the letter A for purposes of brevity. The exemplary inlet port is in operative connection with a source of untreated water. In exemplary embodiments, the source of untreated water may be a well, reservoir or other source of water that requires the treatment provided by passing the water through the water treatment material tank. In exemplary arrangements the untreated water is provided at an elevated pressure to the inlet port 52. This is accomplished through the use of a pump, the head of liquid in a tank or reservoir, or other suitable method for providing the water to the inlet port at a positive pressure. As represented schematically in Figures, the inlet port A is in operative fluid connection with an annular flow cavity 53 within the exemplary valve body.

The valve body further includes an outlet port 54. Outlet port 54 which is designated B for purposes of brevity, is configured to be in operative connection with one or more devices that use treated water. For example, the outlet port 54 may be fluidly connected to a piping system within the building in which the water treatment equipment is installed. In such an exemplary system the exemplary outlet port B is in operative connection with treated water use devices such as faucets, showers, hot water tanks, etc. which deliver, store and/or use water that has been treated by having passed through the tank. Of course this application is exemplary. As represented in Figures, the outlet port B is in operative connection with an annular flow cavity 55 within the valve body that is longitudinally disposed from the annular cavity in the valve body that is connected to Port A.

The exemplary valve body further includes a drain port 56. Drain port 56 which is designated C for purposes of brevity is configured in the exemplary system to be in operative connection with a drain which receives waste water. The drain port 56 is in operative connection with an annular flow cavity 57 within the valve body as represented in the Figures. Further it should be understood that although the drain port C is configured to be in connection with a wastewater drain, the water passed from the exemplary drain port may be captured for treatment and recycling or for other suitable purposes.

The exemplary valve body further includes a first tank port 58. The first tank port 58 is labeled D for purposes of brevity herein. In the exemplary arrangement the first tank port D is fluidly connected through the valve to a first area at the top of a tank. This first area is on an upper side of the resin material 20 in the tank. In the exemplary arrangement the first tank port 58 is above the level of the resin material 20 as shown. Of course it should be understood that this arrangement is exemplary and other arrangements of components may be used in connection with other embodiments.

The exemplary valve body further includes a second tank port 60. The second tank port 60 which is labeled E for purposes of brevity, is in operative connection with the tube conduit 24 within the tube 22. The second tank port 60 is in operative fluid connection with the lower area of the tank through an opening at the bottom end 28 of the tube and the strainer 30. The second tank port 60 is in operative fluid connection with the lower side of the resin material.

The exemplary valve body further includes a further port that in the exemplary system is referred to as brine port 62. Brine port 62 which is labeled F for purposes of brevity, is configured for operative connection with a brine tank. The brine tank of exemplary embodiments may provide a slurry of water softener salt and water which produces a brine solution which is utilized for regenerating the resin material in the tank in a manner that is later discussed. The exemplary brine port 62 is in operative connection with a movable valve member 64. The movable valve member 64 is movable within the valve body and depending on the position of the movable valve member, is operative to place the brine port 62 in fluid connection with at least one fluid cavity within the valve body. In the exemplary embodiment a moveable plunger 66 is in operative connection with the at least one movable valve member 64. A spring 68 is in operative connection with the plunger and serves to bias the plunger upwardly from the valve body as shown so as to close the valve member 64. As later explained in detail, the valve controller is operative to selectively move the plunger 66 so as to operatively connect the brine port to flow cavities within the valve for purposes of delivering treated water out of the valve from the brine port and for receiving brine material from the brine tank.

In the exemplary embodiment the valve includes an injector 71. The injector 71 is positioned in a passage 75. The injector further includes a check valve 73. The check valve 73 enables flow from the injector to the flow cavity 44 and prevents flow in the opposite direction. In the exemplary arrangement the injector is removably positionable in the passage 75.

The exemplary valve body further includes a passage 59. In the configuration shown in FIG. 1, the passage 59 is closed by a removable plug 61.

The exemplary valve body further includes a passage 65. Passage 65 is fluidly connected with annular cavity 55. The valve body further includes a chamber 69. Chamber 69 is in fluid communication with passage 65. A screen 67 is positioned fluidly intermediate of the passage 65 and the chamber 69. Chamber 69 is in fluid connection with the injector 71.

The exemplary embodiment of the control valve operates in an exemplary system in a manner similar to that described in greater detail in the incorporated disclosure. A valve controller that is in operative connection and with the actuator bracket moves the bracket along the longitudinal direction which is the vertical direction as shown in FIG. 1 and selectively positions the piston to achieve a plurality of flow conditions along different flow paths through the valve. In an exemplary first condition of the valve represented in FIG. 1, untreated water is received into the valve through the inlet A. Water passes through the valve cavities of the piston and the valve body as represented by the arrows shown in FIG. 1. The untreated water is in fluid connection through the valve with the first tank port D. In this flow condition the check valve 73 prevents flow of untreated water through the injector 71 to cavity 55 and the outlet B. Untreated water flows from the first tank port downward through the top of the tank and into the resin material 20. In some exemplary arrangements the top of the tank may include a gas such as air or oxygen to react with materials dissolved in the incoming water to produce reaction products that can be more readily separated from the water. In the exemplary arrangement the water passing through the resin material undergoes an ion exchange in which calcium, magnesium and other positively charged ions in the water are captured by the resin and replaced in the water with sodium ions which are present in the resin.

In the condition shown in FIG. 1 the water that has been treated by passing downward through the resin passes through the strainer 30 and travels upwardly through the tube conduit 24 to the second tank port E. From this position the now treated water passes through the valve body from the second tank port E to the treated water outlet port B. The treated water is passed from the water outlet B to piping and to the devices which use the treated water.

Figure 2:
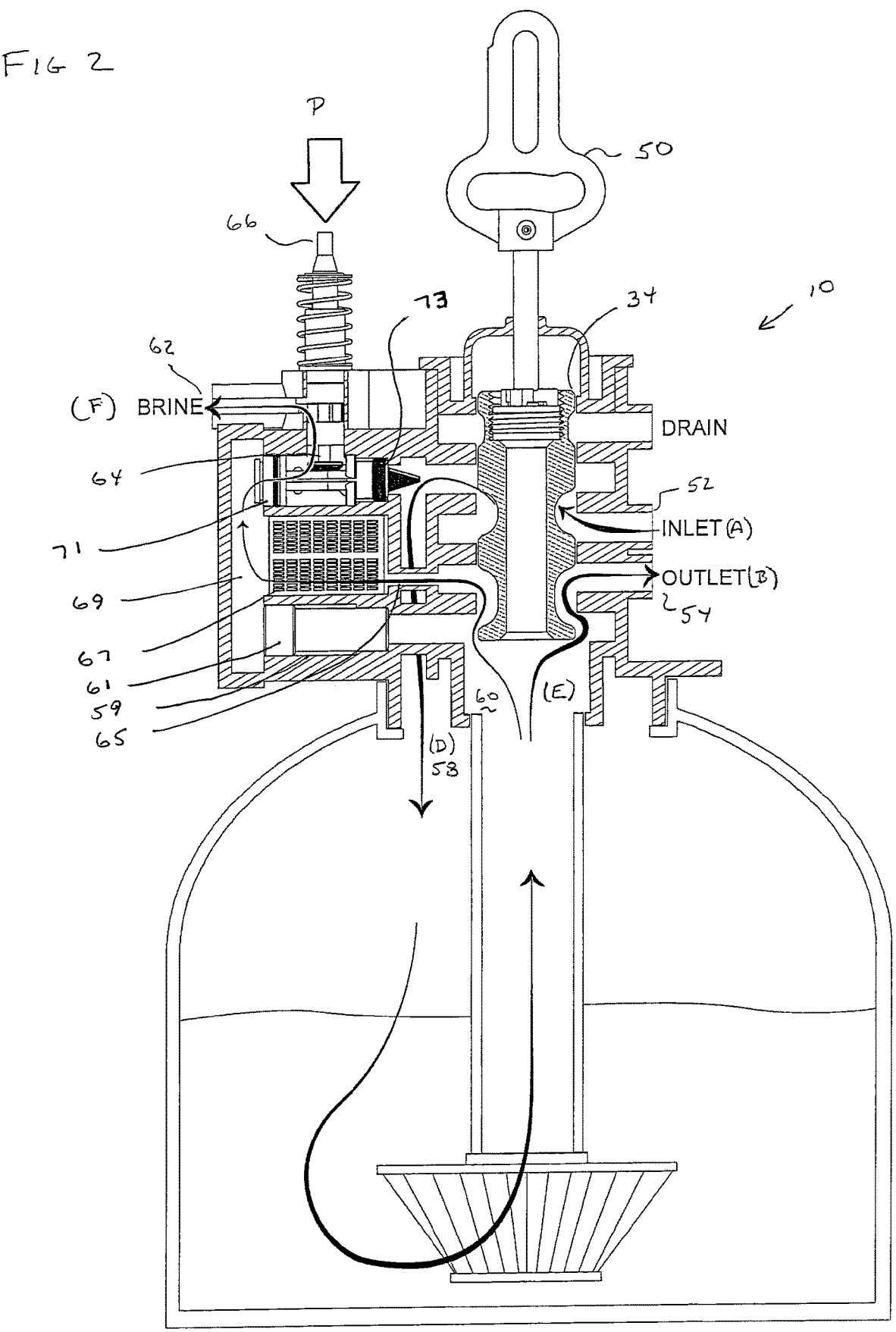
FIG. 2 is a view similar to FIG. 1 which shows the control valve in a different operating condition.

In the exemplary embodiment the valve controller operates the valve to deliver treated water from the brine port F of the valve to the brine tank at selected appropriate times. This is done in the exemplary system so that the brine solution is available for delivery to the valve 10 and the resin material 20 when required. In order to provide available brine, the valve controller is operative to depress plunger 66 downward as represented by arrow P as shown in FIG. 2.

Moving the plunger downward is operative to move the movable valve member 64. Movement of the valve member 64 enables water that has been treated by passing through the resin and received at the second tank port E to be passed out of the valve through the brine port F.

In this valve configuration, the treated water passes through the passage 65, through the screen 67 and into the chamber 69. From the chamber 69 the water flows into the interior of the body of the injector 71 (later described in detail) and to the brine port F past the open valve element 64. It should be noted that the check valve 73 prevents the flow of untreated water into the body of the injector 71. Further, passage 59 which has a configuration similar to the passage which includes the injector body 71, is fluidly blocked by the plug 61 so as to require treated water to flow through the passage 65, the screen 67 and chamber 69 into the injector body.

In the exemplary system treated water is passed out through the brine port for a sufficient time to enable production of suitable brine solution by mixing of the water with water softener salt that has been placed in the brine tank. The production of the brine and the measurement of the salt levels and other features associated with the brine tank are discussed in the incorporated disclosures. As can be appreciated from FIG. 2, with the piston 34 positioned as shown, while treated water is being delivered to the brine tank the exemplary valve continues to deliver treated water from the second tank port E of the tank to the water outlet B.

After a period of operation of the exemplary system, the amount of water that has been treated by passing through the resin material causes the ions in the resin material to change their character to the point that the undesirable calcium and magnesium ions in the untreated water are no longer satisfactorily replaced through the ion exchange with the more desirable sodium ions. When this condition occurs, the resin treatment material can be cleaned and regenerated in the manner discussed in the incorporated disclosures and as described herein, so as to return the resin material to satisfactory performance. In various embodiments the need to regenerate the resin may be determined on a timed basis, on the basis of the amount of water that has passed through the tank, or based upon sensing the properties of the treated water that has been delivered from the outlet B through suitable electronic sensors. As can be appreciated, in exemplary systems while the resin in the water softener is being regenerated, treated water may be supplied to the devices and systems that use treated water from a storage tank holding a supply of treated water or by treating the water with another water treatment device.

Figure 3:
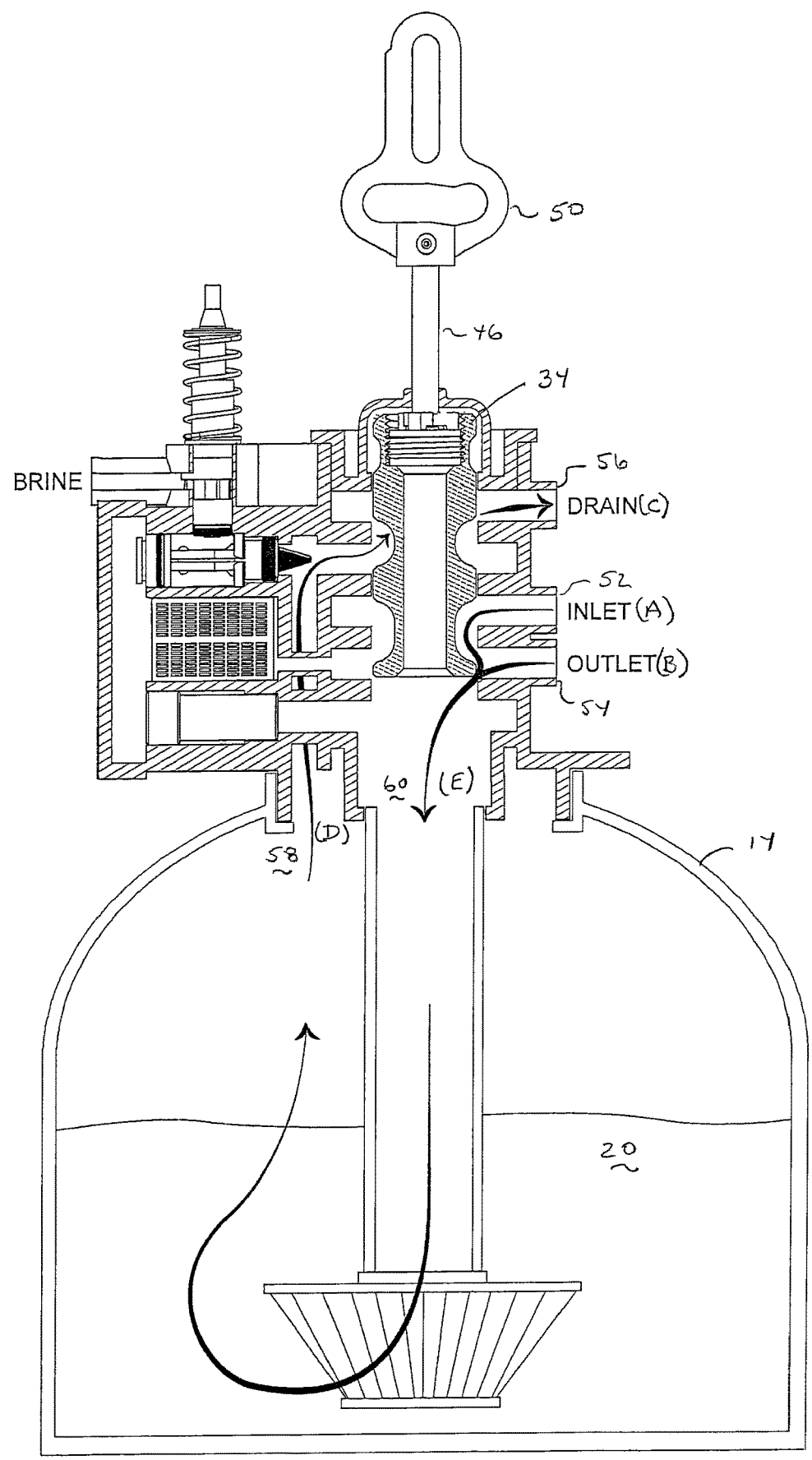
FIG. 3 is a view similar to FIG. 1 which shows the control valve in yet another operating condition.

Operation of the exemplary valve in a first step in a treatment media regeneration process is represented in FIG. 3. As shown in FIG. 3, the piston 34 of the valve is moved so as to be disposed upward from the positions shown in FIGS. 1 and 2. This is done in the exemplary embodiment by moving the piston in the longitudinal direction by movement of the actuator bracket 50 and the piston rod 46.

Movement of the piston 34 to the position shown in FIG. 3 causes the inlet and outlet ports A and B of the valve to be in fluid connection with the second tank port E. Further in this position of the piston, the first tank port D is in operative connection through the valve body with the drain C. As represented by the water flow arrows shown in FIG. 3, the untreated water at the elevated pressure and some treated water which can be drawn back through the water outlet port B, pass through the valve to the second tank port E and downward through the tube 22. The water passes through the bottom of the tube and outwardly through the strainer. The water is dispersed and flows upwardly through the resin 20 so as to backwash the resin. The backwash represents a reversal from the normal flow during water treatment and causes particles and other materials that have been captured in the resin to flow upward in the tank.

The water flowing upward in the tank flows into the first tank port D and through the valve body to the drain port C. As a result, the particulates and other contaminants that can be dislodged and removed by backwashing the resin are caused to flow out the top of the tank, through the valve and are discharged to a suitable waste drain through the drain port C. The backwash portion of the cycle continues for a suitable time in accordance with the programming of the valve controller or associated control device to achieve the release of the majority of the particulates and contaminants that have been captured in the resin material. The backwash operation may be continued on a timed or other basis sufficient to complete the operation.

Figure 4:
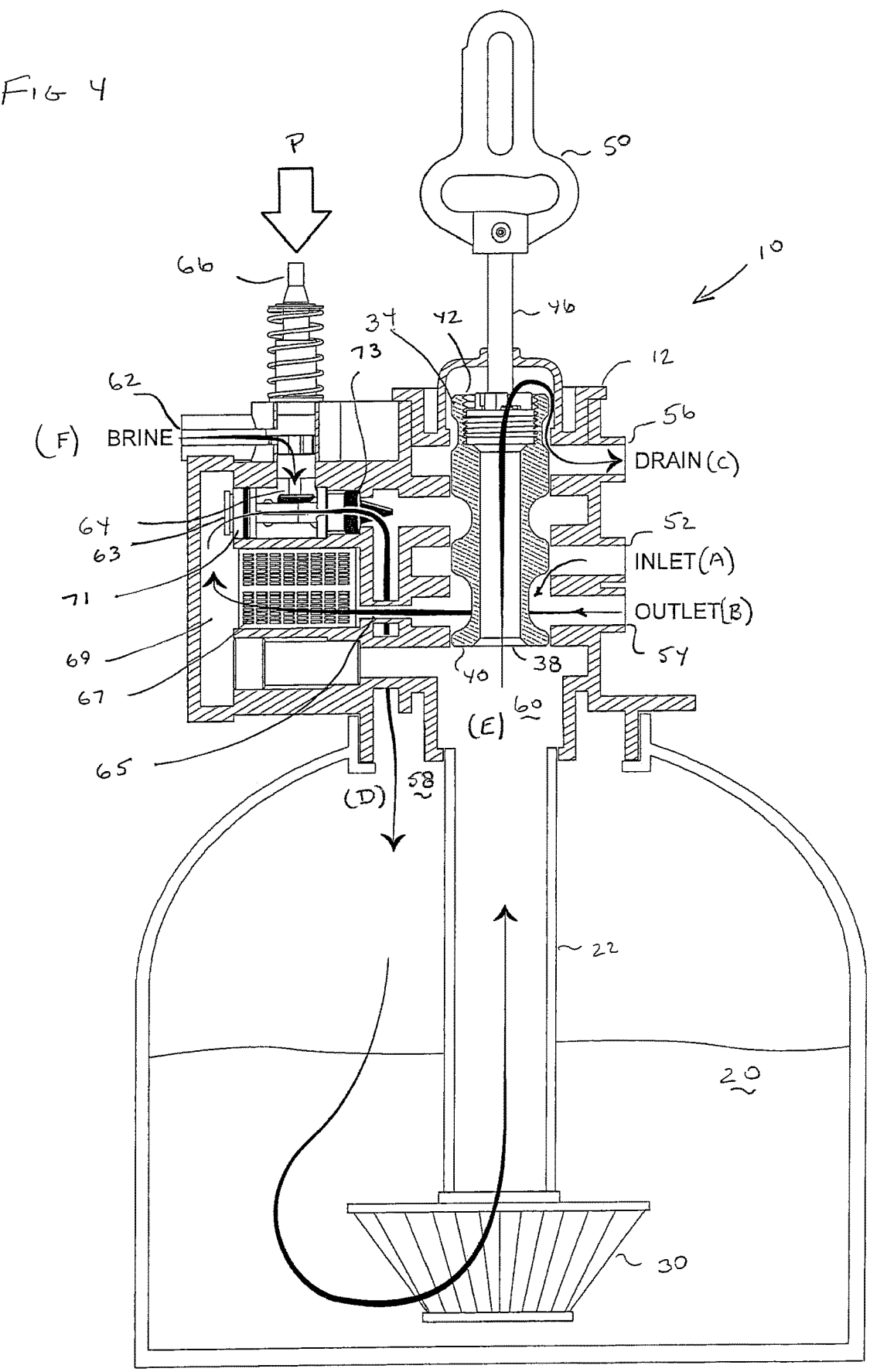
FIG. 4 is a view similar to FIG. 1 which shows the control valve in another operating condition.

At the conclusion of the backwash function, the exemplary valve controller is operative to change the condition of the valve to that shown in FIG. 4. In the position of the piston 34 shown in FIG. 4, water under higher pressure from the inlet A as well as water pulled from the outlet B passes through the valve body to the first tank port D. In this condition, the exemplary valve controller is operative to depress the plunger 66 and move the movable valve member 64 so as to open a flow path in the valve body. This causes the brine port F to enable brine solution to be received by the valve from the brine tank, into the flow of water as it moves through the valve body and to the first tank port D at the top of the tank. In exemplary embodiments brine delivered to the brine port F may be pressurized through operation of a pump or similar device so as to facilitate the delivery of the brine into the valve body. In other arrangements, the brine may be moved into the flow of water through venturi action or other suitable action which is suitable for causing the brine to be moved into the brine port F and mixed in the water that is flowing through the flow cavities of the valve body 12.

In the exemplary arrangement, treated water flows through the passage 65 and the screen 67 into the chamber 69. From the chamber, the water flows through an opening 63 and into the interior of the body of the injector 71. The incoming brine from brine port F mixes with the water in the interior of the injector body and flows in the direction in which flow is permitted past the check valve 73 at the inward end of the injector 71. Once the brine containing water passes the check valve 73, it flows through an interior passage of the valve to the first tank port D.

In the position of the exemplary valve element and valve controller represented in FIG. 4, water including the fresh water softener salt solution passes through the area at the top of the tank and passes downward into the resin material 20. The ions from the brine material flow into and migrate in the resin material, regenerating the supply of sodium ions therein and displacing the calcium, magnesium and other ions currently bonded to the resin particles therein. The water and the ions that are displaced from the resin material pass through the strainer 30 at the bottom of the tube 22 and flow upwardly to the second tank port E at the bottom of the valve. In this position of the valve piston 34 the water passing upwardly through the tube 22 passes through the longitudinal flow cavity 38 of the piston, through the flow cavity at the top of the valve body and out the drain port C. As a result, undesirable material is washed out of the resin and moved to the drain port.

Figure 5:
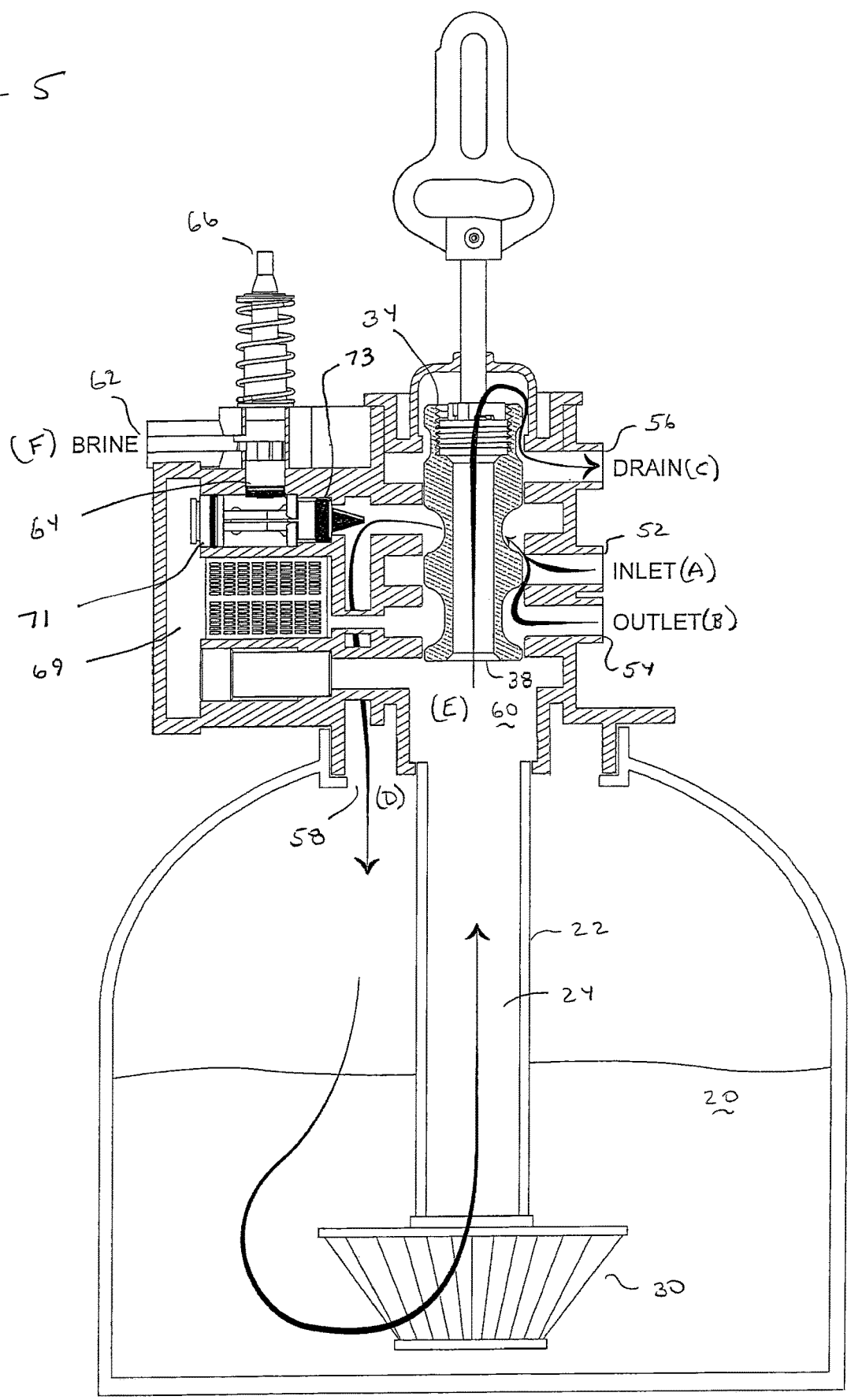
FIG. 5 is a view similar to FIG. 1 which shows the control valve in another operating condition.

The condition of the valve represented in FIG. 4 is maintained through operation of the valve controller for a period of time sufficient to draw an amount of brine into the tank that will regenerate the resin. Thereafter the exemplary valve controller operates to cause the plunger 66 to no longer be positioned to cause the movable valve member 64 to enable brine to enter the valve body through the brine port F. As represented in FIG. 5, the valve controller changes the position of piston 34 such that untreated water from the inlet A and water otherwise received from the outlet B pass through the valve body to the first tank port D. The check valve 73 of the injector 71 prevents flow to chamber 69 through the injector. The water which no longer has the new brine mixed therein passes downwardly through the bed of resin material 20 through the strainer and into the tube conduit 24 within the tube 22.

In this condition of the exemplary valve, the water from the tube conduit passes upwardly through the tube 22 and the second tank port E, through the longitudinal flow cavity 38 in the piston and outwardly to the drain port C of the valve body. Such flow through the resin provides a rinse function which is operative to cause any remaining regenerate brine material in excess of that which is captured within the resin material to be rinsed out and passed to the drain. The condition of the valve shown in FIG. 5 is maintained through operation of the valve controller for a sufficient time to clear the excess regenerate material from the tank. This may be done in some embodiments on a timed basis or other basis sufficient to accomplish the function.

Generally after regenerating the resin material as just described, the exemplary valve is returned by the valve controller to the flow condition which is shown in FIG. 1. In this condition, untreated water enters the inlet A of the valve body, passes through the valve body to the first tank port D. The water then passes through the resin 20 where it undergoes water treatment to remove undesirable materials and ion exchange is accomplished. The treated water then passes upwardly through the tube 22 to the second tank port E. The treated water then passes out of the valve body through the outlet B through which it is delivered to the water distribution system in the building and the water use devices. Generally the valve remains in this condition until the cycle for regenerating the resin material needs to be repeated.

It should be noted that in the exemplary embodiment the position of the piston 34 in the rinse position of the valve shown in FIG. 5, is immediately linearly longitudinally adjacent to the piston position 34 when the valve is in its usual service mode of operation in which untreated water is treated by flowing through the resin in the resin in the tank 14. This configuration minimizes the introduction of untreated water or other undesirable material when the condition of the valve is changed between the last step in which the remaining regenerate material is rinsed and removed from the tank, and the valve causes the system to go back into normal service mode. Of course it should be understood that this approach is exemplary and in other arrangements other approaches may be used.

The exemplary control valve 10 further provides the function of a valve shutoff which in the exemplary system separates the water treatment tank 14 from the untreated water inlet A. This function can avoid the need for an external shutoff valve to prevent untreated water from flowing to the control valve and the tank.

Figure 6A:
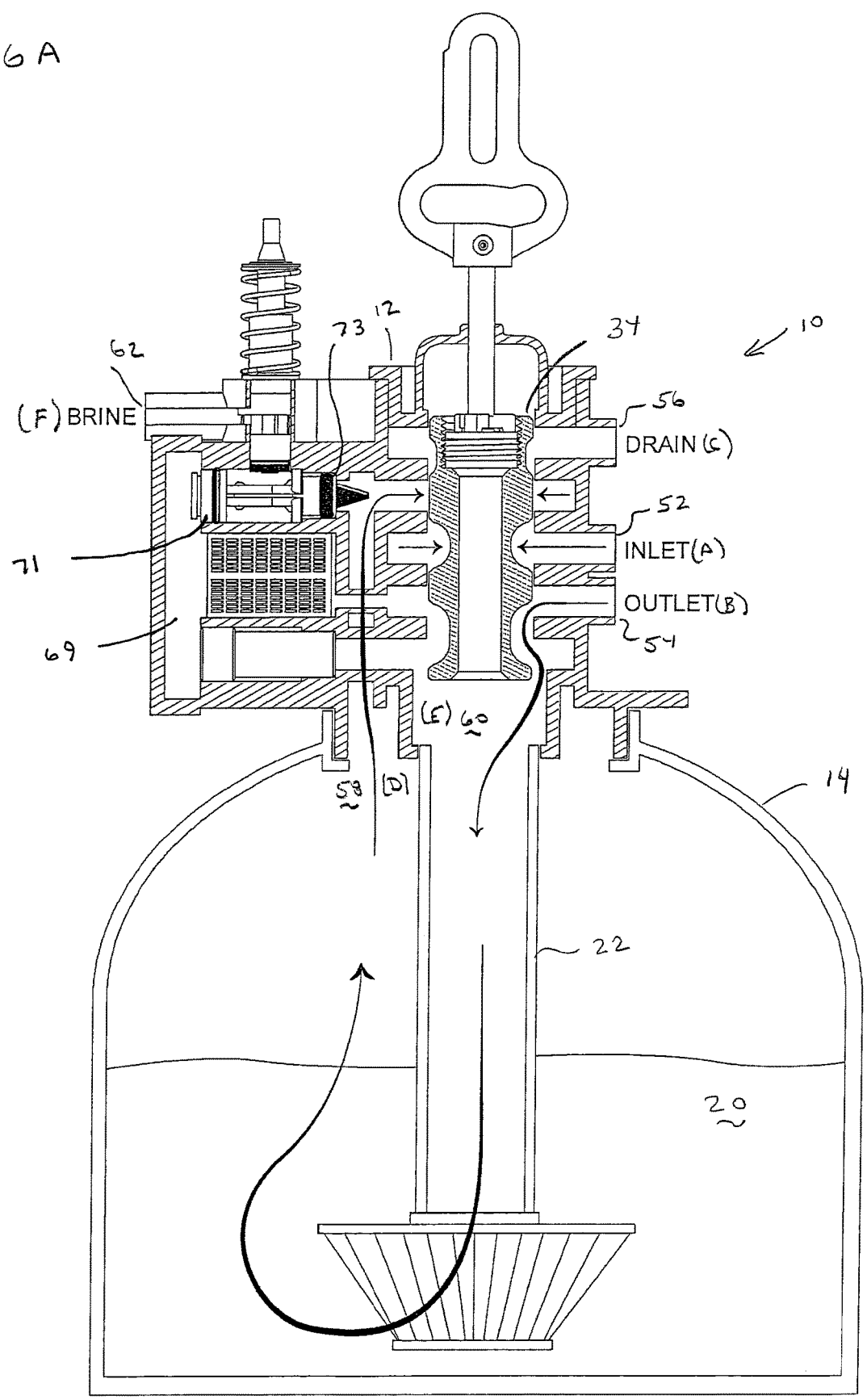
FIG. 6A is a view similar to FIG. 1 showing the control valve in another operating condition in which flow of liquid into the valve is shut off and pressure on the outlet port is maintained.

FIG. 6A represents the condition of the exemplary valve 10 in a shutoff condition. As can be appreciated in the exemplary system when it is desired to shut off the flow of untreated water to the valve and to the tank, the valve controller operates to cause the piston 34 to be moved to the position shown in FIG. 6A. In this position of the piston 34, the flow of untreated water into the inlet A is stopped by the position of the piston in which the annular flow cavities then connected to the inlet are not open to any other flow cavities within the valve.

As represented in FIG. 6A, the first tank port D is likewise in communication with a flow cavity within the valve that is not fluidly connected to any other flow cavity. In this position of the piston, the water outlet B is in operative connection with the second tank port E. Water pressure is effectively maintained at the outlet B unless a water use device is turned on which reduces such pressure. As a result, flow is effectively discontinued on a selective basis through actuation of the valve controller. Of course it should be understood that this particular configuration is exemplary and in other embodiments, other configurations may be utilized for purposes of shutting off the flow between the water inlet A and the water outlet B.

Figure 6B:
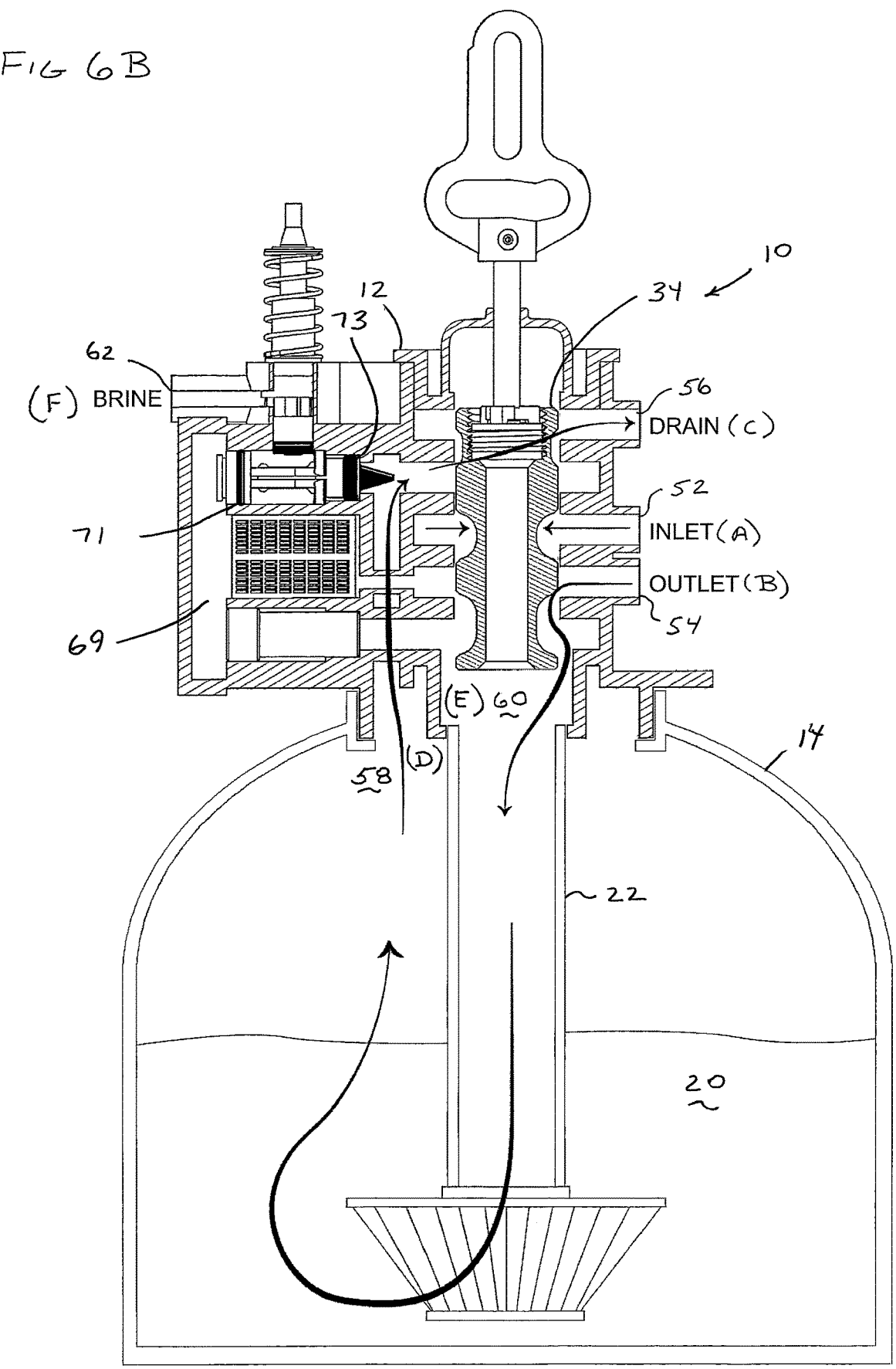
FIG. 6B is a view similar to FIG. 1 showing the control valve in another operating condition in which flow of liquid into the valve is shut off and pressure on the outlet port is relieved.

FIG. 6B represents the exemplary valve in a further shutoff condition. In the shutoff condition shown in FIG. 6B, the exemplary piston 34 is in a somewhat different longitudinal position from the position of the piston in FIG. 6A. In the position shown in FIG. 6B, the flow of untreated water into inlet A is stopped and untreated water supplied at the inlet does not flow through the valve to any other port.

However, in the position of the piston 34 in FIG. 6B fluid pressure at outlet port B is relieved to the drain port C. This is achieved by having fluid ports B, E, D and C in fluid communication. In this position of the valve element almost all the fluid pressure is released from the outlet port C as well as from the lines and devices of the water delivery system to which the valve is connected.

In some exemplary arrangements the valve may be placed with the valve element in the shut off position shown in FIG. 6A or FIG. 6B depending on the circumstances under which flow through the valve is shut off. For example in systems for water management such as described in the incorporated disclosures of U.S. patent application Ser. No. 14/698,381 and/or 14/698,399, the valve may be controlled to be in the shutoff condition with pressure maintained on the outlet port B when the fluid flow is to be shut off, but the delivery system is to remain pressurized at the normal level. In such circumstances the exemplary valve is configured as shown in FIG. 6A. However, if the water management system operates in response to conditions where the outlet port and water distribution system is programmed to be depressurized, the controller operates to configure the exemplary valve in the shutoff position shown in FIG. 6B. This may be done for example, when a probable system leak is detected. In such circumstances the central controller of the water management system may operate to minimize water damage, by not only shutting off further incoming water, but also by relieving pressure at the outlet port B so that water in the distribution system can pass out of the valve to the drain C. This may reduce the amount of water which comes out of the system at the site of the leak. Of course this approach is exemplary and in other embodiments, other approaches may be used.

A further feature of the exemplary embodiment of valve 10 when used in the exemplary water treatment system is the ability to operate the valve controller to allow incoming water to bypass the water treatment tank 14. For example in an exemplary system there are some situations such as when delivering water to an external spigot to wash off a sidewalk, irrigate plants and the like, when it may not matter that the water is untreated. Further in some situations the amount of water required for a particular activity may be relatively large compared to the amount of water that is used in circumstances where it is highly desirable for the water to be treated by having been treated by having passed through the tank 14.

In situations where it is desirable to deliver untreated water for use by a particular device, the exemplary valve controller may be operated to cause the piston 34 in the valve 10 to be moved to the longitudinal position shown in FIG. 7. In this piston position, untreated water which is delivered at the inlet A is passed through the valve body directly to the outlet B without passing through the resin material 20 in the tank. In this way, the untreated water is provided to the water use devices for as long as untreated water is desired. After the activity is accomplished for which the untreated water will be used, suitable signals can be delivered to the valve controller to return the valve condition to that shown in FIG. 1 in which the water is again treated by passing through the tank.

Of course it should be understood that the valve configuration shown is exemplary and in other embodiments other valve configurations having different valve body arrangements, valve element configurations, ports and other structures may be utilized. Further, while the exemplary embodiment has been described in connection with a water treatment process, other embodiments may be utilized in connection with other types of fluid treatment equipment and processes.

The exemplary embodiment of the valve controller includes features that enable the valve controller housing to be readily installed in connection with the valve. Further this exemplary construction enables the valve controller to be readily replaced or serviced.

Figure 8:
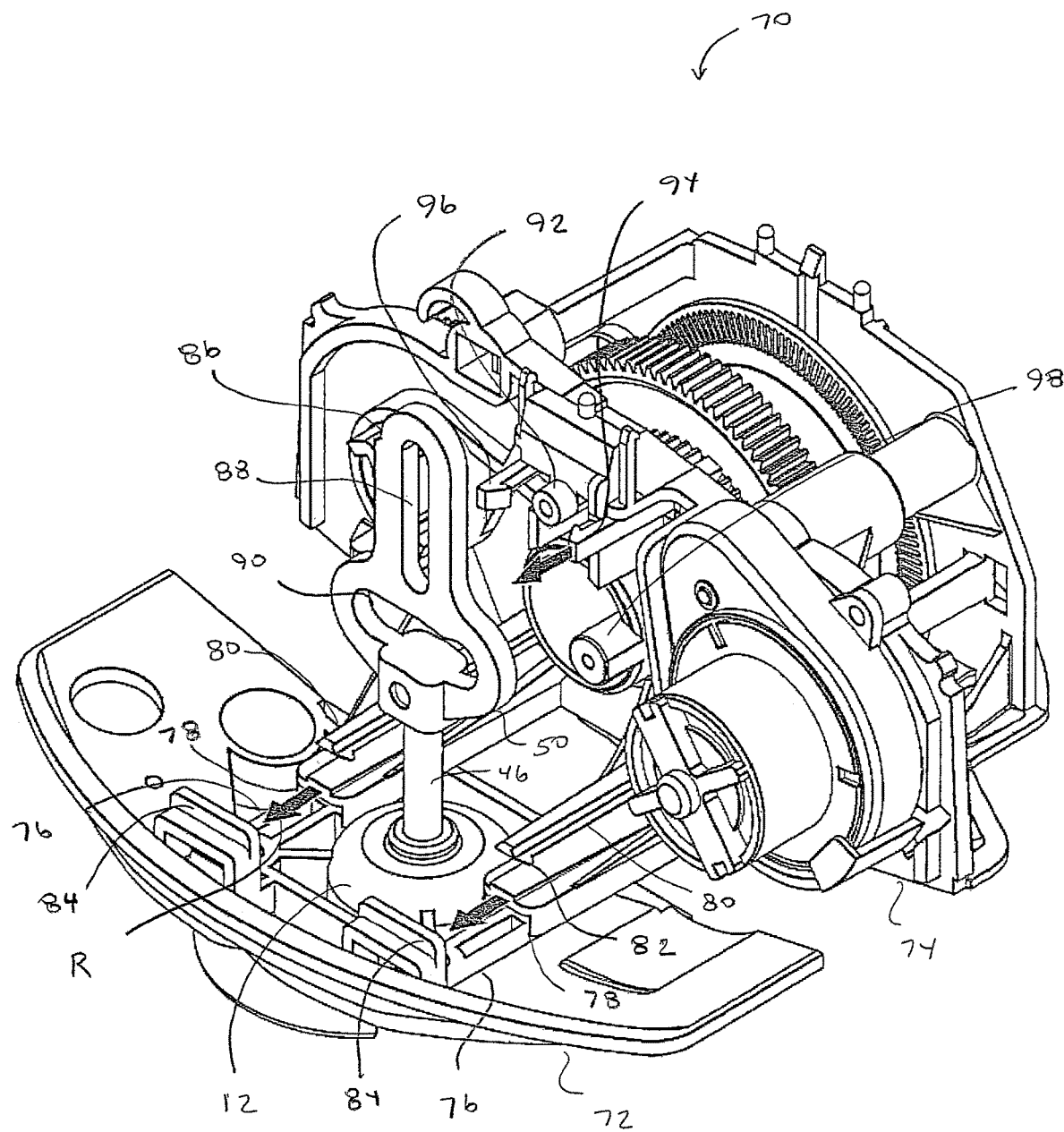
FIG. 8 is an isometric view showing an exemplary valve controller housing and a valve base being moved toward an operative position.
Figure 9:
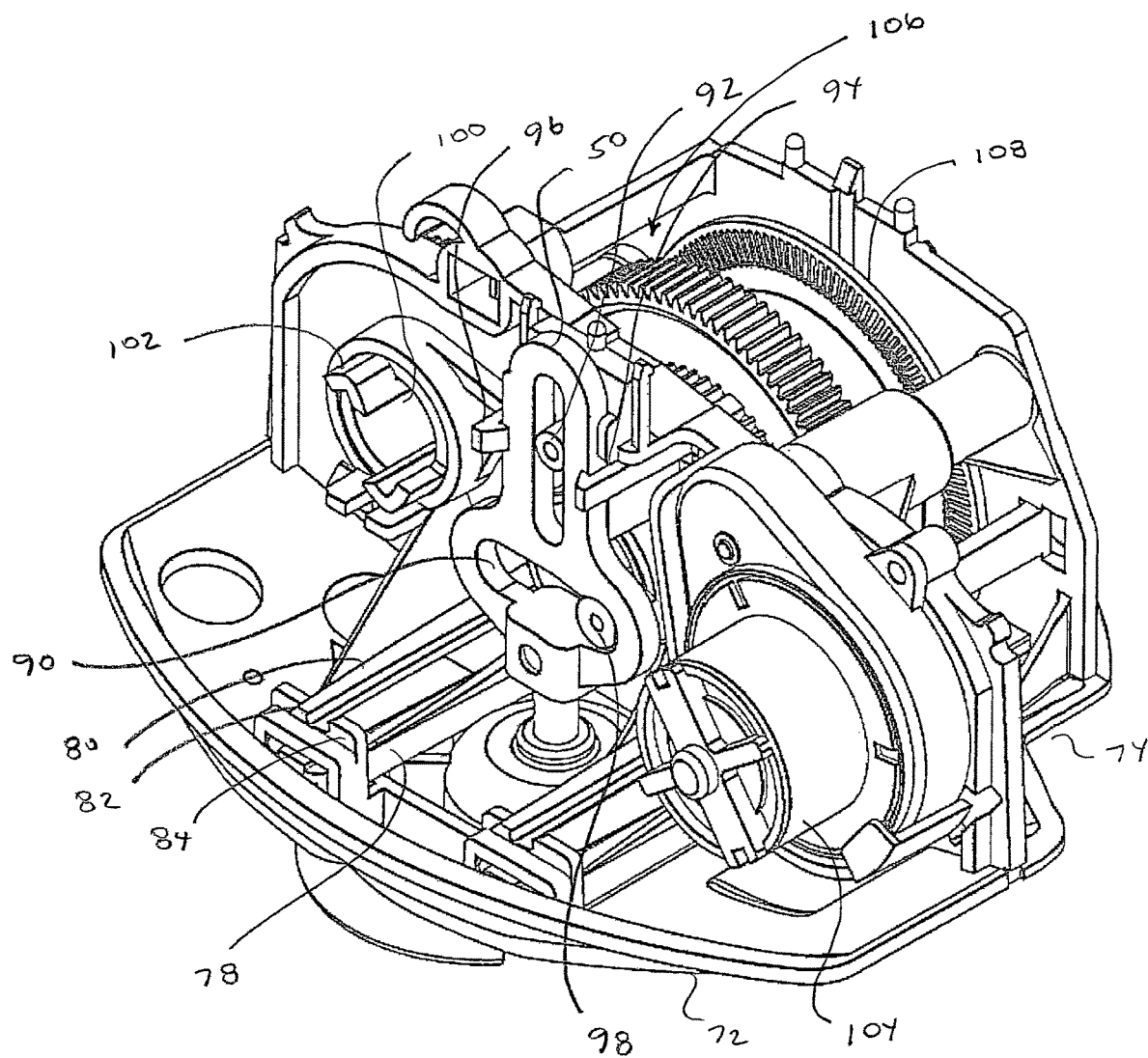
FIG. 9 shows the valve base and valve controller housing in an operative position.

An exemplary embodiment of the valve controller 70 is represented in FIGS. 8 and 9. The exemplary valve controller is operative to selectively move the actuator bracket 50 and the piston rod 46 to position the piston 34 longitudinally within the valve body 12 in the manner previously discussed herein. The actuator 70 may include the features and devices of the incorporated disclosures so as to carry out this function. Of course it should be appreciated that in other embodiments, other types of structures, devices and mechanisms may be utilized for purposes of providing selectively controlled movement of one or more valve elements.

In the exemplary embodiment of the controller 70 a valve base 72 is configured to be in operative connection with the valve body 12 of the valve 10. A valve controller housing 74 is configured to be selectively engageable with the valve base and placed in an operative position in which the valve controller may change the condition of the valve. The valve controller housing 74 is also configured to be readily disengageable from the valve base for reconfiguration, replacement or repair.

In the exemplary arrangement, the valve controller housing and the valve base include interengaging projections and slots to provide for the secure engagement and selective disengagement of the valve base and housing. Although it should be understood that the interengaging projections and slots may be in fixed connection with either of the engageable components, in the exemplary embodiment the valve base includes a pair of elongated rail projections 76. The pair of elongated rail projections 76 extend on opposed sides of the piston rod 46 and extend generally perpendicular to the longitudinal direction in which the piston rod is moveable.

The exemplary elongated rail projections are configured to be engaged in captured relation by elongated recessed slots 78. Elongated slots 78 extend in portions of the valve controller housing 74. The exemplary slots 78 are configured such that the rails 76 once extended therein are captured and immovable in all directions except along the direction of the rail projections designated by arrows R in FIG. 8. The secure engagement of the projections and slots may be achieved in different embodiments by interengaging tabs, flanges or other structures on the projections and slots which only enable such items to be engaged and disengaged by movement along the direction of arrows R.

The exemplary valve controller housing 74 further includes a pair of deformable members 80. Deformable members 80 each terminate at a hook 82. Each hook 82 is configured to engage and hold tabs 84 that are operatively connected with at least one wall when the valve controller housing is in the operative position as shown in FIG. 9. It should be understood, however, that the hook and tab configuration shown is exemplary and in other arrangements, the configuration may be reversed such that the hooks are included in engagement with the valve base and the structures for engaging the hooks are included on the valve controller housing. Further, other structures may be utilized for selectively holding and releasing the valve base and valve controller housing in the operative position.

In the exemplary arrangement, the actuator bracket 50 is configured to be readily operatively engaged with and disengaged from the structures which operate to selectively move the actuator bracket which are part of the valve controller housing. In the exemplary arrangement, the actuator bracket 50 includes a longitudinally elongated guide yoke portion 86. Guide yoke portion 86 includes a longitudinally elongated guide slot 88. The exemplary actuator bracket is further configured to include an actuator recess 90. Actuator recess 90 includes an elongated actuator slot that is elongated in a direction transverse to the longitudinal direction. In an exemplary arrangement, the guide slot 88 in the guide yoke portion is configured to accept a guide pin 92 on the housing in movable relation therein. In the exemplary arrangement, the valve controller housing 74 includes a pair of deformable holding projections 94. The holding projections are spaced apart in symmetric relation relative to guide pin 92 and are sized to enable the guide yoke portion 86 to extend in movable relation between the holding projections. In the exemplary arrangement, each of the holding projections includes an angled hook end 96. Hook ends 96 of the holding projections 94 extend in facing relation and are configured to enable the guide yoke portion to be moved between the holding projections and held between the projections by the hook ends. As a result, the guide yoke portion is enabled to move in a longitudinal direction while positioned between the holding projections and in guided relation in the longitudinal direction by the guide pin 92. Further the hook ends 96 serve to prevent the guide yoke portion from moving out of the area between the holding projections and being disengaged from the guide pin.

It should be understood that this approach is exemplary and in other arrangements, one or more guide pins may be positioned on an actuator bracket which engage with slots or other openings in the housing. Further other structures may be utilized for engaging the actuator bracket or similar structures in releasable movable connection.

Further in the exemplary arrangement, the actuator recess 90 is configured to receive therein an actuator pin 98. Actuator pin 98 of the exemplary arrangement is operative to be selectively moved in an arcuate path responsive to operation of the valve controller 70. In the exemplary arrangement, the actuator pin 98 is positioned on a rotatable member that is selectively rotated so as to control the relative vertical position of the actuator pin, and thus control the movement and longitudinal position of the piston 34 through longitudinal movement of the actuator bracket 50.

In the exemplary arrangement, the actuator pin is selectively moved in an arcuate path which causes the pin 98 to move relatively transversely within the actuator recess 90. The selective positioning of the actuator pin 98 along its arcuate path as determined through operation of the valve controller 70 is usable to selectively position the actuator bracket 50 and the piston 34 in operative connection therewith, in the desired positions to achieve the desired flow conditions through the valve.

Further, the exemplary arrangement enables the bracket to be readily operatively disengaged from the valve controller housing 74. As can be appreciated, disengagement of the deformable members 80 from the tabs allows relative movement of the valve base 72 and the valve controller housing 74 along the direction of arrow R and in an opposed direction from when the base and housing are being engaged. In the exemplary arrangement, the holding projections 94 are movable and deformable to enable the hook ends 96 to release the guide yoke portion 86 of the bracket 50 from being held in intermediate relation of the holding projections 94. In addition, in the exemplary embodiment the actuator pin 98 may be moved out of the elongated actuator slot 90. Thus the actuator housing and the components attached thereto may be readily disengaged from the valve base 72. Thereafter a new valve controller housing 74 may be readily engaged with the valve base 72 and the actuator bracket 50. Such replacement may be done for repair or maintenance purposes. Alternatively an alternative valve actuator housing may be installed to provide additional or different features and functions for operation of the valve and related components such as the exemplary water treatment system. For example a valve controller that operates based on wired connections with other system components may be replaced with a valve controller that communicates wirelessly with other components, and vice versa. Alternatively the valve controller may be replaced to convert the valve and associated equipment to operate via a different method of operation. Of course it should be understood that these approaches are exemplary and in other embodiments, other approaches may be used.

Further in the exemplary arrangement as shown in FIG. 9 the valve controller housing 74 includes a rotatable member 100 which includes cam surfaces 102 thereon. The cam surfaces 102 are configured to operatively engage the plunger 66 and displace the plunger so as to control the movement of the movable valve member 64 within the valve body. In the exemplary arrangement the rotatable member 100 and cam surfaces 102 are configured so that the valve controller housing 74 can be disengaged from the valve base 72 without interference with the plunger member 66. This further facilitates the ready installation and replacement of the valve controller housing. As can be appreciated, the exemplary valve controller includes a pair of cam surfaces 102 which enables opening the movable valve member twice during a single rotation of the rotatable member. This may correspond, for example, to operation of the valve and its associated equipment in connection with a method that requires opening of the movable valve element 64 two times during a particular operation cycle such as the one previously described. Of course it should be understood that in other embodiments, different numbers of cam surfaces may be utilized. Further other exemplary arrangements may include valves with additional valve elements and cam members so as to enable the introduction of other liquids and fluids into the valve at various selected cycle times during operation of the valve and the associated equipment.

As represented in FIG. 9, the exemplary valve controller includes a motor 104. The motor 104 is in operative connection with a transmission generally referred to as 106. The transmission of the exemplary embodiment includes a plurality of connected gears or similar motion transmission devices that are selectively moved through operation of the motor 104. The transmission 106 of the exemplary arrangement is operative to move the actuator pin 98, rotatable member 100 and other structures which control the positioning of the valve components in a coordinated manner so as to achieve the desired coordinated operation of the valve structures. Further the exemplary valve controller includes an encoder 108. The encoder 108 moves in coordinated relation with one or more components of the transmission. One or more sensors (such as an optical sensor) is in operative connection with the encoder through operation of control circuitry such as is described in the incorporated disclosures. The encoder and associated sensor or sensors may be utilized to determine the then current status and/or position of the valve components so as to enable the valve controller to selectively move the various components associated with the valve in the desired manner. Of course it should be understood that the transmission, motor, encoder and other structures of the valve controller shown are exemplary and in other embodiments, other types of valve controller arrangements may be utilized.

Figure 10:
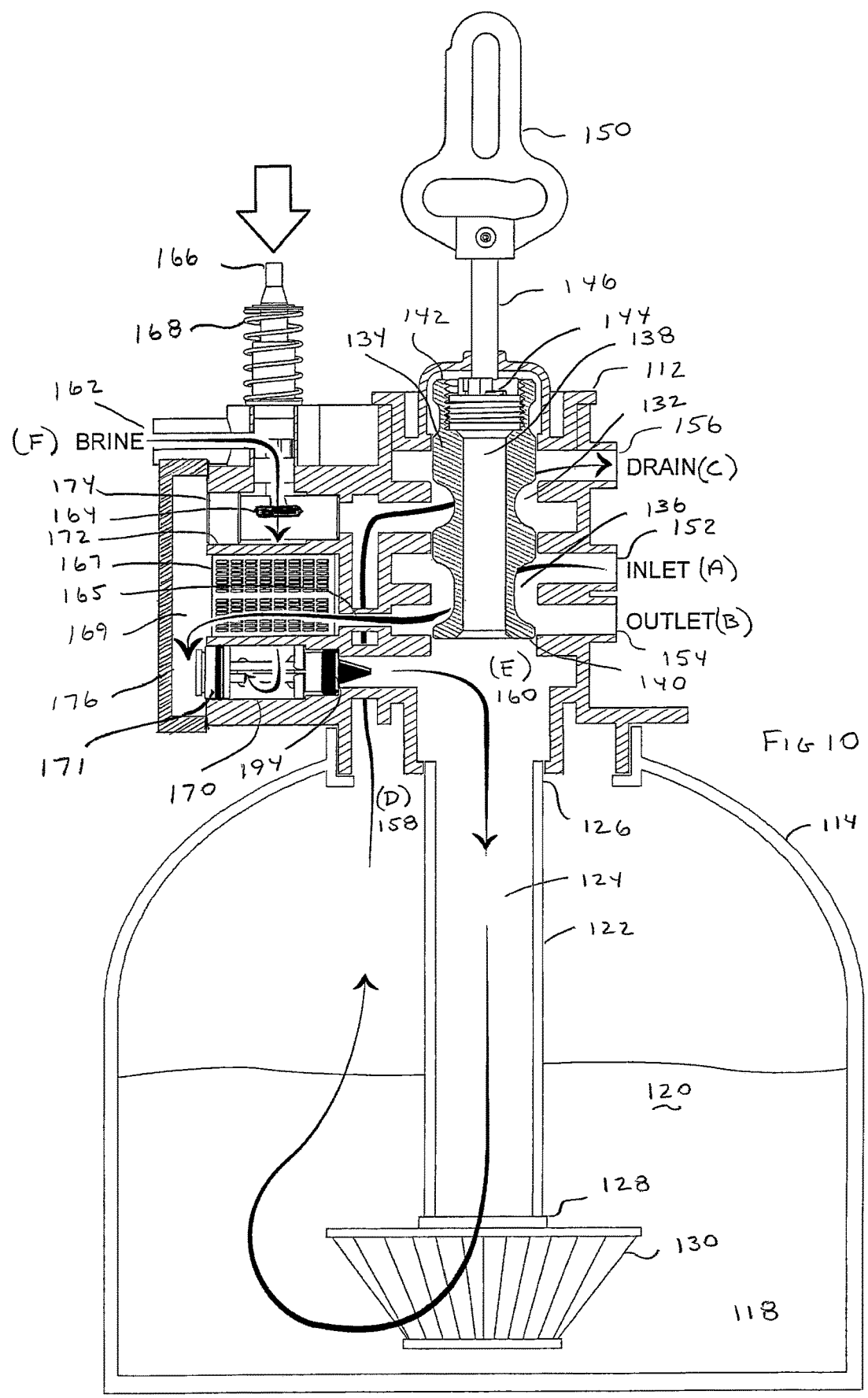
FIG. 10 is a schematic cross-sectional view of an alternative exemplary control valve.

FIG. 10 shows schematically an alternative embodiment of a control valve generally indicated 110. Control valve 110 is generally similar to control valve 10 previously described except as otherwise mentioned. Control valve 110 corresponds to a control valve that has been reconfigured so as to enable the carrying out of different functional processes as discussed herein.

Control valve 110 includes a valve body 112. Valve body 112 is configured for operative attachment to the water treatment tank 114. This may be for example by releasable threaded connection. In exemplary arrangements valve body 112 may be identical to body 12. Like the previously described water treatment tank, the exemplary tank has a top portion 116 and a bottom portion 118. The exemplary tank houses water treatment material such as a resin material 120. The resin material may be one of the types like those previously described. Of course other types of water treatment materials or combinations of materials may be used in other embodiments. Further it should be understood that the water treatment process performed using the control valve is merely one example of an application for the particular control valve arrangement.

The exemplary water treatment tank includes therein a tube 122 which provides a conduit 124 between the top and bottom portions of the tank. The top end of the tube 126 is operatively connected to the valve body 112. The bottom end of the tube 128 is in operative connection with a strainer 130.

Similar to the previously described control valve 10, the valve body 112 includes at least one movable valve element. The exemplary valve includes a generally cylindrical, longitudinally extending bore 132. A piston 134 is selectively movable in the longitudinal direction within the bore 132. It should be noted that the exemplary piston 134 has the same configuration as piston 34 of the previously described embodiment. As in the prior embodiment the exemplary valve is configured to enable the piston to be changeable.

As discussed in connection with the previously described embodiment, piston 134 includes a plurality of annular recesses which define annular flow cavities 136. Annular flow cavities also generally surround the bore and are longitudinally spaced within the body of the valve. Piston 134 also includes a longitudinal flow cavity therethrough 138. Piston 134 includes a first longitudinal end 140 and a second longitudinal end 142. As in the case with the previously described embodiment, the second longitudinal end includes a threaded portion adjacent the second longitudinal end 144 which is releasibly engageable with a coupling 144. The coupling 144 of the exemplary arrangement provides for operative releasable connection of the piston 134 and a piston rod 146. As with the prior embodiment, the coupling 144 enables fluid to flow therethrough through the longitudinal flow cavity 138 of the piston.

In the exemplary arrangement associated with the control valve 110, the piston 146 is in operative connection with an actuator bracket 150. Actuator bracket 150 is configured to be moved by a valve controller which may be similar to the valve controller 70 previously discussed. Of course it should be understood that in other embodiments, other types of valve controllers may be used.

Like previously described control valve 10, control valve 110 further includes an inlet port 152 which is labeled A for purposes of brevity herein. The valve also includes an outlet port 154 labeled B. The exemplary valve further includes a drain port 156 labeled C. Valve 110 further includes a first tank port 158 labeled D and a second tank port 160 labeled E. The exemplary valve 110 further includes a brine port 162 (labeled F). The brine port F similar to the previously described embodiment, is connected to a fluid passage within the valve which is opened and closed through selective movement of a movable valve member 164. The movable valve member 164 is moved between open and closed positions through movement of a plunger 166 which is biased toward the valve member closing position by a spring 168. As is the case with the prior described embodiment, the plunger 166 may be selectively moved between the open and closed positions of the valve through operation of the valve controller. This may be done by engagement with cam surfaces such as cam surfaces 102 previously described. Of course in other arrangements, other approaches may be used.

Similar to the previously described valve, valve 110 includes a flow passage 165 which is fluidly connected to a chamber 169. A screen 167 is positioned such that fluid passes through the screen 167 to reach the chamber 169.

Valve 110 includes a passage 170 similar to passage 59 that is disposed below the passage 165 as shown and a further passage 172 similar to passage 75 that is disposed above passage 165. An injector 171 that is similar to injector 71 is positioned in passage 170. The injector 171 includes a check valve 194. A plug 174 which may be similar to the plug 61 of the previously described embodiment is positioned in passage 172. In the exemplary embodiment a fluid passage that is not separately shown extends between the passage 172 and passage 170. This fluid passage is separate from the fluid passage 165 and enables the brine port F to communicate with both passages 170 and 172. In this exemplary arrangement, the plug 174 positioned in the passage 172 enables the brine port F to be in communication with the passage 170 and the injector 171. This enables the injector body to be in fluid communication with the brine port when the valve member 164 is open.

In the exemplary valve 110 a removable cover 176 closes the chamber 169. In the exemplary arrangement suitable sealing elements such as gaskets and fastening members such as screws are provided to enable holding the cover to the rest of the valve body and for maintaining the chamber 169 in fluid tight engagement therewith. In the exemplary arrangement the cover 176 enables selectively accessing the passages 170 and 172 as well as the plug and injector that may be positioned therein. This enables the exemplary valve 110 to be configured such that the injector may be selectively positioned in either one of the fluid passages 170 or 172. Likewise the plug 174 can be selectively positioned in the other one of the passages 170 or 172 in which the injector 171 is not currently positioned.

Figure 11:
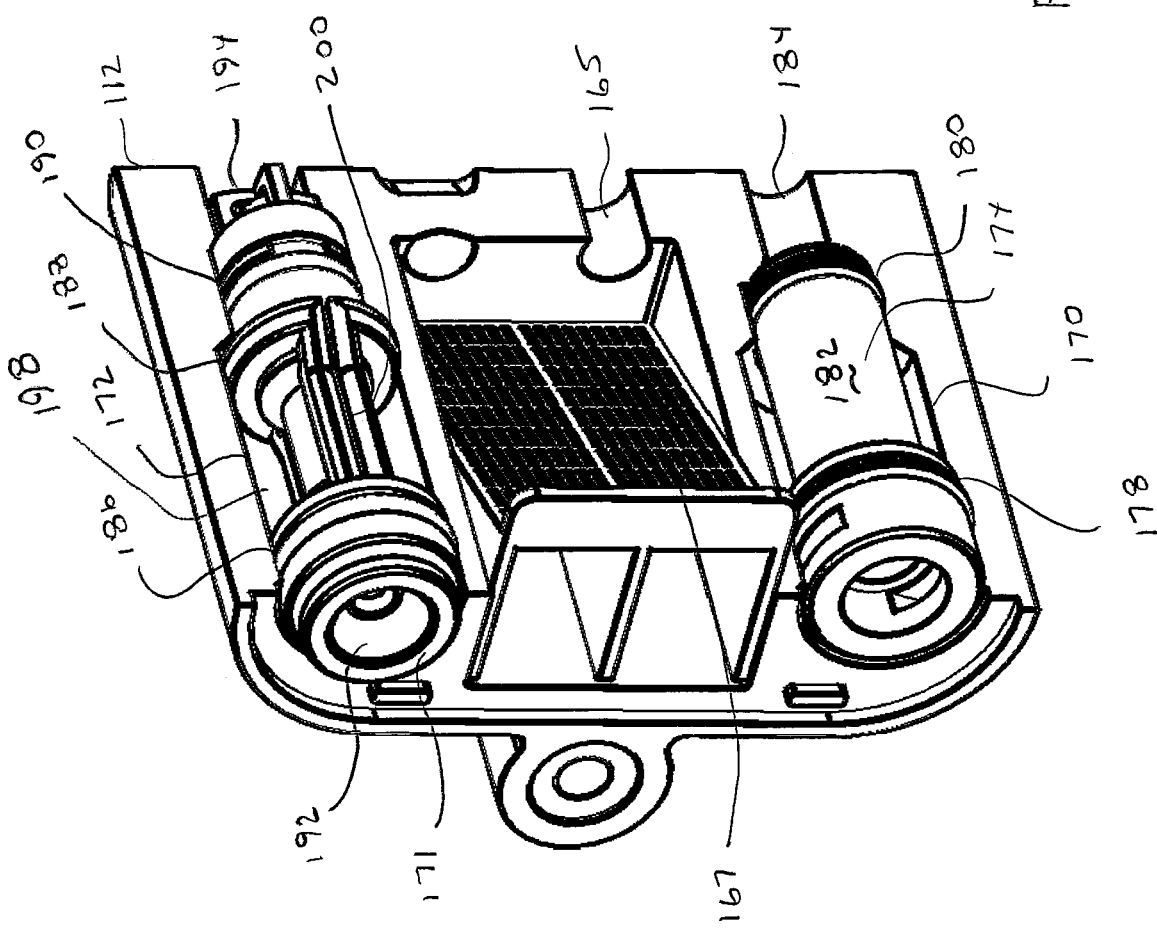
FIG. 11 is an isometric partial cutaway view of a portion of the valve associated with a changeable injector.
Figure 12:
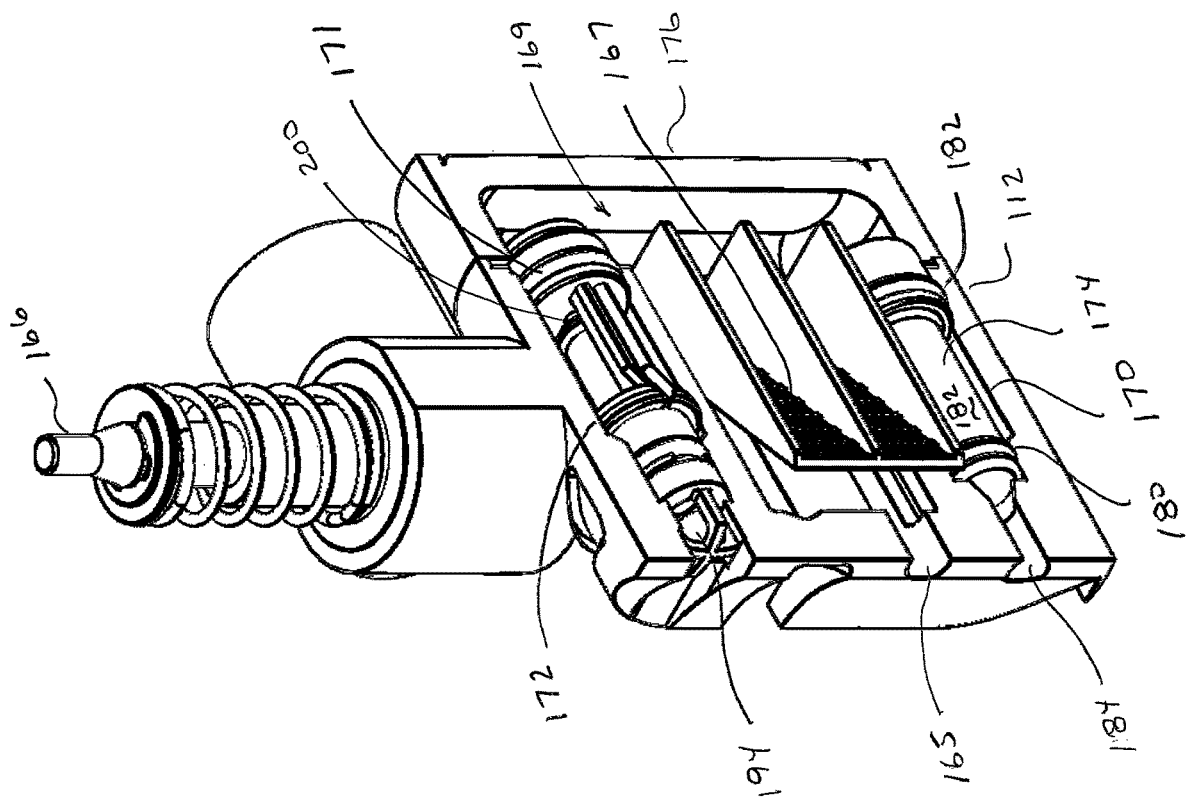
FIG. 12 is an opposite hand partial cutaway showing the portion of the valve in FIG. 11.

FIGS. 11 and 12 are cutaway views of the portion of the valve body 112 and the passages 170 and 172. In the arrangement shown in FIGS. 11 and 12, the injector 171 is shown positioned in passage 172 while the plug 174 is positioned in passage 170. This corresponds to the configuration of the injector and plug shown in valve 10 that has the positions of the injector and plug reversed from that shown in valve 110. Thus as can be appreciated, the exemplary embodiment of valve 110 enables a person assembling the valve initially to selectively position the injector body 171 and plug 174 in either passage 170 or passage 172 as is appropriate for the operation of the particular control valve. Further this exemplary configuration may enable a service technician or person modifying the valve to remove the cover and change the positions of the injector body and the plug so as to modify the operational capabilities of the valve. Further in other alternative arrangements the valve may be configured to have plugs positioned in both of the passages 170 and 172. This might be done, for example, to have a valve that operates not to have brine solution or other material introduced into the liquid that passes through the valve. Alternatively in still other arrangements injectors or other elements may be positioned in both of the fluid passages. This might be done, for example, in valve configurations where in multiple positions of the piston, it is desirable to introduce brine solution or other material into the liquid flow.

It should also be appreciated that alternative arrangements may be utilized in connection a valve configuration like that described. For example, check valves or other arrangements may be utilized so as to allow fluid flow in an opposite direction from that permitted by the check valve of the injector so that fluid may be enabled to flow into the chamber 169 in certain longitudinal positions of the piston for producing a desired flow path. Further in other alternative arrangements, the chamber 169 may have multiple segregated areas so as to be in connection with additional ports or flow paths through the valve. Such capabilities may provide additional flow alternatives to the valve which enable the valve to provide additional capabilities. As can be appreciated, those skilled in the art can develop numerous changeable valve configurations suitable for different processes and equipment from the description provided herein.

Further in the exemplary arrangement the plug 174 includes disposed annular seals 178 and 180. These disposed annular seals are comprised of resilient material that engage the adjacent walls of the flow passage so as to provide fluid tight engagement therewith. However, as can be appreciated, the body portion 182 of the plug 174 that extends between the seals is spaced inwardly from the annular wall bounding the passage 170. This provides the capability for fluid to occupy and flow in the area between the annular wall bounding the passage and the body portion 182 without the fluid being able to flow directly into the chamber 169 or the passage 184 which can fluidly connect with the area adjacent to the second tank port 160. As can be appreciated, this exemplary construction of the plug 174 when positioned in the passage 172 as represented in FIG. 10 enables the brine solution which enters the passage 172 to flow around the body portion 182 of the plug member and into the chamber 170 to reach the injector 171.

As also shown in FIGS. 11 and 12, the exemplary injector 171 includes disposed annular resilient seals 186, 188 and 190 which engage in sealing relation the adjacent annular wall bounding the passage 172. The exemplary injector includes a liquid inlet 192 similar to opening 63 at a first end, and an outlet from the check valve 194 at the opposed end. In the exemplary arrangement the seals 186 and 188 bound an area 198 which can be filled with the brine solution which is received therein when the valve member 164 is open. Brine in the area 198 is drawn through openings 200 in the injector body as liquid flows therethrough. This causes the brine solution to be mixed with the liquid as it flows through the injector body in the manner previously discussed. Treated water can also be delivered from area 198 to the port F in an appropriate valve condition like that previously discussed. Of course it should be understood that this injector configuration is exemplary and in other valve and system arrangements, other approaches and configurations may be used.

In the exemplary system used in conjunction with valve 110 and shown in FIG. 10, the valve may be operated in conjunction with the water treatment tank in a manner similar to that previously described in connection with valve 10. However, in this exemplary embodiment, the selective positioning of the piston 134 by the valve controller associated with the valve enables the regeneration of the resin material 120 housed in the tank 114 via the upward flow of the brine solution rather than via a downward flow of the brine solution such as is described in connection with the operation of valve 10 and represented in FIG. 4. In the prior described example of the system used in connection with valve 10, the brine solution acts to regenerate the resin material housed in the tank by flowing from the upper surface thereof and to the bottom area and out the tube 22. In the operation of valve 110, regeneration is accomplished by distributing the brine solution initially from the bottom end of the tube 128 and having the solution migrate radially outwardly from the strainer and upwardly through the resin so as to provide for regeneration thereof. This may be more effective for some resin materials or tank configurations. Further it should be appreciated that because in some exemplary arrangements the piston 134 and valve body 112 may be identical to piston 34 and valve body 12 respectively, the change in capability from downflow regeneration to upflow regeneration may be accomplished by changing the respective positions of the injector and the plug within the valve body and changing the programming associated with the controller so that the controller positions the piston in a different position (e.g. the position shown in FIG. 4 for downflow and the position shown in FIG. 10 for upflow). This is useful in that the need for servicers and installers to have a stock of different valves for upflow and downflow regeneration can be avoided.

As can be appreciated, the method for configuring the exemplary valve for either upflow or downflow regeneration includes removing the cover 176 to access the chamber 169. The injector 171 and the plug 174 are positioned in the passages 170, 172 in the manner appropriate for the regeneration approach desired for the unit. The cover 176 is then installed to fluidly seal chamber 169. The valve controller 70 is programmed via one or more inputs through an appropriate input device such as a laptop or handheld computer, which inputs controller executable instructions that cause the piston to move to the appropriate position for the regeneration approach to be used. Further these method steps can be used to change the regeneration approach of an existing unit. This capability of the exemplary embodiments to be configured as desired without the need to change valve bodies, pistons or actuators can be useful and cost effective.

In the exemplary operation of the valve 110, the valve is enabled to operate in a manner similar to that discussed in connection with valve 10 and is represented in FIGS. 1-3 and 5-7.

It should be appreciated that in the exemplary arrangement, the plug 174 is configured so that treated water can be directed out of the brine port F in a manner similar to that described in FIG. 2 due to the configuration of the plug and the annular flow chamber which extends around the central body portion 182 thereof. As a result, treated water is enabled to be delivered from the area 198 of the injector body, to the brine port and into a brine tank holding material so as to produce a brine solution which can later be introduced to regenerate the resin in a manner like that discussed in connection with the prior embodiment.

When the resin material 120 in the water treatment tank 114 is to be regenerated, the piston 134 is moved to the position shown in FIG. 10. In this position, brine solution produced in the brine tank is drawn into the brine port F due to the opening of the movable valve element 164. The brine is drawn through the annular chamber around the central body portion 182 of the plug 174 and passes through the fluid passage into the area 198 of the injector body 171. Water flows from the inlet A through the passage 165 and into the chamber 169. From the chamber 169, the water flows through the injector body 171 where it is mixed with the brine solution and passes downwardly through the tube 122. The regenerate brine laden water then passes through the bottom of the tube 128 through the strainer and upwardly through the resin material 120 where it replaces the ions of contaminants that have been removed from the water previously treated. The released ions and other contaminants flow upwardly through the first tank port D and out through the drain C of the valve. This process is carried out for a sufficient time so as to regenerate the capabilities of the resin to remove undesirable materials from water which is passed therethrough after completion of the resin regeneration cycle. Of course it should be understood that these approaches and configurations are exemplary and in other embodiments, other configurations and process approaches may be utilized. Further it may be appreciated that the water treatment application for valve 110 and the structures and elements described in connection therewith is only one of many exemplary applications in which such elements and structures may be used.

An exemplary water management system will now be described. Several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

For purposes of this disclosure, water conditioners include devices and systems that are operative to improve the quality of water. Water conditioners may include water softeners, water filters, water disinfecting devices, systems that oxidize contaminants in water and other similar water conditioners and systems. Exemplary embodiments of such water conditioners and the devices associated therewith are described in the following patent applications, the disclosures of each of which are incorporated herein by reference in their entirety: U.S. patent application Ser. Nos. 13/492,391; 14/024,918; 61/986,423; 62/069,897; and 62/119,507.

Figure 13:
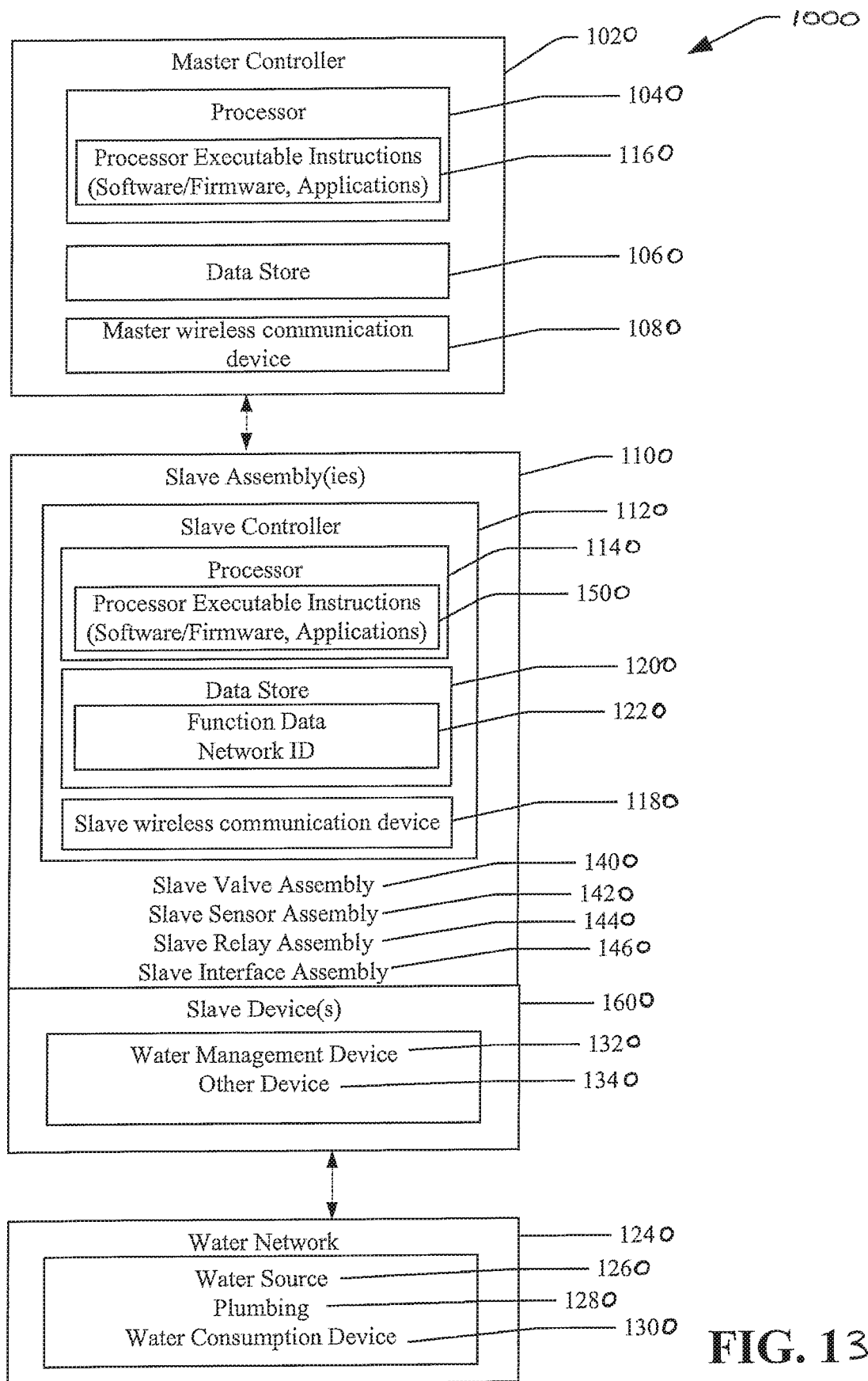
FIG. 13 is a schematic functional block diagram of an example system that utilizes the exemplary valves.

With reference to FIG. 13, an example system 1000 that facilitates water management is illustrated. The water management system 1000 may include a master controller 1020. An example of a master controller that may have one or more of the features described herein may be a controller associated with the master control valve shown in U.S. Application No. 61/986,423 filed Apr. 30, 2014 which is hereby incorporated herein by reference in its entirety.

The exemplary master controller 1020 may include one or more processors 1040 in operative connection with one or more data stores 1060. As used herein, a processor corresponds to any electronic device that is configured via processor executable instructions in at least one data store 1160 implemented as hardware circuits, software, firmware, and/or applications that are operative to enable the processor to process data and/or carry out other actions. For example, this processor of the master controller and any other processor described herein may correspond to one or more (or a combination) of a microprocessor, CPU, FPGA, ASIC, or any other integrated circuit (IC) or other type of circuit that is capable of processing data in a controller, computer, server, or other type of electronic device. Also, it should be appreciated that a data store may correspond to one or more of a volatile or non-volatile memory device, RAM, flash memory, hard drive, SSD, database, and/or any other type of device that is operative to store data.

The exemplary master controller described herein may also include a master wireless communication device 1080 that enables the master controller to wirelessly communicate messages with a plurality of slave assemblies 1100. Such slave assemblies may have a slave controller 1120 that includes a corresponding and/or compatible slave wireless communication device 1180 that enables bi-directional communication with the master communication device 1080.

Such master and slave wireless communication devices may include components having low-power digital radios based on the IEEE 802.15.4 standard or other wireless standard. An example may include MiWi® modules provided by Microchip Technologies of Chandler, Ariz. Other examples of communication devices that may be used include ZigBee compatible modules. However, it should be appreciated that in alternative example embodiments alternative and/or additional types of the wireless communication devices 1080, 1180 may be used such as those that are operative to carry out Wi-Fi and/or Bluetooth communications (i.e., devices that are compatible with IEEE 802.11 and/or IEEE 802.15.1 standards).

As with the master controller 1020, the exemplary slave controller 1120 may include at least one processor 1140 and at least one data store 1200. Processor executable instructions 1500 may cause the processor 1140 to process data, make control determinations, communicate messages and/or carry out other actions. The slave assembly 1100 may also include or be in operative connection with further devices and/or assemblies that are operative to be controlled by the slave controller responsive to wireless communications from the master controller 1020. In exemplary embodiments the devices controlled by slave controllers may include components of water conditioners or other devices as discussed hereafter.

In an example embodiment, each data store of each slave controller may include preprogrammed function data 1200 indicating a respective function of the respective slave controller and the controlled device or devices with which it is associated, which is considered part of the slave assembly. When the described system is being initially configured (or at other times), the master controller may be operative to wirelessly output at least one message to each of the slave controllers within range of wireless communications, which messages cause the slave controllers associated with the assemblies, which are sometimes referred to herein as devices, to communicate the respective function data 1200 back to the master controller 1020. The master controller may then store the received function data in the data store 1060 in correlated relation with respective unique network identifiers 1220 (e.g., MAC address, IP addresses or other unique ID) associated with the respective slave controllers 1120 and respective slave controller communications.

Figure 28:
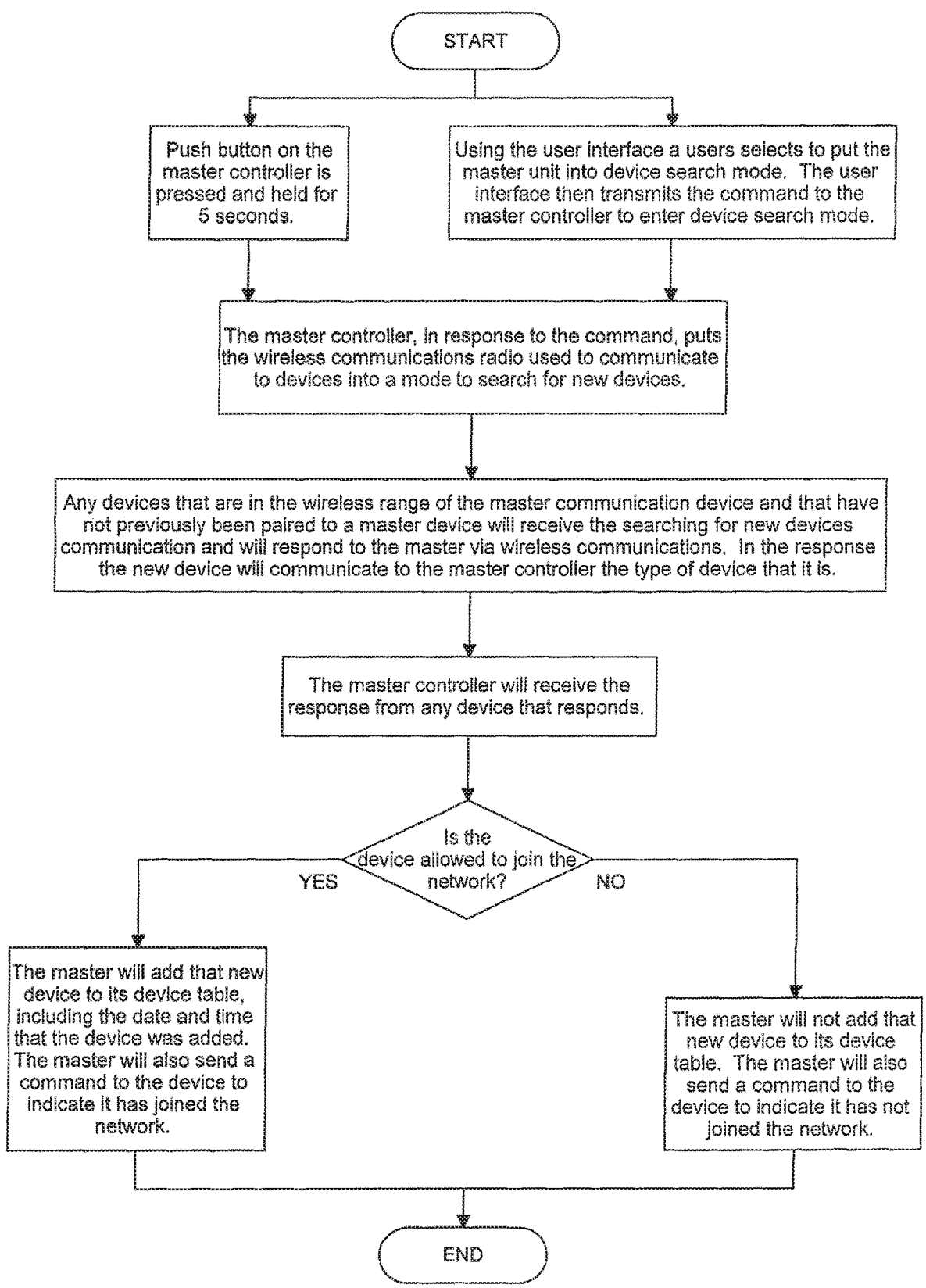
FIGS. 28-31 are exemplary logic flow diagrams that represent operations carried out through operation of the master controller, slave controllers and user interface devices of exemplary embodiments.

FIG. 28 is an exemplary flow chart which shows the high level activities executed by the master controller and the slave controllers in connection with the master controller establishing communication with slave controllers, and which is operative to configure the master controller and a respective slave controller to join in the local wireless network controlled by the master controller.

As represented in FIG. 28, in some exemplary embodiments the process of searching for and establishing connections with the slave controllers may be initiated by a user actuating a manual input device such as a button associated with the master controller. In other exemplary embodiments, a user interface device such as a separate portable tablet computer or other device may be utilized to provide one or more inputs that cause the master controller to be placed in a search mode. As described in FIG. 28, the master controller of an exemplary embodiment sends communications wirelessly and receives messages from devices that respond. New devices that have not previously been configured to communicate with the master controller send data that identifies their properties, functionality and/or associated device. Such messages may also include identifying data or other data which is indicative of whether the device is allowed to join the network. As can be appreciated, certain security features may be applied to the information that is communicated to assure that only appropriate devices are allowed to join in the wireless network. Further, communications with the devices may be encrypted via public key encryption or other suitable methods for purposes of securing the communications. As represented in FIG. 28, the master controller determines if the slave controller is allowed to join the network based on its functionality and other credentials. If so, the master controller adds the device to its device table and will communicate with the slave controller to indicate that it has been joined in the network. Alternatively, if the master controller determines that the slave controller does not qualify to be joined in the network, a message is sent to the slave controller indicating that it has not been joined in the network. Of course it should be understood that the approach represented in FIG. 28 is exemplary and in other arrangements, other approaches may be used.

In an example embodiment, the master controller is configured (e.g., programmed) to control each respective slave controller and the devices in the associated slave assembly based at least in part on the function data indicating the respective function of each slave assembly. However, it should be appreciated that even though the master controller is configured to control a plurality of slave controllers (and their respective devices), the implementation of the described system may include as few as one slave assembly.

Such a system may then be modified to include additional slave assemblies in order to expand the capabilities of the water management system.

In some exemplary implementations of the described water management system 1000, at least one of the slave assemblies may be in operative connection with a slave device 1600 that functions as a water management device 1320. As used herein, a water management device is a device that is operative to affect water that is moved through a water network 1240.

Such a water network in a household or other building may include a water source 1260 such as a connection to a well water source, reservoir, cistern, municipal water source, or other water source. The water network may also include water plumbing 1280 connected to the water source such as one or more water pipes through which water flows. In addition, the water network may include one or more water consumption devices 1300 connected to the water plumbing such as a facet, a hose bib, a sprinkler system, an ice maker, a washing machine, a dishwasher, a drinking fountain, or any other device that consumes or uses water.

In this described system, the master controller is operative to control the at least one slave assembly to cause the water management device to operate via communication of wireless messages with the at least one slave assembly. Examples of water management devices 1320 that are controlled by one or more slave assemblies may include water conditioners such as a water softener, a water filter, water sterilization device, contaminant oxidation device, a reverse osmosis device, an ultraviolet light treatment device, or any combination thereof or other devices that may be controlled as part of a slave assembly which may include valves, a pump, a tank, a water heater, a sump pump, a well pump, an ozone generator device, a re-pressure system, a gray water collection and reuse system, irrigation system or other device types including devices that are included in or separate from water conditioners.

In these examples, slave assemblies that are adapted to control water management devices via valves included in the slave assembly, may be referred to herein as slave valve assemblies 1400. Examples of devices 1600 that are operated and/or which may have the operative conditions thereof changed via a valve mechanism in a slave valve assembly, may include a water conditioner such as a softener or a water filter.

In addition, it should be appreciated that the described slave assemblies may include and/or may be in operative connection to a sensor. Such slave assemblies may be referred to herein as slave sensor assemblies 1420. Such sensor assemblies which communicate sensor data to the master controller are also referred to herein as transceivers. The sensors in connection with transceivers may be useful in the management of water in a water network or may be useful for other purposes unrelated to water management. The master controller 1020 may be operative to communicate and control a slave sensor assembly to retrieve data acquired by the sensor via communication of wireless messages with the transceiver associated with the sensor. In an example embodiment, such a sensor may include a salt sensor (for a brine tank), a moisture sensor, a water flow sensor, a video camera, a microphone, a motion sensor, a light sensor, a temperature sensor, an airflow sensor, a power sensor, a voltage sensor, an amperage sensor, a rain gauge, a water level sensor, a radon sensor, a smoke detector, a carbon monoxide detector, a humidity sensor, a pressure sensor, a flow sensor or any combination thereof. It should be understood that sensors may be included as part of water conditioners or other devices that are a part of a slave assembly that is controlled responsive to a slave controller that is associated with the particular device. Other types of sensors may not be integrated with a device that is controlled by a slave controller. Such sensors may be in operative connection with a transceiver which is operative to communicate with the master controller and provide messages including data that corresponds to one or more properties that are sensed through operation of the sensor. It should also be understood that such slave sensor assemblies may include processors, data stores and other capabilities that enable the sensor assembly to store, analyze, selectively report or otherwise provide capabilities related to sensed values in addition to sending messages that include data corresponding to sensed parameters.

In addition, some slave assemblies may include slave controllers adapted to control the supply of water to water management devices 1320 (or other devices 1340) via a relay included in and/or in operative connection with the slave assembly. As used herein, such slave assemblies may be referred to as slave relay assemblies 1440. Exemplary relays may be operative to control the delivery of electricity to or withdrawal of electricity from devices that operate in response to electrical power. It should be understood that in some exemplary embodiments, relays may change condition between supplying and not supplying power to a device. However, in other arrangements, relays may operate to change the nature of the electrical power supplied such as changing the voltage, amperage or other electrical properties of power delivered so as to control an electrical device. Examples of slave devices 1600 that may be controlled via a relay of a slave relay assembly may include a light source, a sound output device, a pump, a heater, a compressor, a motor, and/or any electrical device that can be operated or controlled through operation of a relay.

In addition it should be appreciated that some slave devices 1600 may be controlled via a secondary interface that is included in and/or in operative connection with the slave assembly. For example, other types of slave devices 1340 may include an external or remote electronic device such as a TV, home entertainment system, security system, a ceiling fan, or a home automation system, that are controlled via an infrared (IR) output, an RF output or other interface communication. In this example a slave assembly may include an interface component such as an IR/RF output device and/or an IR/RF remote control (and/or a wired controller), that is operative to output appropriate signals to control the slave device responsive to wireless signals from the master controller 1020. In these examples, slave assemblies that are adapted to control external and/or remote devices via an interface included in or in operative connection with a slave assembly, are referred to herein as slave interface assemblies 1460.

Figure 14:
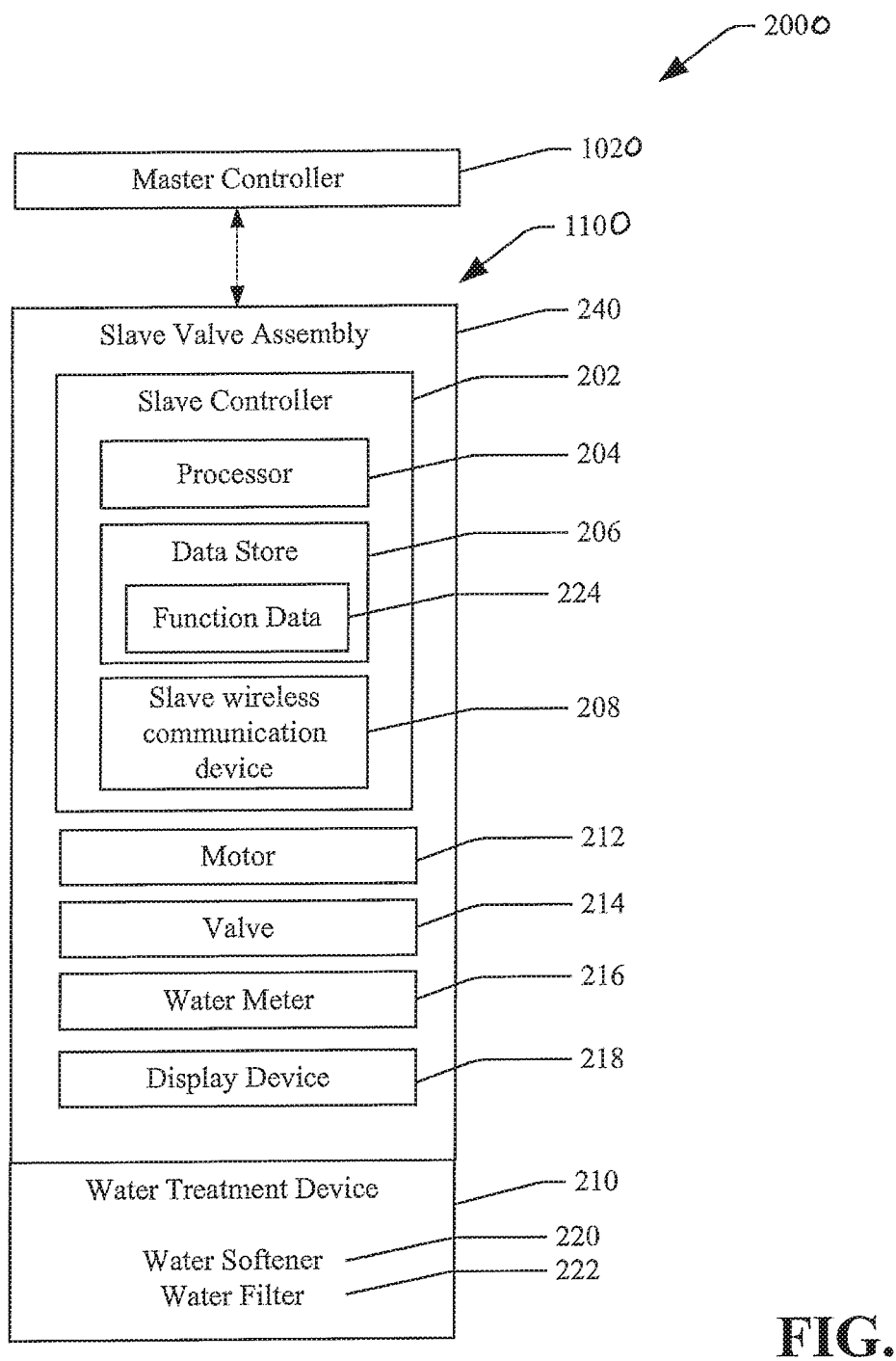
FIG. 14 is a schematic functional block diagram of an example slave valve assembly.

In example implementations, a typical water management system may include at least one water conditioner such as a water softener and/or a water filter. FIG. 14 illustrates a functional block diagram of a water management system 2000 having a slave assembly 1100 that is configured as a slave valve assembly 240. In this example, the slave valve assembly is operative to control a water conditioner 210 such as a water softener 220 or a water filter 222. Water conditioners may be alternatively referred to herein as water treatment devices.

As discussed previously, the slave assembly includes a slave controller 202 having at least one processor 204, at least one data store 206, and at least one slave wireless communication device 208 that enables the slave controller to wirelessly communicate messages with the master controller. In addition, as illustrated in FIG. 14, the exemplary slave valve assembly 240 further includes at least one motor 212 in operative connection with the slave controller. Also, the slave valve assembly 240 includes a valve 214 in operative connection with the motor 212 (e.g., via one or more gears). In this example, the master controller is operative to individually control one or more of the slave valve assemblies 240 to cause the respective slave controller 202 to cause the respective motor 212 to operate the respective valve element of valve 214 of each respective slave valve assembly via communication of wireless messages with each of the slave valve assemblies. In some exemplary embodiments, the exemplary valve may include a multi-port valve associated with a tank of a water conditioner like that described previously and in the incorporated disclosures. The tank may include filter media, ion exchange media, oxidation media or other types of materials or components as appropriate for the particular type of water conditioner. In the exemplary arrangement, the slave controller is operative to cause one or more valve elements such as a piston to be selectively positioned responsive to the slave controller. In exemplary embodiments, selectively positioning the piston or other valve element is operative to cause water to flow through selected passages or passageways associated with the valve. The selected flow through the valve is operative to place the valve and the water conditioner in various operational conditions. For example, in exemplary embodiments, valves may be placed in a service condition in which water to be treated enters the valve and passes through the tank so as to be treated. The water that has been conditioned by passing through the tank then passes back through the valve and is delivered to a water network connection which causes the conditioned water to be delivered to a water network for use by water consuming devices.

In some exemplary embodiments, the slave controller can cause the one or more valve elements to be positioned so as to cause the valve to place the conditioner in one or more regeneration conditions. A regeneration condition corresponds to a condition in which the function performed by the water conditioner is improved. This may include, for example, in the case of a water softener, regenerating the ion exchange media so as to more effectively carry out ion exchange. In some exemplary arrangements a regeneration may include a backflush condition wherein water is passed through filter media in a direction opposed from the normal filtering direction so as to remove contaminants from the filter media. In other exemplary arrangements, the regeneration condition may correspond to disinfecting media or components of the system. In still other exemplary arrangements, a regeneration condition may correspond to replenishing oxidizing material in the tank or otherwise positioning the valve in one or more conditions which may be operative to cause the water conditioner to undergo regeneration as appropriate for the particular water conditioning device. In some exemplary arrangements, the valve may be sequentially placed in a plurality of different regeneration conditions so as to enable regeneration of the water conditioner.

In some exemplary arrangements, the one or more valve elements of the valve may be positioned so as to be placed in a shutoff condition. Such a shutoff condition may correspond to the valve passageways being configured so that water is not passed through the valve to the tank and/or water from the tank is not delivered from the valve. Such a shutoff condition may enable turning off the water conditioning device and/or separating the water conditioning device from other components of the system.

In still other exemplary arrangements, the valve element may be positioned responsive to the slave controller so as to place the valve in a bypass condition. In such a bypass condition, untreated water is passed into and out of the valve without passing through the tank so as to condition the water. Such a bypass condition may be appropriate in situations where the current water use activity does not require conditioning or in other appropriate circumstances.

Of course it should be understood that these conditions of the valve which are described in detail previously and in the incorporated disclosures are exemplary of operative conditions which water conditioning devices may have in responsive to operation of a slave controller. It should be understood that these operative conditions are exemplary and in other arrangements, other arrangements and configurations may be used.

An example embodiment of the slave assembly associated with a water conditioner may include at least one water meter 216 in operative connection with the slave controller 202. The water meter 216 may be operative to take water flow measurements based at least in part on water flowing through the at least one water treatment device 210. The at least one master controller 1020 is operative to wirelessly receive messages including data based on the water flow measurements from the slave controller 202. In addition, the master controller may be configured to wirelessly communicate at least some wireless messages to the slave controller associated with the valve assembly 240 of the at least one water treatment device 210 responsive to the data based on the received water flow measurements.

For example, with respect to a water treatment device such as a water softener, the master controller may operate in accordance with its programmed instructions, data from the water meter and stored data to determine that the water conditioner should be placed in a regeneration condition. Responsive to the determination, the master controller wirelessly communicates messages that cause the valve assembly of the water softener to change operational conditions to carry out a regeneration process based on water flow measurements from the water meter. In this example, the master controller may cause the valve to change the operational condition to initiate a regeneration process when the number of gallons of water that have been softened (as measured by the water meter) since the last regeneration process has exceeded a predetermined threshold. In other exemplary embodiments, the master controller may operate responsive to data received from sensors or other devices that communicate via slave controllers and/or transceivers to determine a need for a water conditioner to undergo a regeneration process.

For example in some arrangements, measurements of contaminants in water may be detected through operation of sensors and the data communicated via wireless messages to the master controller. The master controller may operate in accordance with its programming to analyze the data and compare current data to program or stored data which is indicative of a need for the water conditioner to undergo regeneration steps. Responsive to making the determination, the master controller may then cause the operational condition of one or more valves to be changed to accomplish such regeneration. Further, it should be understood that in exemplary arrangements, the master controller may cause the slave controller and associated valves or other devices to undergo a series of operations in order to accomplish regeneration of the water conditioning device. This may include, for example, the water conditioning device being subject to operational conditions such as backflow, purge, rinse, disinfect, introduce sterilization materials, delay, purge or other operational conditions associated with the particular regeneration process.

Figure 30:
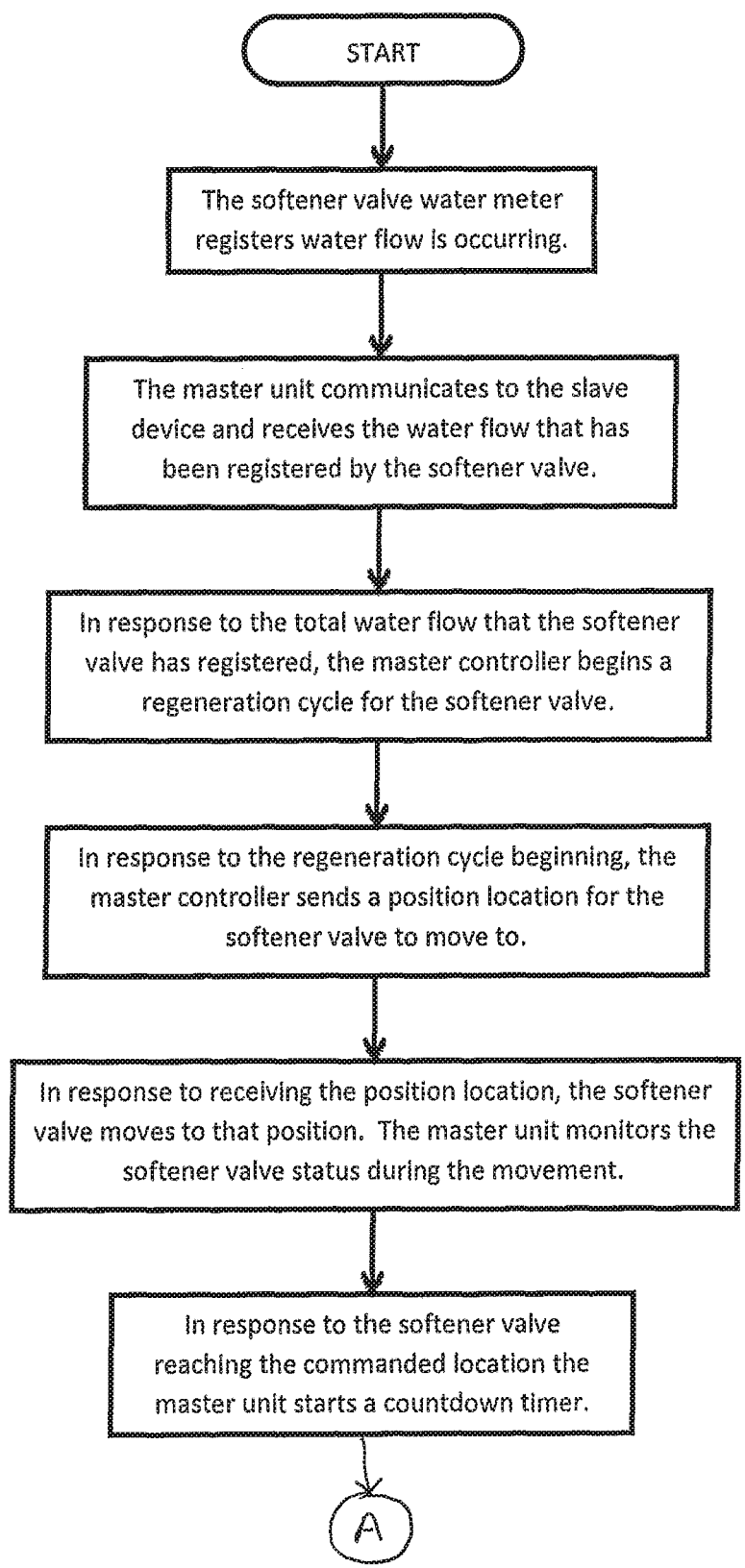
Figure 31:
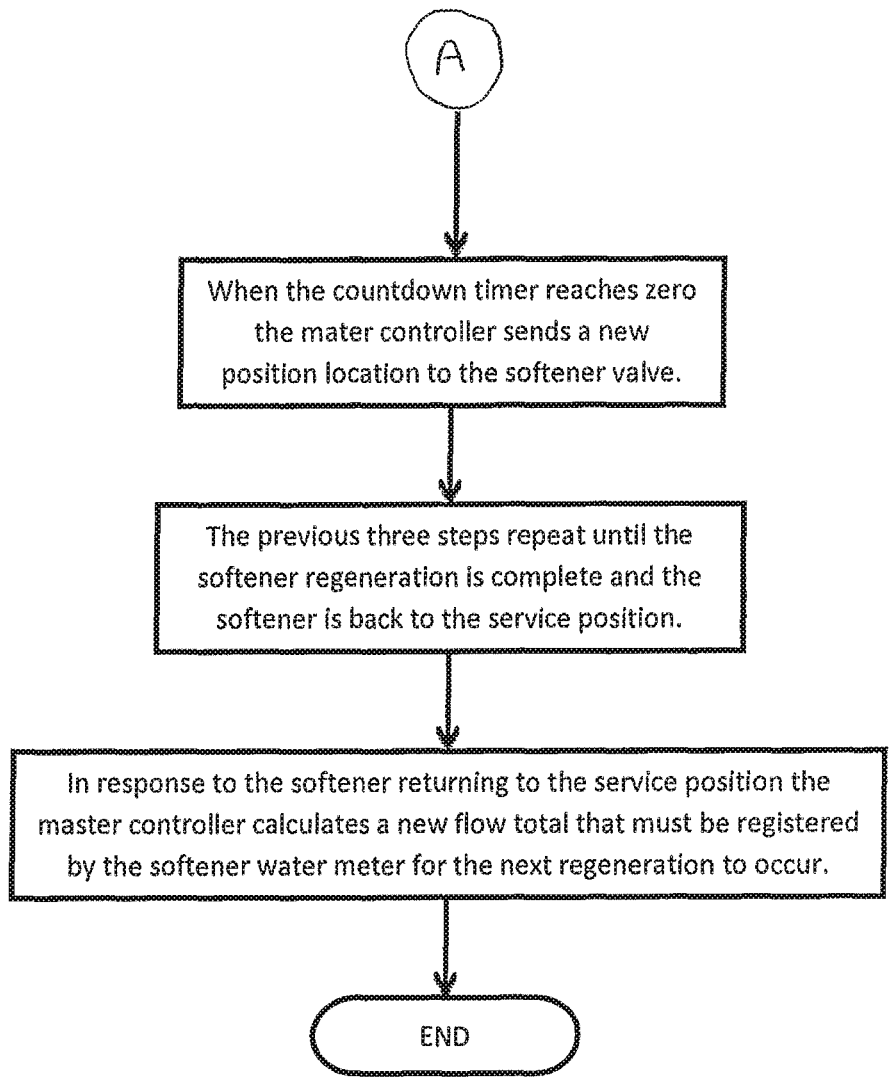

FIGS. 30 and 31 represent a logic flow carried out in connection with an exemplary water conditioner which in this case is a water softener. As represented in this exemplary logic flow, water flow is measured through operation of the water meter and messages including data regarding the flow of water is communicated by the slave controller associated with the water softener to the master controller. The master controller operates in accordance with its programming to determine if the volume of water that has been conditioned through operation of the water softener has reached a level where regeneration of resin exchange media used in connection with the water softener is required. This is done in accordance with the programming of the master controller or alternatively may be carried out in connection with programming associated with the slave controller or both.

Responsive to determining that the water flow conditions and other conditions have been met to cause the water softener to undergo a regeneration cycle, the master controller is operative to send messages to the slave controller which operate to change the operational condition of the valve. The slave controller operates responsive to the wireless messages from the master controller to operate the motor and cause the valve to be changed by moving the one or more valve elements to a position corresponding to a regeneration condition. In the exemplary embodiment, the valve associated with the water softener includes an optical encoder or other suitable sensor for determining the position of the valve element. The slave controller is in operative connection with the positioning sensor and determines based on signals from the sensor, the position of the particular valve element. In the exemplary embodiment the slave controller is operative to send messages to the master controller indicating that the valve element has been moved to a particular position corresponding to an operational condition of the valve.

In the exemplary embodiment the messages indicating that the valve has changed to the desired regeneration condition, causes the master controller to begin operating a timing function. The timing function is selected based on the particular regeneration cycle associated with the particular regeneration step which the water softener is to undergo. At the completion of the time associated with the timing function, the programming associated with the master controller makes a determination that the water softener valve is to be moved to cause the water softener to be in a different regeneration operational condition. In response to making this determination, the master controller sends wireless messages to the slave controller which causes the valve element to change the condition. Again a sensor associated with the valve is operative to sense the position of the valve element and to cause the slave controller to send messages to the master controller to indicate that the valve has now changed the softener to the second operational condition associated with regeneration of the water softener.

In the exemplary embodiment three different operational conditions are associated with the regeneration of the ion exchange media associated with the water softener. The master controller operates in accordance with its programming to cause the water softener to be in these regeneration conditions for timed periods appropriate for each of these three steps. At the completion of the regeneration steps, the master controller then operates in accordance with its programming to send wireless messages which cause the slave controller to change the valve and cause the softener to be in the service condition in which water is again conditioned by being passed through the associated water softener tank. The sensor associated with the valve element also verifies that the valve has been returned to the position associated with the service condition and the water softener is properly returned to the treatment condition. Of course it should be understood that these particular steps represented in FIGS. 30 and 31 are exemplary and for other types of water conditioners or other devices, other or different steps may be used.

Also, as discussed previously, depending on the type of water treatment device, the data store 206 of the slave controller may be configured (when manufactured) to include function data 224 representative of the functions that the water treatment device is intended to carry out. Thus, a water treatment device in the form of a water softener may have function data stored in the data store 206 that indicates that the slave valve assembly controls a water softener type control valve. Also, a water treatment device in the form of a water filter may have function data 224 stored in the data store 206 that indicates that the slave valve assembly controls water filter type control valves. Such function data enables the master controller to use the appropriate programming needed to operate the corresponding type of water treatment device. In addition, as previously discussed, slave controllers may also include data that is usable to identify the particular slave controller as one that is authorized to communicate with the master controller and operate as part of the system. Such identification data may include digital certificate data or other data that helps to assure that only appropriate devices are authorized to communicate in the system. Further, such slave controllers may be configured to use encryption or other methodologies to help assure that the system is secure. For example, public key encryption methodologies including the loading and use of digital certificates in the data stores of the controllers or other techniques may help secure the messages between the master controller and the slave controllers in some exemplary embodiments to help provide enhanced security. Of course it should be understood that these approaches are exemplary and in other arrangements, other approaches may be used.

In an example embodiment, the valve 214 of the slave valve assembly of the at least one water treatment device includes or corresponds to a multi-port valve such as valve 10 and valve 110 previously discussed. Such a multi-port valve may be placed in a plurality of different configurations or states via operation of the motor 212. Some exemplary valves in such different states may cause the water treatment device to carry out different functions depending on the type of the water treatment device. For example, a water softener type of valve in different configurations/states may place the water softener in different operational conditions such as a service condition to soften water from a supply and deliver the treated water to a connection to a water network; a shut off condition to prevent water to flow from either a supply of untreated water or softened water; one or more regeneration conditions to regenerate the water softener, a bypass condition and/or carry out other actions. In exemplary arrangements, regeneration of the water softener may be in several different positions/states of the water valve in order to carry out the different operations included in a regeneration process (e.g., flushing resin beads in a resin tank with a brine solution, backflushing the resin tank, and/or other actions that enable the softener to improve its operation softening water). It should also be noted that the master controller may be configured to send wireless communications to the slave controller which cause the valve to change the water softener between these different operational conditions. Examples of water softener multi-port control valves that may be adapted for use in exemplary slave valve assemblies may be similar to those previously described herein or as shown in U.S. Application No. 61/986,423 and/or 62/119,507 the disclosures of which are incorporated herein by reference in their entirety. Such a multi-port valve has a housing that includes an axially movable piston and several ports (e.g., an untreated water inlet port, a treated water outlet port, a drain port, a port to a resin tank, and ports to and from a brine tank). The motor associated with valve assembly is operative to move the piston between a plurality of different positions in the housing; different positions form different water pathways between the ports in the housing. Further, exemplary embodiments include sensors such as optical encoders or other sensors that are operative to sense the position of valve elements or otherwise indicate a current configuration of the valve.

Also, it should be appreciated that other types and configurations of softener type valve mechanisms may be adapted to include the features described herein of a slave valve assembly. It should also be noted that an example method may include modifying an existing water softener by: removing an existing control valve mechanism (which does not interface with the described master controller) from an existing resin tank; and installing one of the described slave valve assemblies (which does interface with the described master controller) to the existing resin tank. The method may also include installing the described master controller within wireless range of the slave valve controller in order to enable the master controller to cause the water softener to operate to soften water. The new slave controller and valve positioning assembly may then be connected with and operate in coordinated relation with the master controller in a manner like that previously described.

Figure 15:
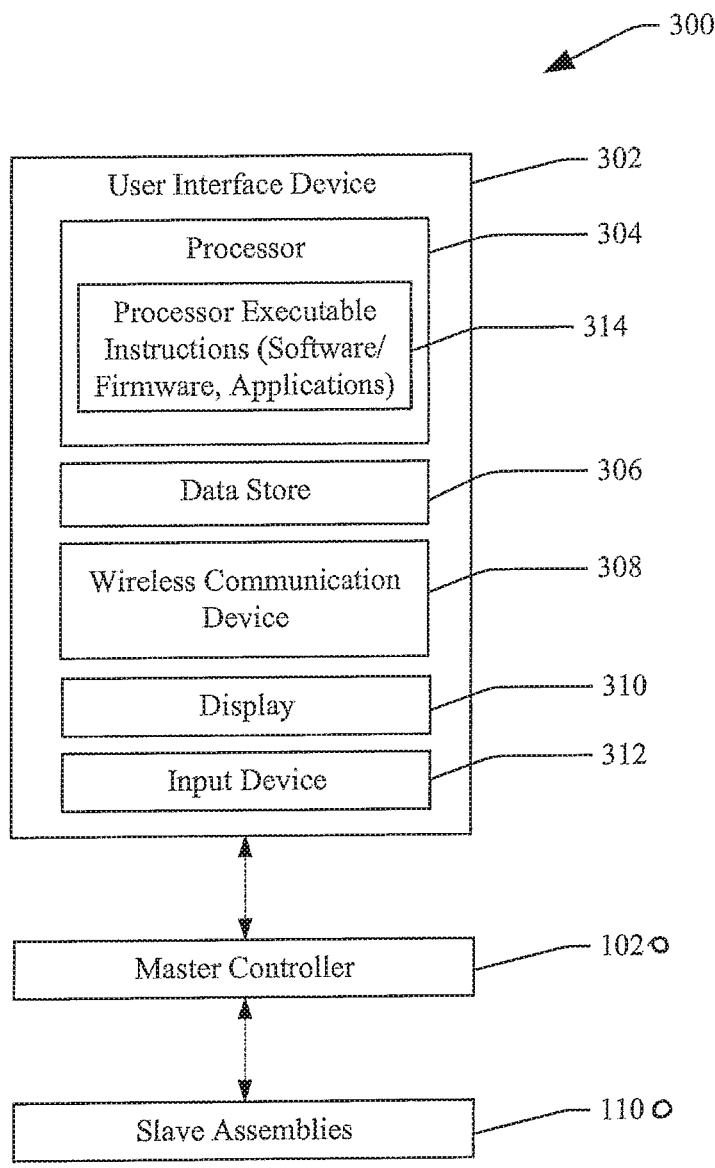
FIG. 15 is a schematic functional block diagram of an example user interface device in the system.

FIG. 15 illustrates an example embodiment of the described water management system 300, which includes the previously described master controller 1020 and one or more slave assemblies 1100. This example embodiment includes a user interface device 302 that is operative to wirelessly communicate with the master controller. Here the user interface device may include at least one processor 304. Processor executable instructions 314 may executed by the at least one processor to cause the processor to process data and carry out other actions. The user interface device may also include at least one data store 306 (RAM, flash memory, SSD), and at least one wireless communication device 308 (e.g., a Wi-Fi and/or Bluetooth radio). The user interface device may also include at least one display device 310 (e.g., LCD, AMOLED displays) and at least one input device 312 (touch screen, physical keys, track pad, mouse). In an example embodiment, such a user interface device may correspond to a tablet type device (e.g., an Apple iPad, Apple Ipod touch, Google Nexus 9), a mobile phone, (e.g., an Apple iPhone, Google Nexus 6), a notebook computer, a desktop computer, or any other device that may be operative to wirelessly communicate with the master controller. In these examples, the master wireless communication device of the master controller may include a module capable of sending and receiving Near Field Communication (NFC), Wi-Fi and/or Bluetooth communications (or multiple communication types) with one or more user interface devices.

In an example embodiment, the user interface device may include computer executable instructions in at least one data store comprising an application (such as a water management application) that is specifically programmed to cause the processor in the user interface device to display information from the master controller and to send commands to the master controller. For example, such an application may display status information associated with the water softener (e.g., number of gallons used per day), any warnings associated with devices (e.g., low salt in a brine tank), and/or any other information that is available from the master controller responsive to wireless messages from the master controller.

Also, for example, the described water management application may cause outputs on the display of the device of one or more selectable options that can be selected through use of an input device of the user interface in order to send a wireless command to the master controller to take some action. Such an action may involve the master controller sending a further wireless message to a slave assembly, which in turn causes an associated slave device to carry out a function.

For example, a water softener may be adapted to change from a current service mode of operation to another mode of operation (via operation of the valve) in which all water output from the water softener is either shut off (prevented) or turned back on (permitted). The slave valve assembly of the water softener may be configured to operate the valve of the slave valve assembly to selectively permit and prevent water to flow to the water network, responsive to wireless messages received from the master controller. The application on the user interface device may include a selectable option to shut off water to a user's house. When this option is selected, the user interface device causes at least one wireless message to be sent to the master controller. The master controller responsive to the at least one message from the user interface may cause at least one further wireless message to be communicated from the master controller to the slave valve assembly of the water softener, which causes the water softener to change between the modes which permit or prevent water from the water softener to flow to the water network of the house.

Figure 32:
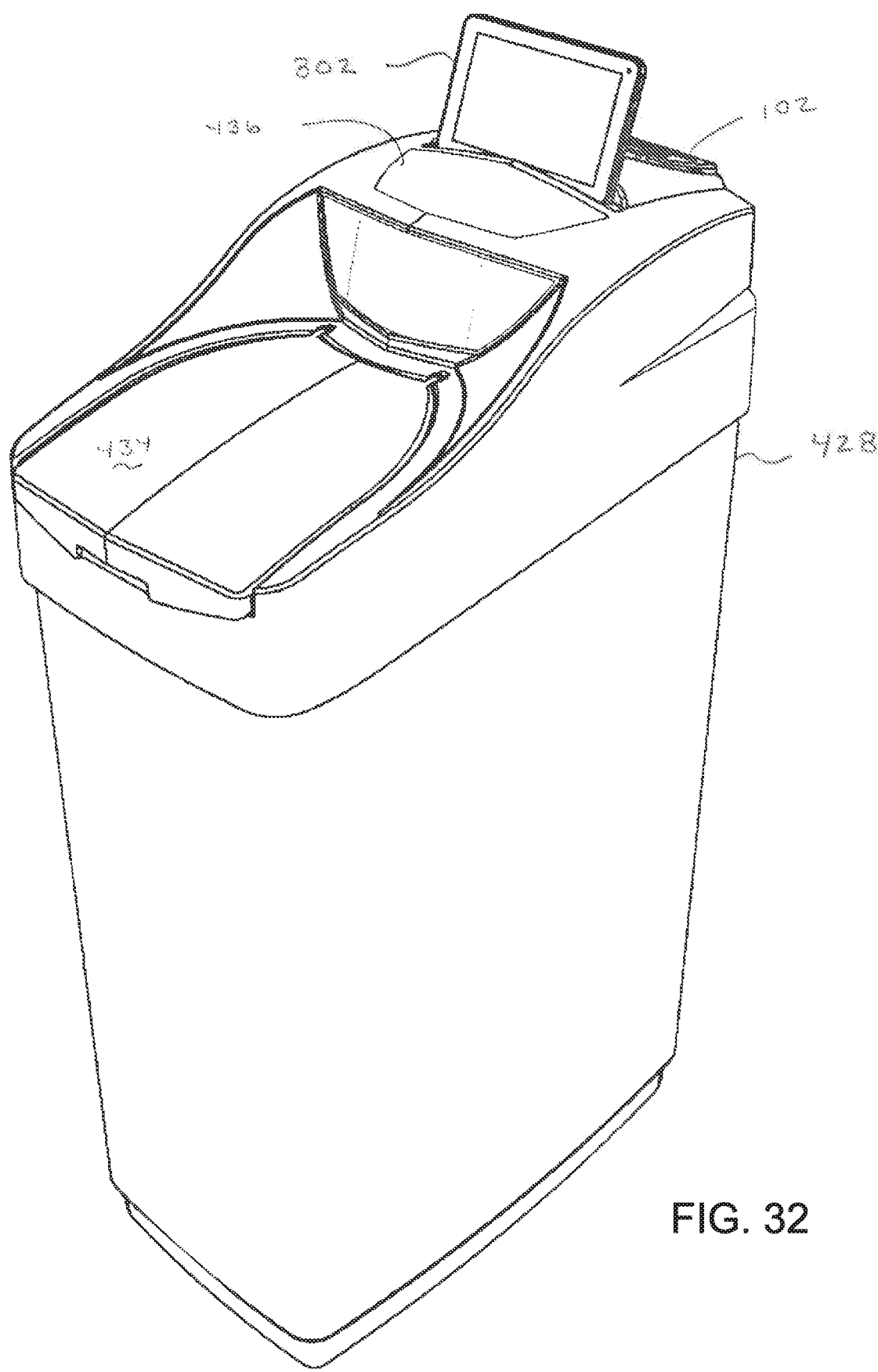
FIGS. 32-35 are views of an exemplary cabinet used for housing a water conditioner and also supporting an exemplary master controller and user interface.
Figure 33:
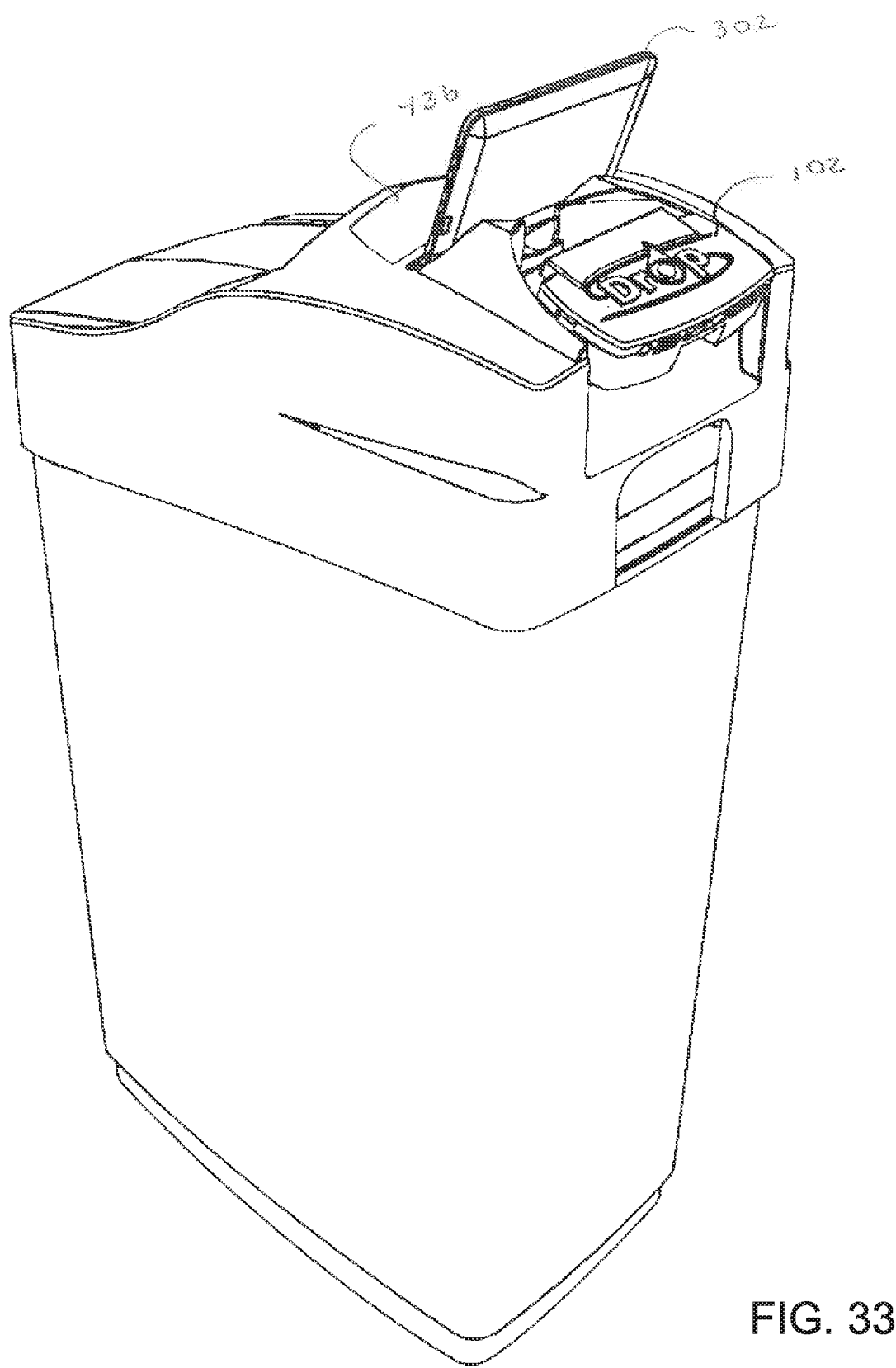
Figure 34:
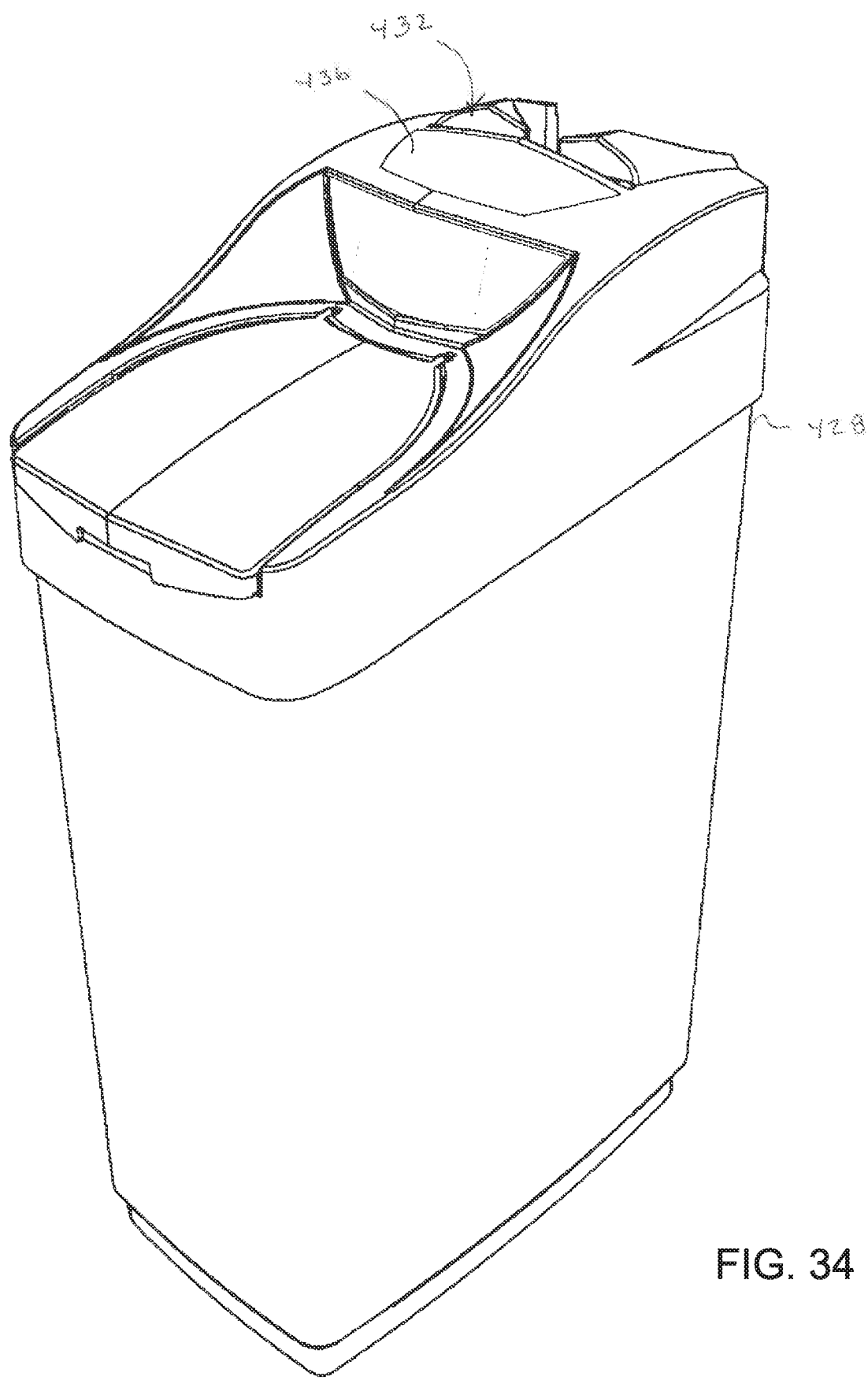

FIGS. 32 and 33 show an exemplary user interface device 302 which in this exemplary embodiment comprises a tablet computing device. The exemplary interface device is removably positioned in a pocket within the top area of a cabinet 428. The exemplary cabinet 428 is configured to house water conditioning equipment such as a water softener, a water filter, a brine tank or other water conditioning apparatus. The exemplary cabinet 428 includes a pocket 432 shown without the user interface device in FIG. 34 which is sized to releasably accept the user interface device therein. Further, the exemplary cabinet further includes a pocket 430 shown in FIG. 35 that is sized to accept a master controller 1020 therein which is represented in FIG. 32. In exemplary arrangements, the cabinet includes electrical connectors or contacts in the respective pockets that enable charging the batteries in the master controller and the user interface. In alternative exemplary arrangements, the pockets may include inductive coils adjacent thereto or other suitable devices which can be used to contactlessly provide electrical power to the user interface device and/or the master controller. Of course it should be understood that these Figures are exemplary and in other arrangements, other approaches may be used.

Figure 35:
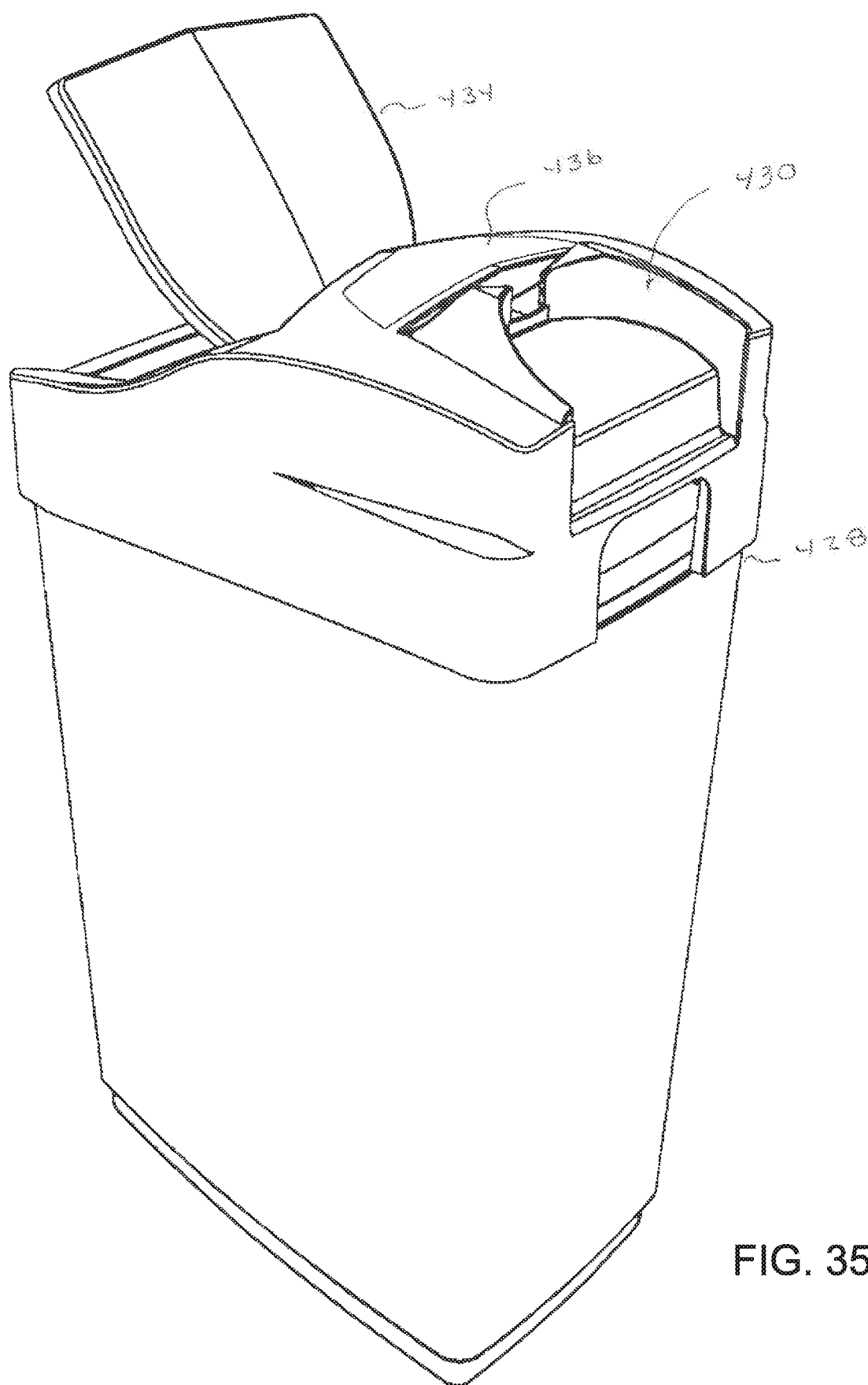

Exemplary cabinet 428 further includes a door 434 which is shown in an open condition in FIG. 35. The door 434 may be used to access the interior of the cabinet and the water conditioning equipment therein. For example, the door may be opened to enable a user to add salt to a brine tank. In other embodiments the door may be used for purposes of changing filter media or for other purposes. The exemplary cabinet 428 further includes a translucent window 436. In exemplary embodiments, the translucent window may be utilized for purposes of allowing a user to view externally illumination type indicators associated with equipment located inside the cabinet. For example in some exemplary arrangements, light emitting diodes (LEDs) may be associated with a circuit board associated with valves or other components. The LEDs may provide different color or other indications which indicate the particular condition of the device. For example, in some arrangements, the LEDs may flash certain colors or in certain patterns to indicate that the water valve is in particular conditions. In exemplary arrangements a user may be able to tell the current condition of the equipment within the cabinet by viewing the appearance of the window 436. Further in exemplary arrangements, outputs from the interface device 302 may also correspond to the indications given by the device. Thus a user viewing the interface device may through appropriate inputs, view the particular outputs that correspond to those outputs that are visible through the window to understand that the equipment within the cabinet is in the condition indicated on the screen of the interface device. Alternatively or in addition, such visible outputs may be used to indicate malfunctions or needs for remedial actions. Of course these approaches are exemplary and in other arrangements, other approaches may be used.

Figure 29:
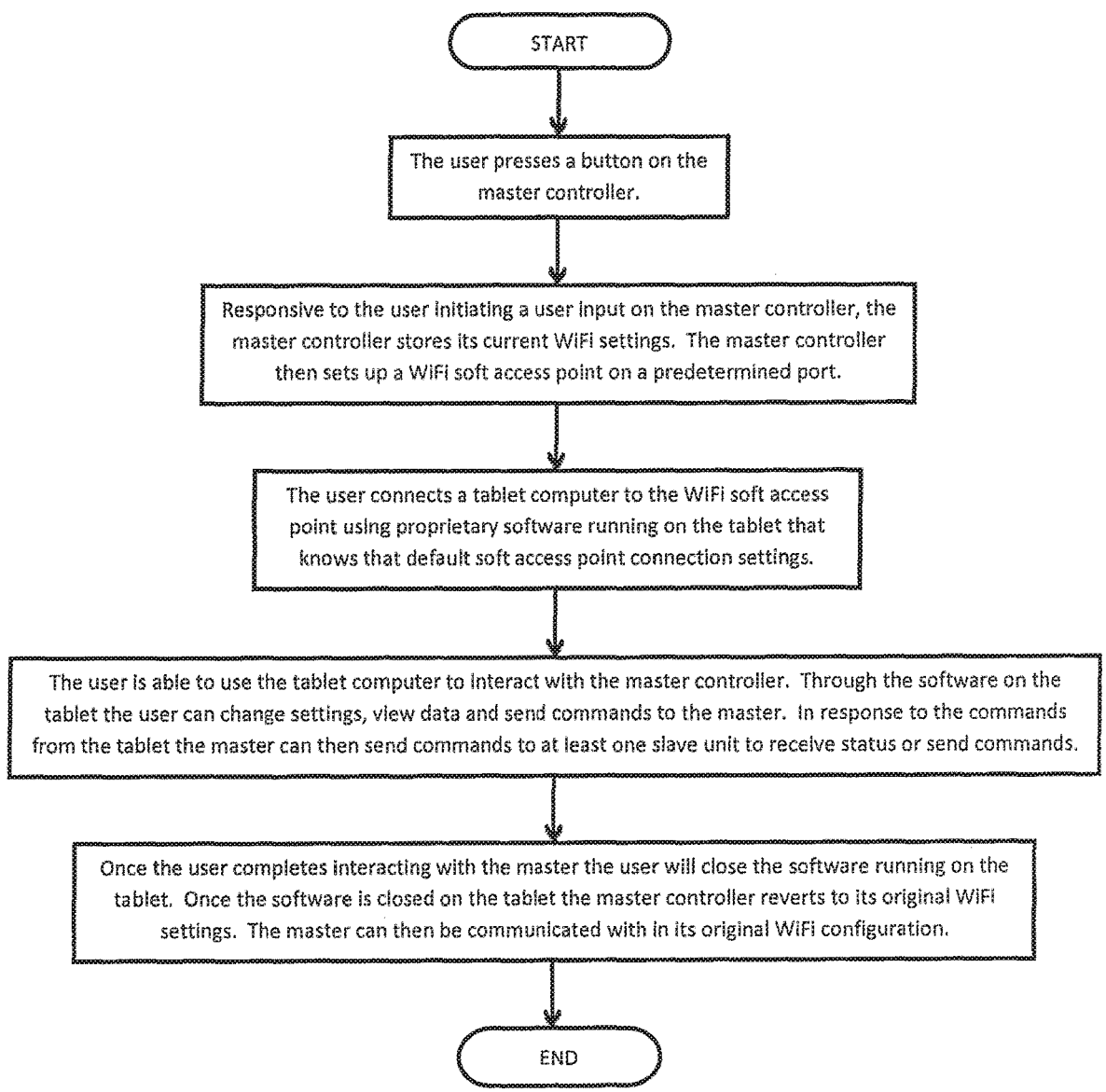

In the exemplary arrangement, the master controller and the interface device may be placed in operative communication by a user of the water conditioner system. This may be done for example when a user decides to upgrade a water conditioner system to incorporate a user interface device. Alternatively such a procedure may be done when a user has decided to incorporate an additional interface device into their system. FIG. 29 schematically represents the logic flow associated with an exemplary arrangement where the master controller commences operation in connection with the user interface device. In this exemplary arrangement, a user presses a button or other manual input device on the master controller 1020. In response to this action, the master controller operates in accordance with its programming to store its current settings. The master controller then operates to set up a soft access point on a predetermined port. The user then operatively connects the user interface device which in this case is a tablet, to the WiFi access port. This is done through operation of the user interface device operating an application that is configured with the soft access point utilized by the master controller. The application also includes or is able to resolve the connection settings which enable the user interface device to communicate with the master controller.

Once the user interface device has operatively connected with the master controller, the user is enabled to use the interface device to interact with the master controller. Through inputs through the touch screen or other user interface on the tablet, the user can change settings, view data and send commands to the master controller. Such commands may include shutting off certain devices, placing devices in a bypass condition or otherwise controlling slave assemblies and the associated devices that are connected in the wireless system with the master controller. In response to inputs made by a user through the user interface device, the master controller is operative to receive the messages and then cause wireless command messages to be sent to the respective slave controllers to carry out the commands or otherwise change the operational conditions thereof.

In the exemplary embodiment once the user has completed the changes to the devices of the system through inputs of the user interface device, the user is enabled to sign off the user interface application. Responsive to the user indicating that it has ceased making changes to the system, the messages from the user interface device are operative to cause the master controller to revert to its original WiFi settings. This enables the master controller to be communicated with in its original WiFi configuration. Alternatively or in addition, exemplary arrangements may enable the application that operates on the user interface device and/or the master controller to maintain the operative connection with the user interface device as part of the configuration settings for the master controller. This enables the user interface device to be utilized to control the system without the need to further initialize communications between such devices.

Further in other exemplary arrangements, the master controller may be operative to communicate with devices other than a dedicated tablet computer associated with the water management system. For example in some exemplary arrangements, the user interface device may include a portable user device that operates either in the local area network or connected networks that can be accessed by the master controller, or alternatively devices that may be connected through the master controller through a wide area network.

In the example described above, such a selectable option to turn off water to a household network is something that may optimally be done when the user is traveling on a vacation or business trip via using a user interface device in the form of a mobile phone (or other portable user device). When the user returns, the user may use the user interface device comprising the mobile phone, tablet (or other device) to select the selectable option that causes water to be turned back on in the household.

It should also be appreciated that in additional or alternative embodiments, the master controller may be operative to communicate with a user interface that does not include a programmed application dedicated to interfacing with the master controller. Rather, the master controller may include and/or be in operative connection with a web server that is operative to output web pages that provide the status information and the user selectable options such as those discussed previously through a web browser of the user interface device.

It should also be appreciated that regardless of whether a dedicated application or a web services application is used to interface with the master controller, each of these methods may require user authentication (via user ids, passwords, certificates) and may use encrypted communication protocols (e.g., HTTPs). In these examples, the master controller may be operative to connect with (and/or pair) with a user interface directly in a peer to peer Wi-Fi, NFC or Bluetooth mode. However, it should also be appreciated that the master controller may also be configurable to log into an existing Wi-Fi LAN in order to enable wired or wireless devices on the LAN to be operative to communicate with the master controller.

In addition, it should be appreciated that the master controller may be operative to be controlled via user interfaces that are outside the LAN, such as a mobile phone connected to the Internet outside a home or facility where the master controller is located. In order to provide access to the master controller from outside the LAN, a router-firewall associated with the LAN could be configured to open one or more ports that facilitate communicate between the user interface device and the master controller. However, in another embodiment, to avoid requiring firewall ports to be opened on a LAN in this manner, the master controller may be configured to continuously or periodically open communications with a remote server on the Internet. The remote server may be accessible by user interface devices on the Internet and provide a conduit to pass communications between the master controller and the user interfaces. Of course these approaches are exemplary and in other embodiments other approaches may be used.

This described exemplary remote server may provide communications for many master controllers in different homes or other buildings. The remote server may include storage media including computer executable instructions including a server management application that provides web accessible user accounts associated with one or more master controllers. One or more master controllers may then be paired to a particular user account via the input of a pair code at the master controller and/or the server management application. The previously described application executed on the user interface device may then log into the remote server with a user account user id and password or other authorized credentials in order to be able to access the status information and selectable options that are available with the paired master controller associated with the user account.

As discussed previously, example embodiments of the water management system may include a water meter that is operative to measure an amount of a water flow. Such a water meter may be integrated into one of the slave assemblies. For example, a slave valve assembly for a water softener or a water filter may include a water meter that is operative to generate water flow measurements with respect to water flowing out of treated water ports of the valve mechanism of the slave valve assembly. In some embodiments the water meter may measure water volume, current water flow rate or both.

In addition, the master controller may include a clock application that is operative to output clock data usable by the master controller to determine the current time, date, and/or day of the week. With such clock data, the master controller may be configured to: calculate; store in the data store; and report water volume usage for one or more different time periods to the user interface device responsive to the data based on the water flow measurements. Also, with such clock data, the master controller may be configured to determine a water usage pattern with respect to time responsive to the data based on the water flow measurements. The master controller may then take one or more actions responsive to a determination by the master controller that current data based on the water flow measurements is higher than the determined water usage pattern. For example, the master controller may be operative to compare data based on current water flow measurements to averages of data stored in the data store that are based on past water flow measurements in order to determine that there is a deviation between current and past water usage that is indicative of a problem. In some arrangements the master controller may compare current flow rates to pattern flow rate, volume usage over a period of time to volume usage over a similar time in the pattern, or other flow properties.

On some embodiments, the master controller may be configured to automatically send at least one wireless message to the slave controller of a water softener (or other slave valve assembly), to control the flow of water (e.g., to control the flow of water either to the at least one water softener; from the at least one water softener; or a combination thereof) responsive to a determination by the master controller that current data based on the water flow measurements is not consistent with the determined water usage pattern. For example, the master controller may cause the water valve to move to a shut off condition.

In addition or alternatively, the master controller may be operative to cause a warning message regarding the detected unusual water usage pattern, to the previously described user interface device and/or to a portable user device such as a smart phone or via other methods such as by sending an SMS message and/or an e-mail. In such embodiments, a telephone number or e-mail address to send the warning message to the portable user device may be stored in the data store of the master controller.

For example, the master controller may be operative responsive to its programming to determine that current water usage level from a water conditioner is more than a predetermined threshold percentage (e.g., 50% or other percentage threshold) compared to an average water usage over a period of the last month. When such a large rate of flow is detected, the master controller may be operative to wirelessly communicate a warning message to the user interface device and/or to send a message to a portable user device (or via an SMS message or e-mail) that warns the user of the significant rate of water usage.

Such an increase in water usage may be normal (such as when a pool is being filled or a lawn is being watered, or siding is being washed) and the user receiving the warning may choose to take no action. However, if softened water is not necessary for the water use activity, such as watering a lawn, then the user may choose to take some action with the water management system via the user interface device or using a user's portable user device.

For example, a water softener may be adapted to change from a current mode of operation to another mode of operation (via operation of the valve mechanism) in which water output from the water softener is changed between either softened water (e.g., water processed by water softener) or non-softened water (e.g., water from a well that has not been processed by the water softener). The slave controller of the water softener may be configured to cause the valve to selectively switch to a bypass operational condition, in which the valve changes from delivering softened water to non-softened water to the water network, responsive to wireless messages received from the master controller.

The exemplary application on the user interface device may include a selectable option to switch from delivering softened water to non-softened water and vice versa, to the water network of a user's house. When one or more inputs to the user interface device are provided selecting the option causes wireless messages to be sent to the master controller, which causes a further wireless message to be communicated from the master controller to the slave controller of the water softener, which causes the water softener to change between the conditions which provide either softened or non-softened water from the valve to flow to the water network connection of the house.

In the case of watering a lawn, for example, the user may provide inputs corresponding to the user selectable option of a user interface device to cause the water softener to switch to outputting non-softened well water to the water network. When the user is done watering the lawn, the user may provide inputs to the user interface device to select the selectable option that causes the water softener change its operational condition to deliver softened water again.

Also, it should be noted that if the user receives a warning via the user interface device or to a portable user device (such as text message or e-mail), regarding an unusual increase in water usage, the user may not know a reason for this increase. In such cases, there may be a broken pipe or a watering hose may have been left on inadvertently. In such circumstances, the user may operate the user interface device of the portable user device as described previously to cause the water to be turned off in the house (via the valve in the water softener) in order to minimize damage to the house and/or the loss of excessive amounts of water.

An example embodiment of the master controller may be operative in accordance with its programming to compare data based on current water flow measurements to data stored in the data store based on past water flow measurements in order to make determinations as to appropriate thresholds for water usage conditions that may correspond to problems that should be reported to a user. For example, large fluctuations of water usage on a weekly or monthly basis may be normal for a household in which individuals are traveling frequently. In such cases the master controller may analyze such data and may calculate when to trigger a warning regarding excessive water usage based on historical peak water usage instead of historical average water usage.

In addition, an example embodiment of the master controller may be operative to evaluate water flow data in order to determine the presence of periodic changes in water flow that may be indicative of a toilet with a leaking flap valve. For example, a toilet with a leaky flap valve may continually leak water which causes the toilet to refill its tank with water every couple of hours, day and night of every day. Thus, every few hours the flow meter of a slave valve assembly may measure the usage of 1-3 gallons of water on a consistent periodic basis. The master controller may be operative to detect such periodic water flow usage and cause a wireless message to be sent to the user interface device or a portable user device (such as an SMS or e-mail message) which warns a user of a possible leaky toilet. Data corresponding to other types of anomalies may be stored in connection with the master controller so that when such conditions occur the probable cause can be identified and reported through a user interface device.

In addition, an example embodiment of the master controller may be configurable by a user to select between different methods and/or threshold percentages for when the master controller makes a determination to send a warning regarding excessive or undesirable water usage. The previously described application for the user interface device (or the master controller provided web interface pages) may include a settings screen in which settings regarding alarms, warnings, thresholds and other configuration parameters for the master controller can be changed via user inputs to the user interface device and/or a portable user device.

In addition, the master controller may be operative to store data in the data store representative calendar data, such as the dates and times (which may include certain days of the week, months of the year or particular years) at which certain actions should be taken (such as modifying a water flow). The master controller may be configured to send at least one wireless message to the slave controller of a water softener (or other slave assembly), to control the flow of water to the at least one water softener from the at least one water softener or a combination thereof, responsive to a current time and the calendar data. For example, the master controller may be operative to store data representative of a date and time in the data store regarding times when the master controller is to cause water to be shut off or turned back on. This may be for example programmed time periods when the house or other facility is scheduled to be unoccupied. Further, such date and times may specify when the master controller is to cause a switch between the output of softened water and non-softened water.

It should also be appreciated that example embodiments of the described water management system may include further slave valve assemblies in addition to the slave valve assemblies associated with a water softener or a water filter. Such further slave valve assemblies may be operable to control the flow of water for at least one of: to or from, the at least one water softener device responsive to wireless messages received from the master controller. In addition, the master controller may be configured to wirelessly communicate at least some wireless messages to the further slave valve assemblies responsive to the data based on the water flow measurements received from the water softener or other slave assembly.

Figure 16:
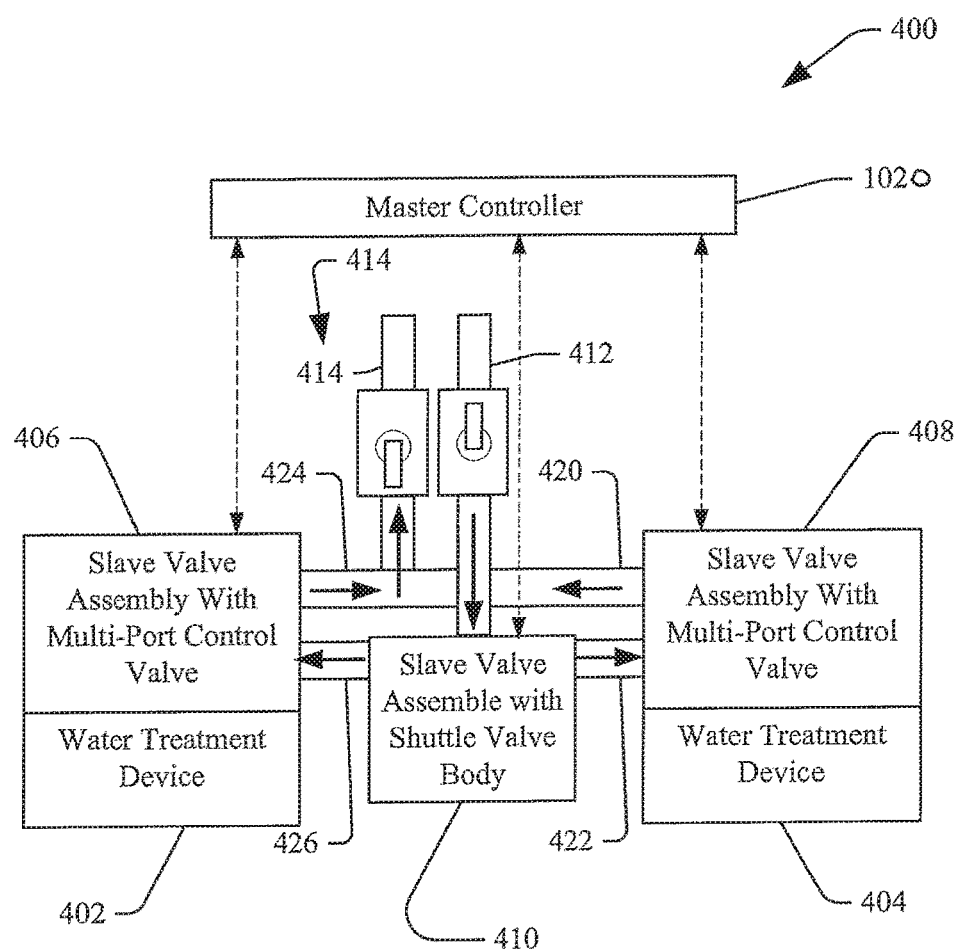
FIG. 16 is a schematic functional block diagram of an example dual device configuration.

For example, as illustrated in FIG. 16, a water management system 400 may include two water treatment devices 402, 404 (such as two water softeners or two water filters or other types of water conditioners) in order to increase the amount of water that may be treated in a given amount of time. Alternatively, such water conditioners may be used so that water can be conditioned by one water conditioner while the other water conditioner undergoes regeneration. Each of these water treatment devices may include respective slave valve assemblies 406, 408, which each include slave controllers, motors, valves and other components as previously discussed.

In order to manage the operation of the two water treatment devices (such as with respect to timing and water routing), this exemplary system may include at least one further valve (such as a shuttle valve) that is operative to selectively provide untreated water to the respective valve mechanism of the two water treatment devices. Examples of arrangements of water treatment devices and a further valve having one or more of the features described herein include the manifold and bypass valve assemblies shown in U.S. Application No. 61/986,423 filed Apr. 30, 2014, which is incorporated herein by reference in its entirety.

In this example, the described further valve may be packaged as part of a further slave assembly 410. Although the valve type of the further valve (e.g., a shuttle valve) may be different than the valve types of the water treatment devices (e.g. multi-port control valves), each of these three slave valve assemblies may be individually controlled by the master controller 1020 through wireless communications. In particular, the further slave valve assembly 410 may be configured to selectively direct untreated water from a water source 412 to at least one of the first water treatment device, the second water treatment device, or a combination thereof responsive to wireless messages received from the master controller 1020.

For example, by controlling the flow of water via the further slave valve assembly 410 to selectively each of two water softeners, the master controller is operative to cause one water softener to output softened water to the water network while the other carries out a regeneration process. Also, the master controller may determine when to operate the further slave valve assembly to change the flow of water to cause the other water softener to operate based at least in part on the water flow measurements received from a water meter associated with the currently operating water softener (or other water treatment devices).

Also, it should be appreciated that the further slave valve assembly 410 may be integrated or connected with a manifold 414 that is operative to provide input and output pipes for each of the water treatment devices, a common untreated water source connection 412 and a common water output 416 (connected to the water network of the building). In addition, with the arrangement shown in FIG. 16, it should be noted that the input and output ports 420, 422 on the second slave valve assembly 408 may be in reversed positions relative to the input and output 424, 426 ports on the first slave valve assembly 406. Thus, the master controller may be operative to operate each respective water treatment device differently based on the manner in which the input and output pipes are configured.

In this regard, each of the exemplary three slave valve assemblies 406, 408, and 410 may be programmed with function data in order to enable the master controller to determine how to control the respective valves properly. For example, with respect to dual water treatment devices in the form of water softeners, the slave valve assembly 406 of the first water softener 402 may include function data representative of a forward flow softener. Also, the slave valve assembly 408 of the second water softener 404 may include function data representative of a reverse flow softener valve. Further, the further slave valve assembly 410 may include function data representative of a shuttle type valve.

As discussed previously, example embodiments of the water management system may include sensors that are operative to connect and report data to the master controller. Such sensors may be configured as part of slave assemblies. Sensors may also be connected with transceivers that communicate sensor data to the master controller (referred to alternatively herein as a slave sensor assembly 1420 as illustrated in FIG. 13.

Figure 17:
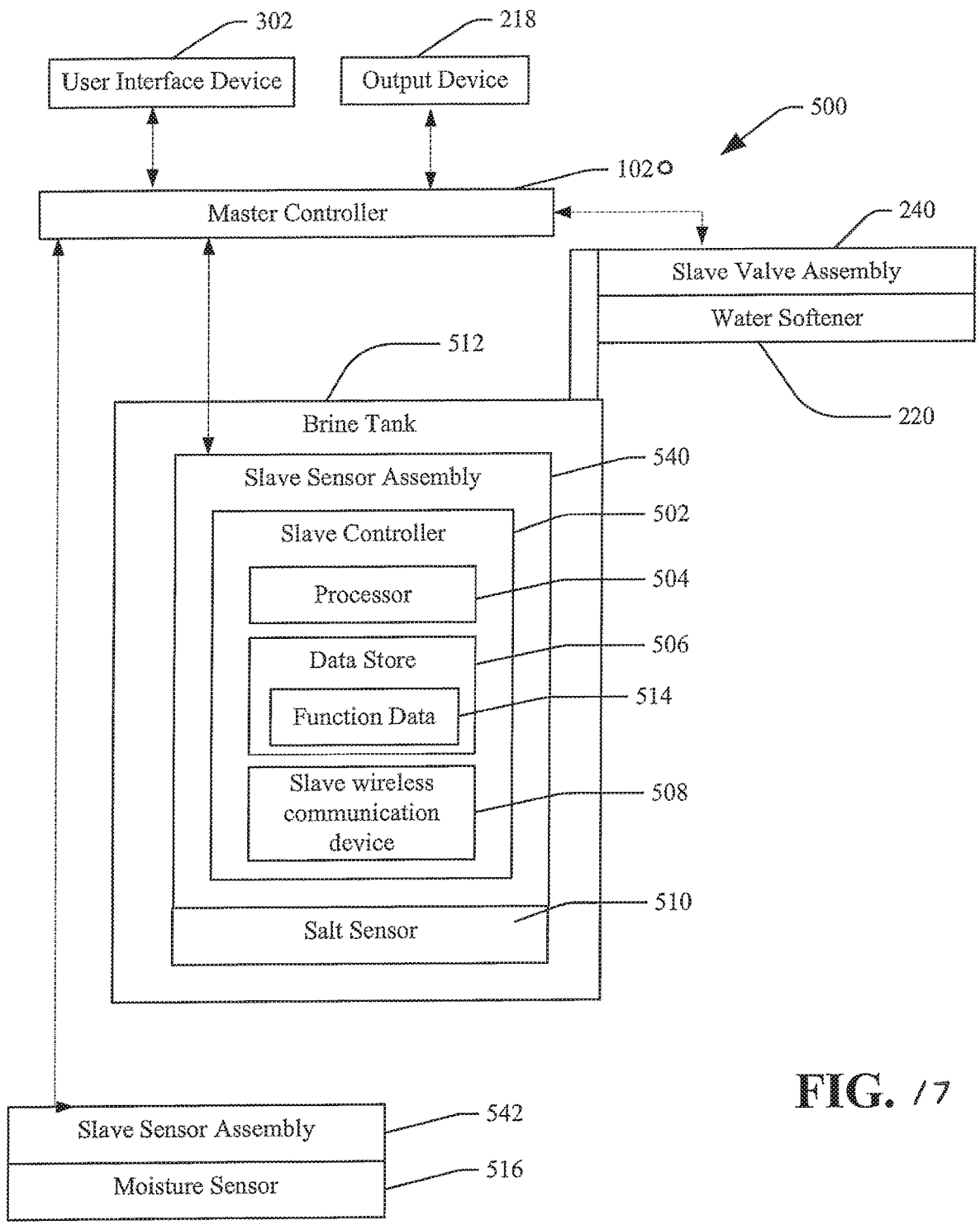
FIG. 17 is a schematic functional block diagram of example configurations for sensor assemblies.

FIG. 17 shows an example of a water management system 500 that includes a slave sensor assembly 540 having a salt sensor 510 for use in a brine tank 512. Such a brine tank may be operative to supply a brine solution to a water softener 220 during the regeneration phase of the water softener. Example arrangements of a brine sensor in a brine tank that is connected to a water softener that may have one or more of the features described herein are shown in U.S. Application No. 61/986,423 filed Apr. 30, 2014 which is incorporated hereby by reference in its entirety.

As shown in FIG. 17, the described slave sensor assembly 540 may include at least one slave controller 502 and may be in operative connection with a salt sensor that is operative to determine data based on a level of salt in the brine tank. As discussed previously, the slave controller may include at least one processor 504, a data store 506, and a slave wireless communication device 508. The slave wireless communication device 508 enables the slave controller 502 of the slave sensor assembly to wirelessly communicate messages with the master controller. The master controller is thus operative to wirelessly receive messages from the slave controller that include data based on the level of salt in the brine tank 512. Responsive to the messages from slave sensor assembly, the master controller may be operative to send wireless communications to the user interface device 302 that cause the display device of the user interface device to output visual data based on the level of salt in the brine tank.

In an example embodiment, the salt sensor may be configured to make a binary determination regarding the salt level, such as whether the level of salt is or is not low. The master controller may be configured to query the slave sensor assembly in a manner that causes the slave sensor assembly to return data regarding whether the level of salt is low or is not low. One or more visual outputs on the display screen of the user interface device 302 may similarly reflect whether the level of salt in the brine tank is low or is not low. When the level of salt is low, the user interface device 302 may be configured to display a warning message that encourages a user to add more salt to the brine tank.

However, it should also be appreciated that in alternative embodiments, the salt sensor 510 may be operative to detect more detailed information such as data that indicates a relative level of how much salt is currently remaining in the brine tank (e.g., a full level of salt, a medium level of salt, and a low level of salt). In this alternative embodiment, the slave sensor assembly may be operative to send messages to the master controller that include data based on the detected amount of salt, and the user interface may be operative to output indicia on a display that is indicative of several different levels of the amount of salt in the brine tank.

Also, in another embodiment, the master controller may be operative to determine an estimate of the amount of salt that remains in the brine tank responsive to the number of regeneration cycles that have been carried out by the water softener. Further, a water management application operating in the user interface device may enable a user to input to the user interface device data indicative of the amount of salt that is added each time the brine tank is filled with additional salt. The master controller may be operative to use this data to more accurately determine the amount of salt that is used to carry out regeneration processes before the salt sensor indicates that the level of salt is low. With this additional data, the master controller may be operative to provide a user interface with a relatively more accurate indication regarding the remaining level of salt in a brine tank. Also, the master controller may be operative to send communications to the wireless user interface device and/or to a portable user device (such as messages via SMS and/or email) to warn a user when salt may need to be added before the salt sensor indicates that the level of salt in the brine tank is low. The amount of time such a warning is provided before the level of salt is indicated to be low by the salt sensor may be a parameter that is configurable by the user interface device for the master controller.

However, it should be understood that while in some embodiments the brine sensor may operate in connection with a separate slave assembly that communicates with the master controller, in other embodiments the brine sensor may be integrated with the slave assembly associated with the water softener. In such embodiments, the slave controller associated with the motor, valve, water meter and other components of the water softener may also be in operative connection with the brine sensor. In such embodiments, the slave controller associated with the water softener is operative to communicate messages including data for responding to data sensed through operation of the brine sensor in messages communicated from the slave controller of the water softener to the master controller. Of course these approaches are exemplary and it should be understood that various embodiments may include slave controllers that are associated with numerous different sensors and control devices while in other arrangements sensors may be combined with transceivers to provide sensing communications that may be usable by the master controller in connection with carrying out different activities.

In another example as illustrated in FIG. 17, a further slave sensor assembly 542 may include or be in operative connection with a sensor in the form of a moisture sensor 516. The master controller may be operative responsive to messages from the transceiver associated with the moisture sensor (which messages indicate the presence of moisture) to cause the user interface device 302 to display a warning message indicating that water has been detected in a basement or other location being monitored by the moisture sensor. In some embodiments, the master controller may be operative to automatically cause programmed corrective actions to be taken in response to such a message, such as causing the slave valve assembly 240 associated with the water softener 220 to shut off water to the water network of the house.

As discussed previously, each exemplary slave sensor assembly may include a data store 506 that includes function data 514 that indicates the type of sensor that the slave sensor assembly is associated with and other associated data. In these examples of slave sensor assemblies, the function data may, for example, be indicative of a salt sensor, a moisture sensor, a pressure sensor, a flow sensor, and electrical power sensor or other data that describes the type of sensor that is associated with the slave sensor assembly.

It should also be appreciated that the master controller may be operative to indicate status information regarding sensors and other devices through output devices 218 other than the described user interface device 302. For example, other types of output devices may include a sound output device (e.g., buzzer, beeper) and/or a light display device (e.g., LED warning lights). Such output devices may be in wired connection with the master controller and/or a slave assembly, and the master controller may be operative to cause the output device to output a sound or light responsive to the status data associated with the master controller and/or one or more slave assemblies.

In addition, it should be appreciated that the master controller may be operative to wirelessly interface with an output device 218 which may not include a slave controller of the dedicated system type as described herein. For example, the output device may correspond to Wi-Fi or a Bluetooth controllable LED light bulb. Such a light bulb may be operative to turn on, turn off, and/or change colors responsive to Wi-Fi or Bluetooth signals. In an example embodiment, the master controller may be configurable in order to access the LED light bulb and cause the LED light bulb to turn on, turn off, and/or change colors responsive to wireless Wi-Fi or Bluetooth messages from the master controller. As in some exemplary systems there may be more than one LED light bulb that is available to be controlled in this manner, the master controller may be capable of being configured via a pairing process or other configuration process to selectively control one or more of the LED light bulbs.

For example, the master controller may be configurable to cause such an LED light bulb (or other wireless output device) to flash on/off, change to a particular color (e.g., yellow or red) based on status data indicative of a slave assembly indicating a problem or a need for maintenance. For example, when the slave sensor assembly associated with a salt sensor outputs data indicative of a low salt level (or the master controller determines via calculations in view of regeneration cycles that salt is low or close to being low), the master controller may be configured to wirelessly cause a particular LED light bulb in a kitchen (or other high traffic area) to turn from outputting white light to outputting a different color such as yellow or red, which notifies someone in the house that it is time to add more salt to the brine tank. Also, when the slave sensor assembly associated with a salt sensor detects that the salt level is no longer low (or a user has provided an indication to the user interface that salt has been added to the brine tank), the master controller may be configured to wirelessly cause the same LED light bulb to return to its normal operation (i.e., outputting white light).

As discussed previously, example embodiments of the water management system may include relays that are operative to control electrical power to one or more devices. Such relays may be configured as part of slave assemblies (sometimes referred to herein as a slave relay assembly) 1440 as illustrated in FIG. 13.

Figure 18:
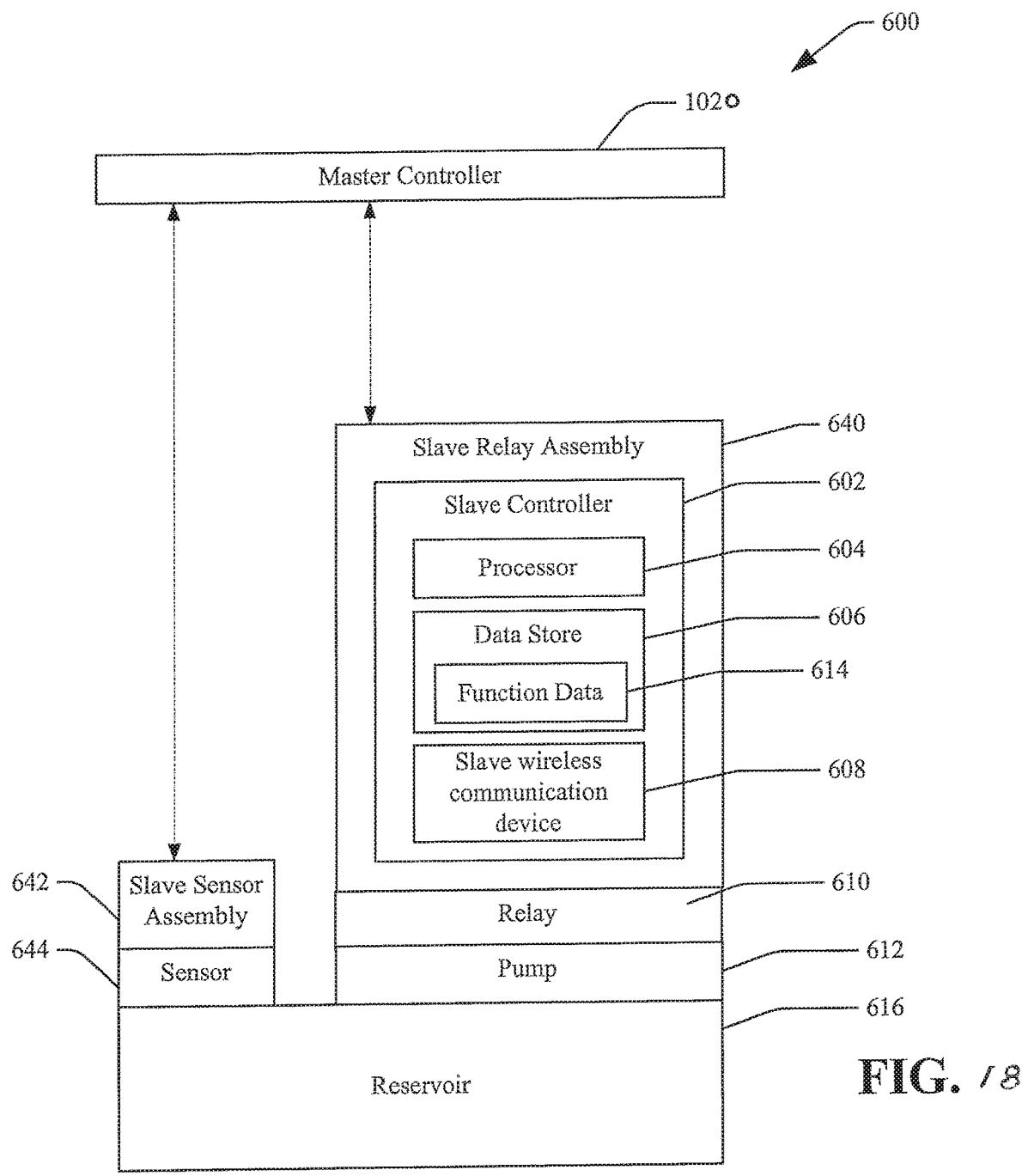
FIG. 18 is a schematic functional block diagram of an example configuration of a slave relay sensor and a slave sensor assembly.

FIG. 18 shows an example of a water management system 600 that includes a slave relay assembly 640 having a relay 610 for use with controlling electrical power to an electric device such as a pump 612. Such a pump may correspond to a water pump such as a well pump, sump pump, irrigation pump or any other type of water pump that moves water into and/or out of a reservoir 616 for water.

As shown in FIG. 18, the described slave relay assembly 640 may include at least one slave controller 602, at least one processor 604, a data store 606 with function data 614, and a slave wireless communication device 608. The slave wireless communication device 608 enables the slave controller 602 of the slave relay assembly to wirelessly communicate messages with the master controller. The master controller is thus operative to wirelessly send messages to the slave relay assembly 640 that cause the slave controller 602 to control the relay 610 to change its electrical condition in supplying power to an electrical device. In this example the slave controller operates to turn on and turn off the pump 612.

In an example embodiment, the master controller may be configured to control the pump responsive to messages received from slave sensor assemblies 642 that provides data that triggers when to turn on or off the pump. For example, a sump may include a slave sensor assembly 642 in operative connection with a sensor 644 in connection with a water level float mechanism. The float may detect a water level in the reservoir associated with the sump pump.

The slave sensor assembly 642 may send messages to the master controller 1020 representative of when the water level is at a sufficient height to require water to be pumped out of the reservoir 616. The master controller 1020 may be configured to cause the slave relay assembly 640 associated with the sump pump 612 to turn on the sump pump when messages indicating such a high water level are received from the slave sensor assembly associated with the float of the sump pump. Correspondingly, when the slave sensor assembly 642 associated with the float of the sump pump sends messages to the master controller 1020 indicating that the water level has been sufficiently lowered in the reservoir 616, the master controller may be operative to cause the slave relay assembly associated with the sump pump to turn off.

By placing a sump pump under the control of the described master controller, the master controller may be operative to detect problems associated with the sump pump and/or float sensor and report such problems to a user (via the user interface device, or a portable user device via SMS message and/or e-mail). An example of a problem that may be detected by the master controller may be a stuck float sensor that continuously outputs an indication of a high water level (even when the water level is low). The example master controller may operate based on its programming and/or other sensors such as moisture sensors to determine that the float sensor may be improperly indicating a high level when the float level fails to report a low water level after a predetermined amount of time of pump operation.

In another example, a well water pump may need to be controlled based on a pressure sensor of a water holding tank. In this example, the slave sensor assembly 642 may be in operative connection with a sensor such as the pressure sensor 644 located in a reservoir 616 such as a water holding tank. The slave sensor assembly 642 operates to communicate messages with the master controller 1020 that indicate when the pressure in the water holding tank has fallen below a predetermined threshold. Responsive to such messages the master controller 1020 may be operative to send messages to a slave relay assembly 640 associated with the well water pump to turn on in order to fill the water tank with additional water. Correspondingly, when the slave sensor assembly 642 associated with the pressure sensor sends messages to the master controller 1020 indicating that the pressure level has risen above a predetermined threshold, the master controller may be operative to cause the slave relay assembly associated with the well pump to turn off.

By placing a well pump under the control of the described master controller, the master controller may be operative to detect problems associated with the well pump and/or pressure sensor and report such problems to a user (via the user interface device, or portable user device or via SMS message and/or e-mail). An example of a problem that may be detected by the programming associated with an exemplary master controller may be a broken well pump. The example master controller may determine that the well pump is broken responsive at least in part to the pressure sensor failing to show an increase in pressure after the well pump has been commanded by the master controller to operate for a predetermined amount of time.

As discussed previously, each exemplary slave relay assembly may include a slave controller with a data store 506 that includes function data 514 that indicates the type of relay and/or device that the slave relay assembly is associated with. In these examples, the function data may, for example, be indicative of a sump pump, well pump, or other type of pump. Similarly, the slave sensor assembly associated with the reservoir that is filled or emptied by operating the pump, may include function data indicative that the sensor is a sump float sensor, a water storage tank pressure sensor or other data that describes the type of sensor that is associated with the slave sensor assembly.

Figure 19:
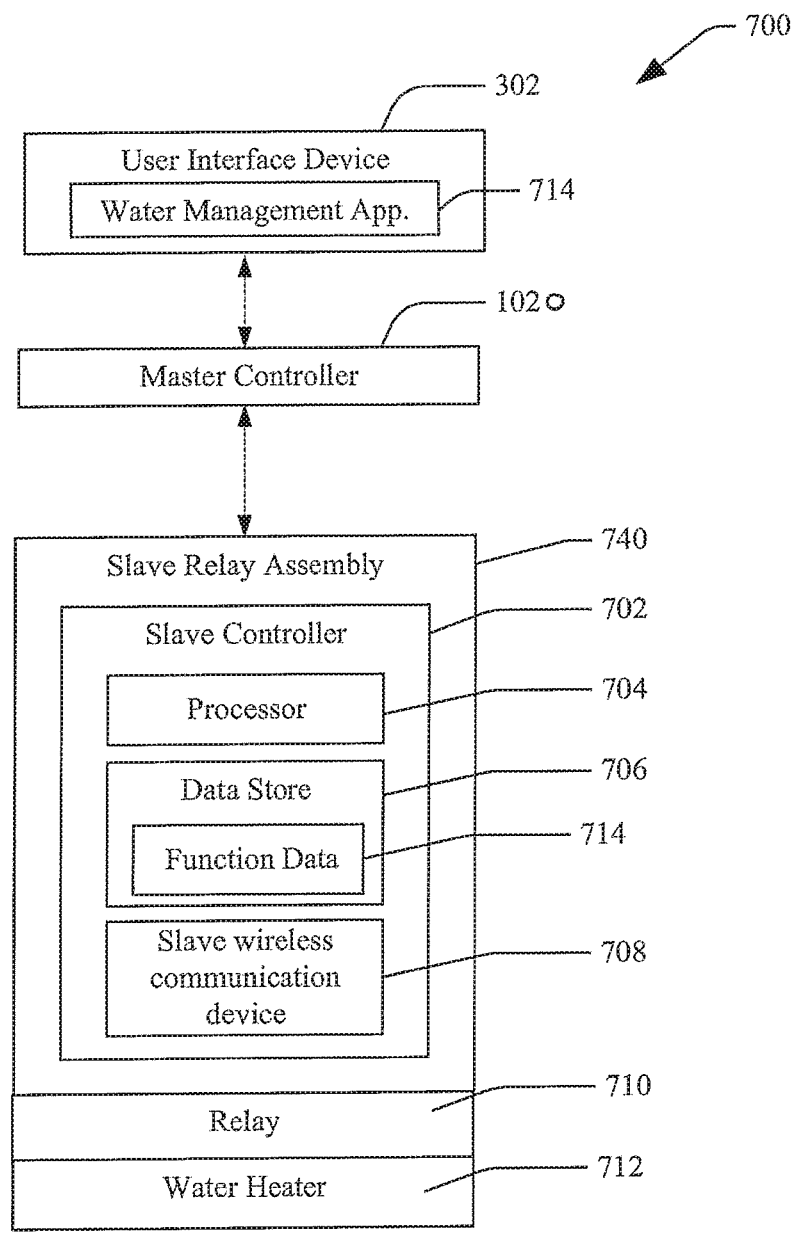
FIG. 19 is a schematic functional block diagram of an example configuration of a relay sensor that is remotely controlled via a wireless user interface device.

FIG. 19 illustrates another configuration of a water management system 700 that includes a slave relay assembly 740. In this example the slave relay assembly is in operative connection with an electrical device which a user may wish to automatically turn on or off in some conditions, or a user may wish to remotely be able to turn on and off. For example, the relay assembly may be in operative connection with a relay 710 that is configured to control electrical power to an electric water heater 712. Also, as with other exemplary slave assemblies, the slave relay assembly 740 may include at least one slave controller 702, at least one processor 704, a data store 706 which includes function data 714 (indicative of a water heater relay and/or other program or operation data), and a slave wireless communication device 708. In this example, the processor executable instructions of the user interface device may include a water management application 714. The computer executable instructions of the application cause the at least one processor of the user interface device, to cause the user interface device to send wireless communications to the master controller 1020. The master controller may be responsive to the messages from the user interface device to send wireless messages to the slave relay assembly 702 that cause a relay 710 in operative connection with the slave relay assembly to either turn electrical power on or off to the water heater. Thus, the user interface device is operative to remotely turn the water heater off and on.

In alternative exemplary arrangements, the master controller may be operative to cause the slave controller associated with the relay delivering power to the water heater to cease delivering such power in circumstances where continued operation of the water heater may be harmful. For example, in some exemplary arrangements, the loss of water flow due to a broken pipe, pump failure or other conditions may cause an inability to deliver water to the water heater. In such circumstances, the master controller may operate responsive to messages sent by transceivers associated with sensors, messages sent by slave assemblies or other appropriate sensing devices to make a determination based on its programming that conditions exist that make it desirable to remove electrical power from the water heater. In these circumstances the master controller will operate in accordance with its programming to communicate messages with the slave controller associated with the relay for the water heater to cause electrical power to be withdrawn from the water heater.

Further, in other exemplary arrangements, the master controller may operate to automatically withdraw power from a water heater or other electrical power consuming devices responsive to other conditions. For example, electrical power sensors associated with transceivers may be operative to detect a brownout condition occurring at the house or other building where the water heater or other electrical device is located. In order to reduce possible problems and/or to reduce electrical consumption during such conditions, the master controller may operate responsive to the messages communicated with the transceiver associated with the brownout sensor to cause electrical power to be withdrawn from certain electrical devices. This is accomplished by the master controller causing wireless messages to be sent to the slave controllers associated with the electrical devices, causing the relays to discontinue delivering electrical power thereto. Further as can be appreciated, exemplary master controllers may operate responsive to messages from the brownout sensor indicating that power has been fully restored to operate to send wireless messages to the slave assemblies associated with the relays to cause the relays to restore power to the water heater or other electrical devices.

In still other exemplary arrangements, messages indicative of brownout conditions may be operative to cause the master controller to communicate wireless messages to the user interface device and/or the portable user device such as a smart phone associated with a user to indicate the occurrence of the condition. Outputs from such devices operated by a user may inform the user of the condition. The user may then be given the option to provide inputs to the user interface of the device such that the user can then cause the master controller to withdraw electrical power therefrom. It should be appreciated that slave relay assemblies may be configured to operate in connection with numerous types of electrical devices in a building in order to provide remote control of the devices via the same master controller that manages water treatment devices.

It should be appreciated that the example master controller and the slave assemblies described herein may be powered by direct current (DC) electricity from one or more power sources. For example, the master controller and/or the slave assemblies may be powered from one or more transformers which derive power from household current such as by being connected to a household electrical outlet and/or wired into an electrical system of a building. In addition, in further example embodiments, the master controller may be operative to provide DC electricity to one or more slave assemblies.

Figure 20:
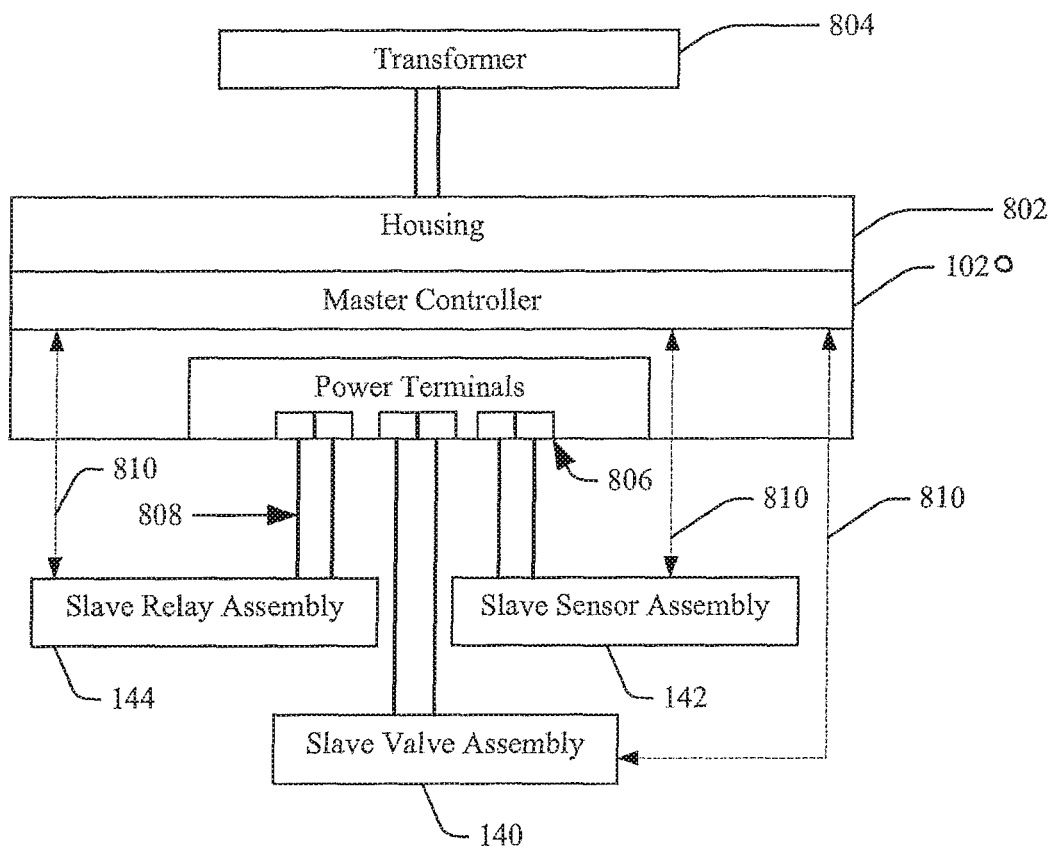
FIG. 20 is a schematic functional block diagram of an example housing of a master controller that includes power terminals to which slave assemblies may be connected.

FIG. 20 illustrates schematically an example water management system 800 in which the master controller 1020 is integrated into a housing 802 that includes a plurality of power terminals 806. The master controller may include an electrical system that is operative to provide DC electrical power provided from a transformer 804 to both the master controller 1020 and the plurality of power terminals 806.

In this described embodiment, one or more of the previously described slave assemblies, such as a slave valve assembly 1400, a slave sensor assembly 1420 and a slave relay assembly 1440 may have their electrical power requirements provided by electrical wires 808 connected to the power terminals 806 of the housing 802 of the master controller. However, as described previously, even though such slave assemblies may be wired to the master controller to receive electrical power, example embodiments of the slave assemblies are configured to communicate wirelessly through wireless messages 810 with the master controller. Also, it should be noted that some slave assemblies may not be sufficiently near the master controller to readily connect by wire the slave assembly to the power terminals of the master controller. In such cases, a secondary transformer may be plugged into and/or wired into the electrical system of the building in order to provide power to such slave assemblies.

As previously discussed, in some exemplary arrangements a cabinet such as the cabinet 428 may include power terminals which may provide power to or from numerous different devices therein. For example, power terminals included on the cabinet may be used to supply power to or from the master controller of the user interface device and the slave assembly and the components thereof associated with the cabinet. Thus for example in some exemplary arrangements, the cabinet may include one or more transformers which provide electrical power at the desired voltage and amperage to the power terminals that are operative to connect to the different devices which are included in or may be connected to the cabinet. Alternatively such as is represented in FIG. 20, the master controller or another device may be in operative connection with a transformer which is then used to provide power to the power terminals which are in operative connection with the other electrical devices. Of course it should be understood that these approaches are exemplary and in other embodiments, other approaches may be used.

Figure 21:
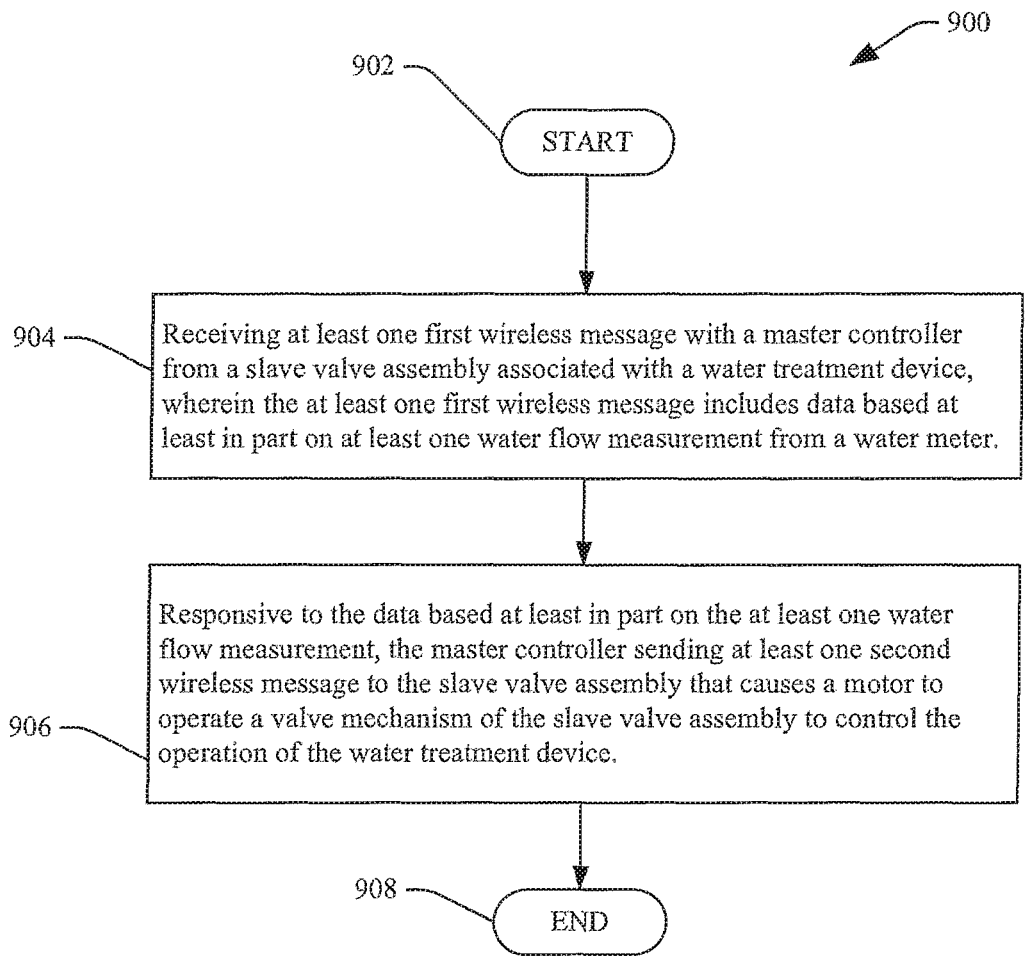
FIGS. 21-23 are exemplary flow diagrams that illustrate the operation of a master controller and slave assemblies.
Figure 22:
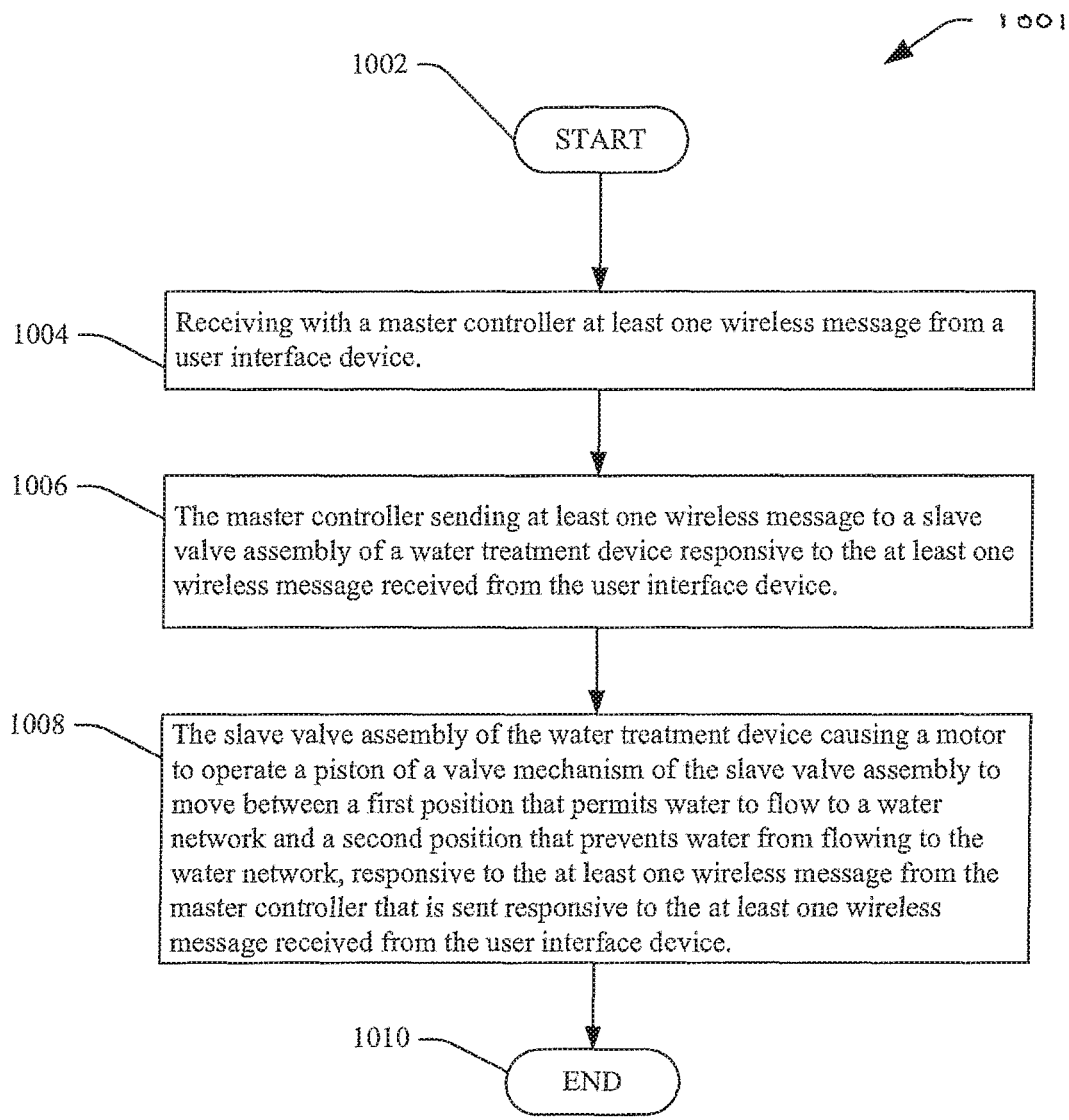
Figure 23:
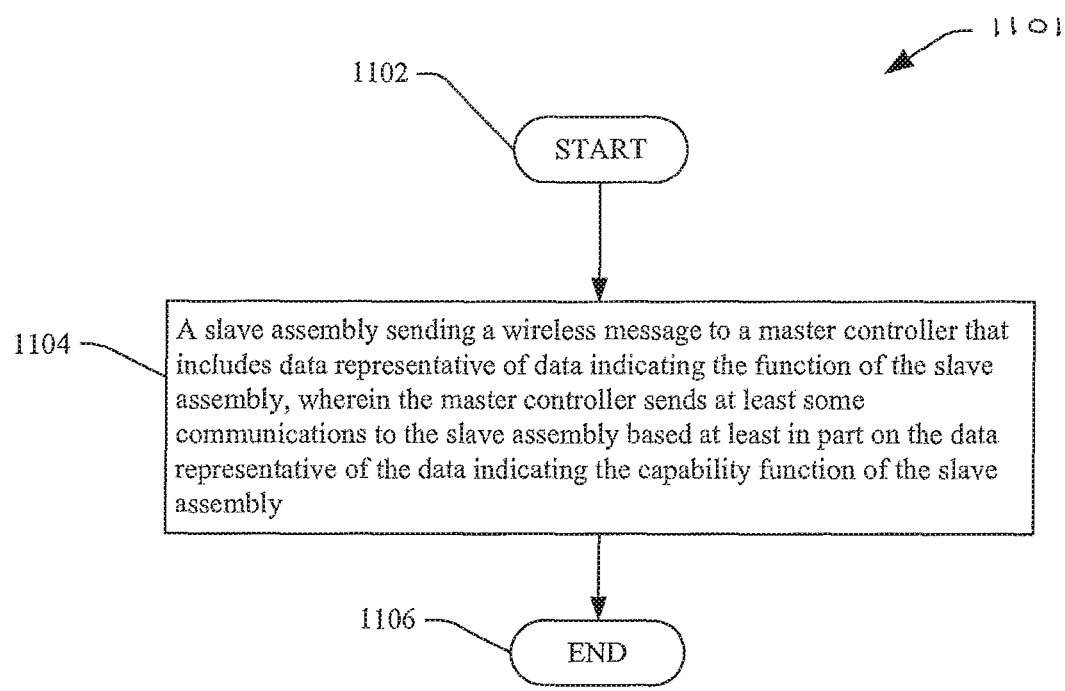

With reference now to FIGS. 21-23, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the exemplary acts described herein may be caused to be carried out responsive to computer-executable instructions by one or more processors and/or stored on a computer-readable medium or media (e.g., CD, DVD, hard drive, solid-state drive, flash memory, or other storage device). The computer-executable instructions may include a routine, a sub-routine, programs, a thread of execution, and/or the like. Still further, results of acts of the methodologies may be stored in a computer-readable medium, displayed on a display device, and/or otherwise used.

Referring now to FIG. 21, an exemplary logic flow methodology 900 that facilitates managing water is illustrated. The methodology 900 begins at step 902, and at 904 includes a step of receiving at least one first wireless message with a master controller from a slave assembly included as part of the water treatment device (i.e. water conditioner).

As discussed previously, the master controller may include a master wireless communication device that enables the master controller to wirelessly communicate messages with a plurality of slave assemblies including the slave valve assembly in step 904. Also, each slave assembly includes a slave controller and the slave controller includes a slave wireless communication device that enables the slave controller to wirelessly communicate messages with the master controller.

In this example, the water treatment device includes a slave assembly in the form of a slave valve assembly that includes a slave controller, a motor and a valve. The exemplary slave assembly of the water treatment device further includes a water meter that is operative to generate water flow measurements based at least in part on water flow through the valve mechanism of the slave valve assembly of the at least one water treatment device. In step 904, the at least one first wireless message includes data based at least in part on at least one water flow measurement.

In this example methodology, in step 906, responsive to the data based at least in part on the at least one water flow measurement, the master controller sends at least one second wireless message to the slave controller that causes the motor to position the valve to control the operation of the water treatment device. Also, at step 908, the methodology may end. In an example embodiment, the slave valve assembly in step 906 may be the slave assembly in step 904 and the slave valve assembly may include the water meter. Thus, in step 904, the at least one first wireless message including the data based at least in part on the at least one water flow measurement is communicated by the slave controller of the slave valve assembly of the water treatment device. However, it should be appreciated that in alternative embodiments, the water meter may be included in a slave assembly that is different than the slave valve assembly of the water treatment device and that is operative to independently wirelessly communicate with the master controller.

Also, as discussed previously, the valve of the slave valve assembly of the at least one water treatment device in step 906 may correspond to a multi-port valve having a housing that includes more than two ports and a movable piston. The motor may operate to move the piston between a plurality of different positions in the housing, which different positions form different water pathways between the ports in the housing. Such slave valve assemblies, for example, may be used with water treatment devices such as a water softener or a water filter.

As discussed previously, the exemplary master controller may be operative to wirelessly communicate with at least one user interface device. Such a user interface may include a device that communicates with the master controller in the LAN. Alternatively the user interface device may include a portable user device that communicates with the master controller via a wide area network. In addition, the water treatment device may be configured to supply water to a water network. Thus, the methodology 900 may further include the control logic methodology 1001 illustrated in FIG. 22. The methodology 1001 begins at step 1002, and at 1004 includes a step of receiving with the master controller at least one third wireless message from a user interface device. The methodology at step 1006 includes the master controller sending at least one fourth wireless message to the slave valve assembly responsive to the at least one third wireless message received in 1004 from the user interface device. In addition, the methodology may include a step 1008 in which the slave valve assembly of the water treatment device causes the motor to move the piston of the valve of the slave valve assembly to move between a first position that permits water to flow to the water network and a second position that prevents water from flowing to the water network, responsive to the at least one fourth wireless message. At step 1010 the exemplary methodology may end.

Also discussed previously, the described slave assemblies, including the slave valve assemblies, may include a slave controller including data store comprising data indicating a function that the slave assembly is intended to carry out. Thus, the methodology 900 may further include the control logic methodology 1101 illustrated in FIG. 23. The methodology 1101 begins at step 1102, and at 1104 includes a step of the slave assembly sending a wireless message to a master controller that includes data representative of data indicating the function of the slave assembly. The master controller may then send at least some communications to the slave assembly based at least in part on the data representative of the data indicating the function of the slave assembly.

For example, a slave valve assembly may include a data store comprising data indicating that a function of the slave valve assembly corresponds to a control valve for a water treatment device. The methodologies 900 and 1001 in FIGS. 21 and 22 may then include the step 1104 prior to step 904 in which the slave valve assembly sends a fifth wireless message to the master controller that includes data representative of the data indicating that the function of the slave valve assembly corresponds to a control valve for a water treatment device. The master controller may then send the at least one second communication in step 906 and the at least one fourth communication in step 1006 based at least in part on the data representative of the data indicating that the function of the slave valve assembly corresponds to a control valve for a water treatment device.

Further in exemplary embodiments, a data store associated with a slave controller of a slave assembly may also include data which is usable to authenticate the devices authorized to communicate with the master controller in a network. Such data may include identifying data which is capable of identifying the device and authenticating that it is an appropriate device to include in the network. Alternatively or in addition, the data included in the data store associated with the slave controller may include data which is usable to encrypt communications between the master controller and the slave controller. This may include, for example, authenticating data or computer executable instructions which are operative to produce identifying data which can then be used in connection with the communications to provide secure and authenticated communications between the master controller and the slave assemblies.

In further exemplary embodiments, data included in data stores of the slave assemblies may include operational instructions which are usable by the slave controller to control the devices to which the slave controller is connected. For example the instructions included in connection with the slave controller may include the specific steps, or functions that different devices controlled by the slave controller need to perform in order to carry out a particular operation. This enables the master controller to communicate messages which indicate that a particular function should be carried out by the slave assembly. The slave assembly may then utilize the instructions included in its data store to cause the devices to perform the specific actions and steps that are needed to carry out that particular function in connection with the particular devices, sensors, etc. that the slave controller is configured to work with. This approach may avoid the need for the master controller to communicate messages that operate to control each specific device function associated with devices that are connected to the slave controller. Further, in exemplary arrangements such an approach may enable the master controller to communicate common messages to slave controllers associated with different devices that nonetheless perform the same function. This may be for example different models of water conditioners which perform the same water conditioning function through operation of different types of devices. As a result, the master controller may communicate the same messages with each of the different slave controllers of the different models to cause common functions to be performed. However, the slave controllers utilizing their programming in the respective data stores may cause operation of different kinds of devices in different ways and operate in conjunction with different sensors so as to cause the function to be performed by the different model devices. In some exemplary devices, this may simplify the message structure and programming associated with the master controller. Of course it should be understood that these approaches are exemplary and in other arrangements, other approaches may be used.

Figure 24:
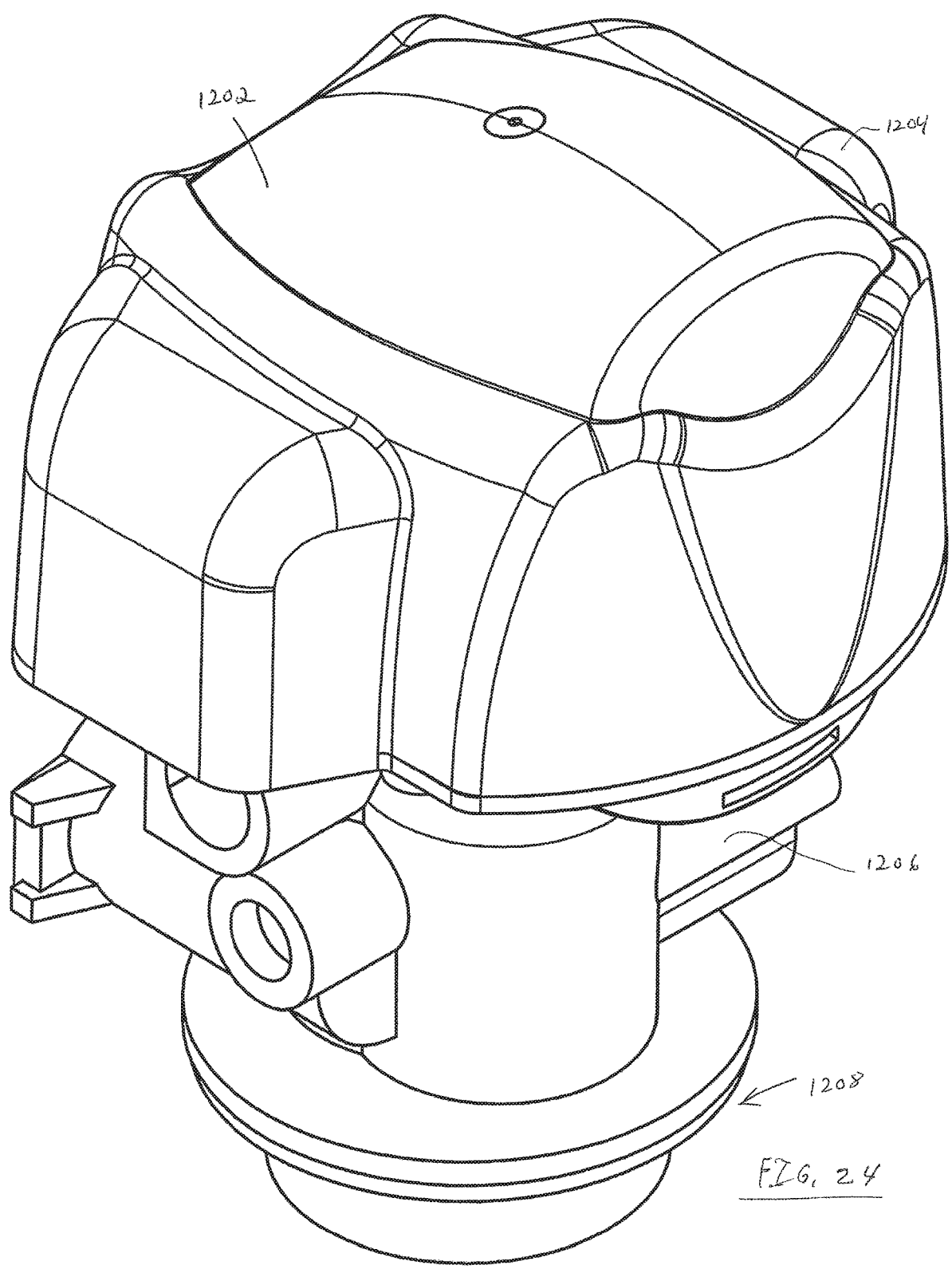
FIGS. 24-27 show views of an example valve assembly for a water conditioner.

FIGS. 24-27 illustrate an example of a valve assembly usable in connection with a water conditioner such as a water softener. The exemplary embodiment may include a valve mechanism adapted from the control valve mechanism shown in U.S. Application No. 61/986,423, the disclosure of which is incorporated herein by reference in its entirety. FIG. 24 shows an example exterior perspective view of an exemplary slave valve assembly 1202 for a water softener with a cover 1204 installed on a housing 1206. The slave valve assembly 1202 may include a base portion 1208 that is adapted to mount to a top opening of a resin tank such as previously discussed. However, it should be appreciated that alternative embodiments of the slave valve assembly may be adapted to work with other water conditioner arrangements including in arrangements with a slave valve assembly positioned in other locations (such as adjacent to a tank as illustrated in U.S. Application No. 61/986,423, below a tank or other location.

Figure 25:
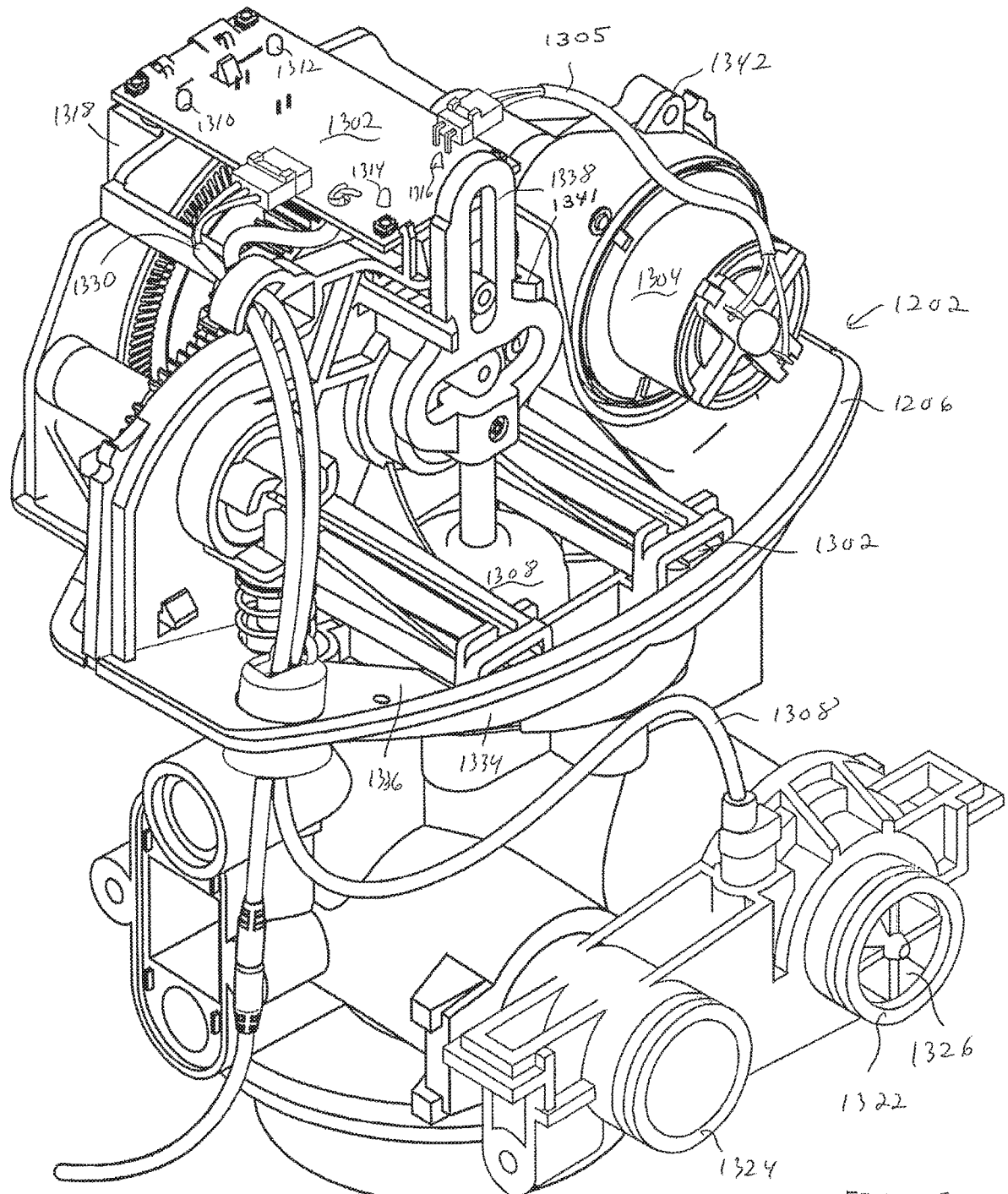

FIG. 25 shows an example internal view of the slave valve assembly 1202 with the cover removed. As illustrated in FIG. 25, the slave valve assembly may include a circuit board 1302 mounted to the housing 1206, which circuit board includes circuitry which includes the previously described slave controller 202 shown in FIG. 14. This exemplary circuit board 1302 includes circuits operative to selectively provide power to a motor 1304 via wires 1305. The motor is releasably mounted to the housing 1206. The motor is operative to rotate a plurality of gears 1306 which control the configuration of a valve mechanism 1308. The condition of the valve is controlled by selectively axially moving a valve element to selected positions to cause selected water flow conditions.

Figure 26:
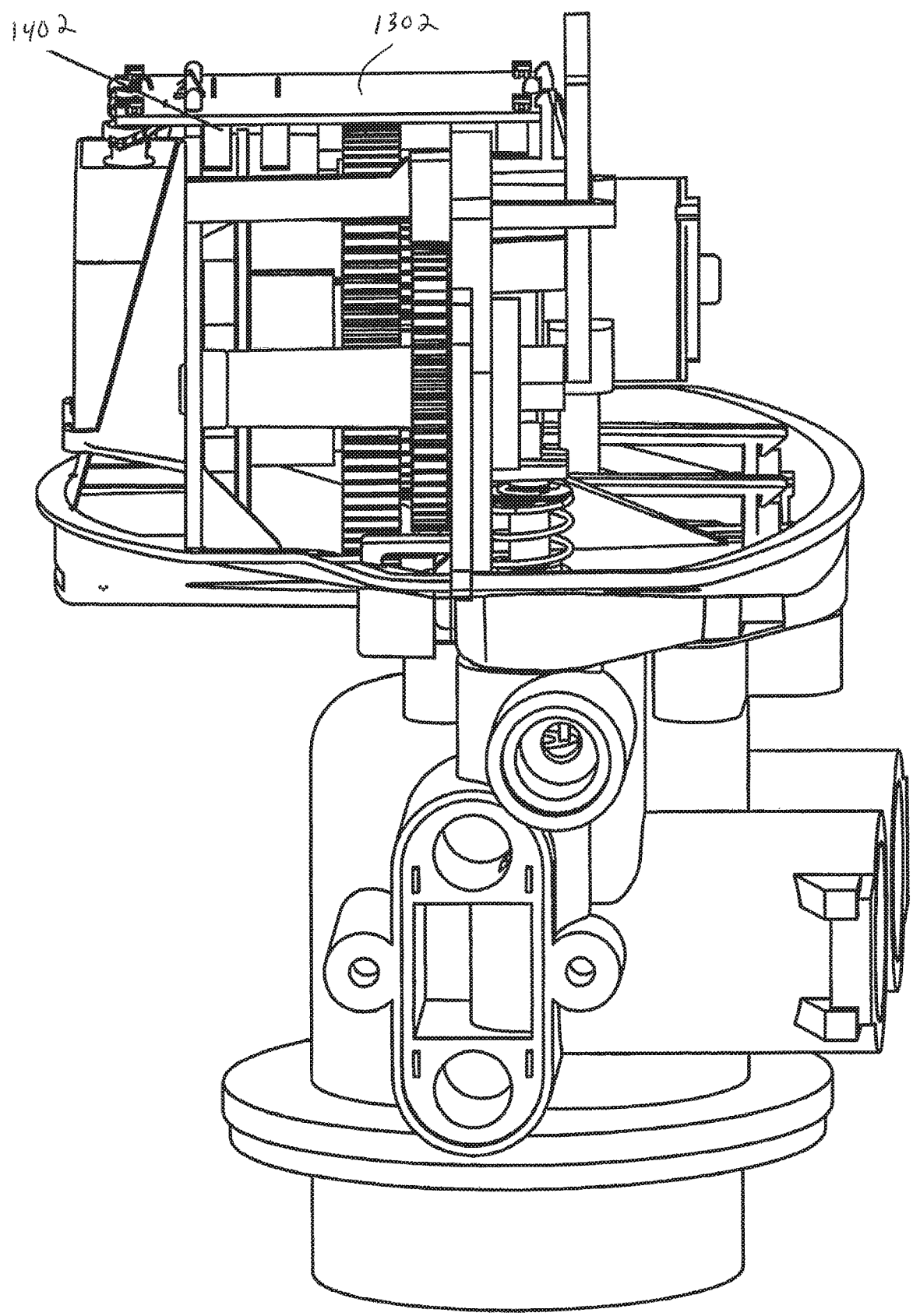

In addition, as illustrated in a side view in FIG. 26, the exemplary valve mechanism 1308 includes an encoder 1402 that monitors the position of the gears and the position of the valve element such as a piston that establishes the operational condition of the valve. In this example, the encoder may be directly mounted to the circuit board 1302.

In this example embodiment, the valve mechanism may include a water outlet port 1322 (for softened water) and a water inlet port 1324 (for receiving untreated water). The valve mechanism may also include a water meter 1326 positioned to measure water flow through the water outlet (or other port in the valve mechanism). The slave controller is operative to receive information regarding the measured water flow from the water meter via wires 1328 connected to the circuit board 1302.

Also, as shown in FIG. 25, the circuit board is operative to receive power via electrical wires 1330 that may be operatively connected to a DC electrical supply such as a transformer. Also, the slave valve assembly 1202 may be adapted to receive a battery 1318 in a configuration that clips under the circuit board. Such a battery 1318 may supply electrical power to the circuit board when the power has been lost from the electrical wires 1330.

In an example embodiment, when the circuit board switches to using battery power, the slave controller may be operative to detect this event and cause the motor to operate depending on the present mode of the water softener when power to the electrical wires 1330 was lost. For example, if the water softener is in a mode in which regeneration is occurring, the slave controller may continue to operate the valve mechanism via the motor to complete the regeneration processes, while under battery power. However, once the softener has completed regeneration, the slave controller may maintain the water softener in a neutral mode in which the water softener does not carry out further regeneration processes (until electrical power is restored to electrical wires 1330).

However, while the water softener is running on battery power, the slave controller may continue to monitor water flow from the water meter 1326. Also, in a further embodiment, the slave controller may continue communicating messages with a master controller while under battery power. Thus, if the master controller is likewise under battery power, the master controller can continue to collect water flow data. Further, the slave controller under battery power may be operative to operate the motor to place the valve mechanism in an operational condition that shuts off water to the outlet 1322 responsive to wireless communications from the master controller.

In addition, this example embodiment of a water softener may include other features that enhance operation or manufacturability of the water softener. For example, the water softener valve may include a base plate 1334 that includes clips 1332. A valve head 1336 may slide into engagement with and engage the clips on the base plate to releasably fasten these components together without screws. In the exemplary arrangement, this approach enables changing the slave controller motor and other components rapidly and without a need for disassembly of subcomponents. This may facilitate servicing units in the field that have malfunctions. Further in exemplary arrangements, this approach may enable upgrading units to different types of slave controllers or other devices for purposes of controlling the valve of the water conditioner device.

In addition, the valve mechanism may include a piston yoke 1338 that clips into place via clips 1341. This further facilitates the ability to change the head. Also, the exemplary housing of the motor 1304 is configured to slide into a receptacle in the housing and be securely mounted to the housing via single screw mount 1342.

Figure 27:
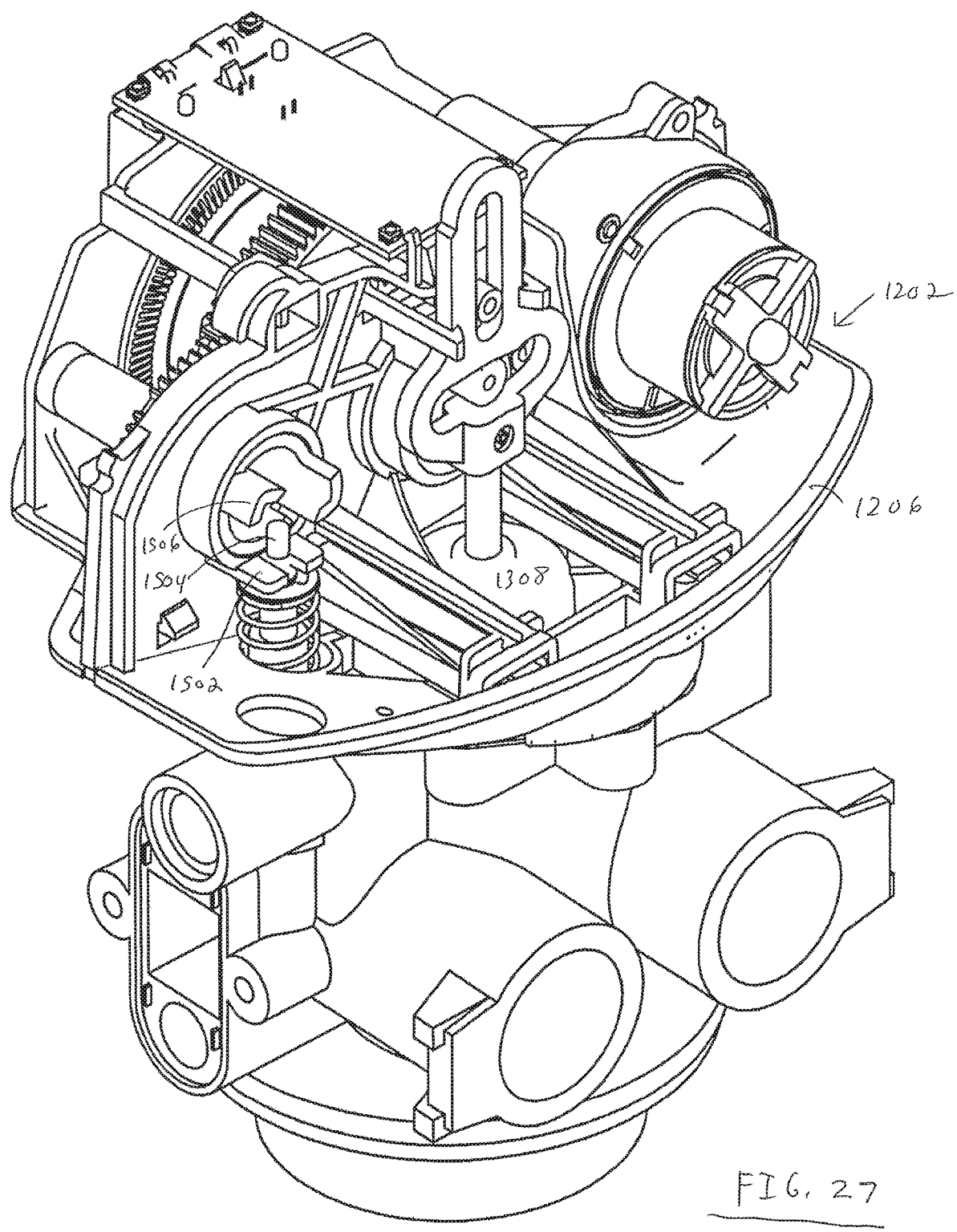

Also, as illustrated in a perspective view in FIG. 27 (without wires), the exemplary valve mechanism 1308 may include a support 1502 for a brine valve cam follower 1504 so as to be actuated via a cam 1506. In this exemplary arrangement the cam 1506 may function to activate the valve cam follower by rotating in either direction. This enables using different valve configurations which can be used with different types of water conditioners.

In an example embodiment, the circuit board 1302 may include or be in operative connection with a plurality of light sources 1310, 1312, 1314, and 1316 such as LEDs. Such LEDs may be spaced apart on the circuit board such as being respectively adjacent each of the four corners of a rectangular shaped circuit board. Such LEDs may be individually controlled by the slave controller to turn on and off and to change between different colors. The number of lit LEDs, the respective color of each LED, and/or a flashing (on and off) pattern of the LEDs may be operative to indicate different statuses of the operation of the water softener. Referring back to FIG. 24, to enable the light from the LEDs to be visible, the cover 1204 may be made of a translucent plastic that enables the cover to become illuminated (e.g., glow) with the colored light generated via the LEDs. As previously discussed in embodiments where the valve is housed within a cabinet such as cabinet 428, the window 436 on the top of the cabinet enables the viewing of illumination of LEDs on the valve therethrough. In addition, the controller may be operative to selectively illuminate less than the total number LEDs to cause portion of the housing to glow with less intensity then when all of the LEDs are illuminated. Alternatively or in addition, the slave controller may be in operative connection with an annunciator or other sound output device that outputs various sounds or tones that correlate with the illumination properties and/or patterns.

In an example embodiment, the master controller may send at least one wireless message to the slave controller of the circuit board 402 which cause the LEDs to be all illuminated when the brine tank is determined by the master controller to have a relatively high level of salt therein (e.g., such as when a user indicates that salt has been recently added to the brine tank). Further, the master controller may send at least one other wireless message to the slave controller of the circuit board 402 which cause less then all of the LEDs to be illuminated when the master controller determines that the level of salt in the brine tank has been at least partially consumed (via the master controller monitoring the number of regeneration processes since salt was added). Thus, the light emitted by the LEDS may be progressively lessened as the salt in the brine tank is consumed and approaches a low level.

In alternative embodiments, in addition to or rather than changing the number of lit LEDs, the master controller may cause the slave controller to change colors in a manner that is indicative of the amount of salt that may remain in a brine tank. For example, when salt has been recently added, the LEDs may be caused by the master controller via at least one wireless message to display a green color, whereas when the brine tank needs or is close to needing a refill of salt, the LEDs may be caused by the master controller via at least one wireless message to display a red color. Of course such visual outputs may be accompanied by corresponding audible outputs in some arrangements and/or outputs through a user interface device.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Thus the exemplary embodiments achieve improved operation, eliminate difficulties encountered in the use of prior valve devices and systems and attain the useful results described herein.

In the foregoing description, certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful concepts are not limited to the features shown and described.

It should be understood that the features and/or relationships associated with one embodiment can be combined with features and/or relationships from another embodiment. That is, various features and/or relationships from various embodiments can be combined in further embodiments. The inventive scope of the disclosure is not limited to only the embodiments shown or described herein.

Having described the features, discoveries and principles of the exemplary embodiments, the manner in which they are constructed and operated, and the advantages and useful results attained, the new and useful features, devices, elements, arrangements, parts, combinations, systems, equipment, operations, methods, processes and relationships are set forth in the appended claims.

We claim:

1. Apparatus comprising:
a water conditioner, wherein the water conditioner is operative to at least one of soften, filter and oxidize contaminants in water that is passed therethrough,
wherein the water conditioner includes
a tank,
at least one valve, wherein the at least one valve includes a plurality of flow passages and is in operative fluid connection with the tank,
at least one motor, wherein the motor is in operative connection with the at least one valve,
wherein the at least one motor is enabled to control the at least one valve to cause the water conditioner to be selectively placed in a plurality of operational conditions, including
a service condition, wherein in the service condition untreated water is delivered through the at least one valve and caused to pass through the tank, and water conditioned by having passed through the tank is delivered from the at least one valve,
at least one regeneration condition, wherein in the at least one regeneration condition, water is delivered through the at least one valve and caused to pass through the tank in a manner that improves water conditioning operation, and after having passed through the tank is delivered from the at least one valve,
a shutoff condition,
wherein in the shutoff condition at least one of
no water that has passed through the at least one valve is delivered to the tank, and
no water from the tank is delivered from the at least one valve to a conditioned water network connection,
wherein the water conditioner further includes:
a water conditioner slave controller, wherein the water conditioner slave controller is in operative connection with the at least one motor,
wherein the water conditioner slave controller is usable to change operational conditions of the water conditioner,
a master controller, wherein the master controller is configurable to be operable to control a plurality of slave controllers, including the water conditioner slave controller,
wherein the master controller includes a master wireless communication device that enables the master controller to wirelessly communicate messages with each of the plurality of slave controllers,
wherein each slave controller includes a respective slave wireless communication device that enables the slave controller to wirelessly communicate messages with the master controller,
wherein the master controller is operable to wirelessly communicate messages to the water conditioner slave controller, which messages are operable to cause the water conditioner slave controller to change at least one operational condition of the water conditioner,
a moisture sensor,
a transceiver, wherein the transceiver is in operative connection with the moisture sensor, wherein the transceiver is configured to wirelessly communicate with the master controller, sensor data corresponding to a moisture sensed condition of the moisture sensor,
wherein responsive at least in part to sensor data that indicates the moisture sensed condition, the master controller is operable to wirelessly communicate further wireless messages with the water conditioner slave controller, wherein the further wireless messages are operative to cause the water conditioner slave controller to place the water conditioner in the shutoff condition.

2. The apparatus according to claim 1
wherein in the shutoff condition
water from the conditioned network connection is passed through the at least one valve to at least one valve drain port configured to be in connection with a waste water drain.

3. The apparatus according to claim 1 and further comprising
a portable user interface device, wherein the user interface device includes a display, an interface device wireless communication device and at least one processor,
wherein the master controller and the portable user interface device are configured to communicate wirelessly with each other via wireless communications,
wherein the portable user interface device includes a water management application including instructions executable by the processor,
wherein the water management application executed by the at least one processor is operative to cause the display to output visual indicia representative of the moisture sensed condition responsive at least in part to wireless communication with the master controller.

4. The apparatus according to claim 3
wherein the portable user interface device is configured responsive to operation of the water management application, to wirelessly communicate with the master controller, which communication causes the master controller to communicate the wireless messages with the water conditioner slave controller which are operative to change an operational condition of the water conditioner.

5. The apparatus according to claim 4
wherein the wireless messages are operative to change the water conditioner between the service condition and the shutoff condition.

6. The apparatus according to claim 5
wherein the water conditioner further includes
a water meter, wherein the water meter is enabled to measure water flow associated with the at least one valve,
wherein the water meter is in operative connection with the water conditioner slave controller,
wherein the water conditioner slave controller is operable to wirelessly communicate messages including flow data based on water flow measurement sensed by the water meter to the master controller,
wherein the master controller is operable to wirelessly communicate additional further messages to the water conditioner slave controller responsive at least in part to the flow data, which additional further messages are operable to cause the water conditioner to change at least one operational condition of the water conditioner.

7. The apparatus according to claim 6
wherein the master controller responsive at least in part to the flow data, is operative to determine a need for regeneration of the water conditioner,
wherein the water conditioner slave controller is operable to change the water conditioner to at least one regeneration condition responsive to the additional further wireless messages received from the master controller.

8. The apparatus according to claim 6
wherein the at least one valve comprises
a housing that includes more than two fluid ports,
a bore in the housing, wherein the bore is surrounded by a plurality of annular flow cavities,
a piston wherein the piston is movable in the bore,
wherein the at least one motor of the water conditioner is operative to move the piston between a plurality of different positions relative to the bore, wherein in the different positions the piston is operative to enable water flow between different annular flow cavities in the housing.

9. The apparatus according to claim 6
wherein the master controller is operable to determine a water usage pattern with respect to elapsed time responsive at least in part to data based on the flow data,
wherein the master controller is operable to cause:
a determination to be made that data based on current flow data is not consistent with the determined water use pattern, and
cause at least one message to be sent to the portable user interface device responsive at least in part to the determination.

10. The apparatus according to claim 9
wherein the master controller is configured to
make a further determination that data based on current flow data is higher than a threshold amount based on the determined water usage pattern, and
responsive at least in part to the further determination, communicate at least one responsive wireless message with the delivery valve slave controller which is operative to cause the water conditioner to be in the shutoff condition.

11. The apparatus according to claim 9
wherein the plurality of operational conditions further includes
a bypass condition,
wherein in the bypass condition water is enabled to pass into, through and be delivered from the at least one valve to the conditioned water network connection, such that none of the water delivered from the at least one valve has passed through the tank.

12. The apparatus according to claim 11
wherein the portable user interface device is configured responsive to operation of the water management application, to wirelessly communicate bypass instructions with the master controller,
wherein the master controller is configured to
communicate at least one wireless bypass message with the water conditioner slave controller responsive at least in part to the bypass instructions, wherein the at least one wireless bypass message is operative to cause the water conditioner to be in the bypass condition.

13. The apparatus according to claim 11 and further comprising
an electrically powered device,
an electric relay, wherein the relay is in operative connection with the electrically powered device, wherein the relay is selectively operative to change between a condition in which electricity is delivered to the device and another condition in which electricity is not delivered to the device,
wherein the plurality of slave controllers includes a relay slave controller, wherein the relay slave controller is selectively operative to control the relay,
wherein the relay slave controller is operative to wirelessly communicate with the master controller, wherein the master controller is operative to control the delivery or non-delivery of electrical power to the electrically powered device through the relay.

14. The apparatus according to claim 13
wherein the electrically powered device includes at least one of
a water heater,
a sump pump,
a water supply pump,
a well pump,
an ozone generator,
a water conditioner,
an ultraviolet light,
a grey water collection and reuse system, and
an irrigation system.

15. The apparatus according to claim 11
wherein the master controller includes a data store that includes calendar data stored therein, wherein the calendar data is representative of at least one of days, dates, times or a combination thereof,
wherein the master controller is configured to wirelessly control water flow from the at least one water conditioner to the conditioned water network connection responsive to a master controller determined current time and the calendar data.

16. Apparatus comprising:
a water conditioner, wherein the water conditioner is operative to at least one of soften, filter and oxidize contaminants in water that is passed therethrough,
wherein the water conditioner includes
a tank,
a valve, wherein the valve includes a plurality of flow passages and is in operative fluid connection with the tank,
a motor, wherein the motor is in operative connection with the valve, wherein the motor is enabled to control the valve to cause the water conditioner to be selectively placed in a plurality of operational conditions, including
  a service condition, wherein in the service condition untreated water is delivered through the valve and caused to pass through the tank, and water conditioned by having passed through the tank is delivered from the valve,
  at least one regeneration condition, wherein in the at least one regeneration condition, water is delivered through the valve and caused to pass through the tank in a manner that improves water conditioning operation, and after having passed through the tank is delivered from the valve, and
  a shutoff condition, wherein in the shutoff condition at least one of
    water is not passed through the valve to the tank and
    water from the tank is not delivered from the valve,
wherein the water conditioner further includes:
  a water conditioner slave controller, wherein the water conditioner slave controller is in operative connection with the motor,
    wherein the water conditioner slave controller is usable to change operational conditions of the water conditioner,
  a moisture sensor,
  a wireless transceiver in operative connection with the moisture sensor, wherein the transceiver is operative to wirelessly communicate sensor messages indicative of a moisture condition responsive at least in part to detection of moisture by the moisture sensor,
  a master controller, wherein the master controller is configurable to be operable to control a plurality of slave controllers, including the water conditioner slave controller,
    wherein the master controller includes a master wireless communication device that enables the master controller to wirelessly communicate messages with each of the plurality of slave controllers and with the wireless transceiver,
    wherein each slave controller includes a respective slave wireless communication device that enables the slave controller to wirelessly communicate messages with the master controller,
wherein the master controller is operative to
  determine a need for regeneration of the water conditioner,
  responsive at least in part to the determination, communicate at least one wireless water conditioner message to the water conditioner slave controller, wherein the water conditioner slave controller is operable to cause the water conditioner to change to at least one regeneration condition responsive at least in part to the at least one wireless water conditioner message,
  responsive at least in part to the sensor messages indicative of the moisture condition, communicate at least one further wireless water conditioner message to the water conditioner slave controller,
    wherein the water conditioner slave controller is operable responsive at least in part to the at least one further wireless water conditioner message to cause the water conditioner to be in the shutoff condition.

17. The apparatus according to claim 16
wherein master controller is further operative
responsive at least in part to the sensor messages indicative of the moisture condition, to cause at least one wireless notification message indicative of the moisture condition to be sent to a remotely located portable user device.

18. Apparatus comprising
a water conditioner, wherein the water conditioner is operative to at least one of soften, filter and oxidize contaminants in water that is passed therethrough,
wherein the water conditioner includes
  a tank,
  at least one valve, wherein the at least one valve includes a plurality of flow passages and is in operative fluid connection with the tank,
  at least one motor, wherein the at least one motor is in operative connection with the at least one valve,
wherein the at least one motor is enabled to control the at least one valve to cause the water conditioner to be selectively placed in a plurality of operational conditions, including
  a service condition, wherein in the service condition untreated water is delivered through the at least one valve and caused to pass through the tank, and water conditioned by having passed through the tank is delivered from the at least one valve to a water network connection,
  at least one regeneration condition, wherein in the at least one regeneration condition, water is delivered through the at least one valve and caused to pass through the tank in a manner that improves water conditioning operation, and after having passed through the tank is delivered from the valve, and
  a shutoff condition, wherein in the shutoff condition no water that has passed through the at least one valve is delivered to the water network connection,
wherein the water conditioner further includes:
  a water conditioner slave controller, wherein the water conditioner slave controller is in operative connection with the at least one motor,
    wherein the water conditioner slave controller is usable to change operational conditions of the water conditioner,
  a moisture sensor,
  a wireless transceiver in operative connection with the moisture sensor, wherein responsive at least in part to detection of moisture by the moisture sensor, the transceiver is operative to communicate at least one transceiver message,
  a master controller, wherein the master controller is configurable to be operable to control a plurality of slave controllers, including the water conditioner slave controller,
    wherein the master controller includes a master wireless communication device that enables the master controller to wirelessly communicate messages with each of the plurality of slave controllers and with the wireless transceiver,
    wherein each slave controller includes a respective slave wireless communication device that enables the slave controller to wirelessly communicate messages with the master controller,
  wherein the master controller is operable to
    communicate wireless messages with the water conditioner slave controller, wherein the water conditioner slave controller is operative responsive at least in part to the wireless messages to cause the water conditioner to be in at least one regeneration condition, responsive at least in part to the at least one transceiver message, to communicate at least one wireless message indicative of detection of moisture to a remotely located portable wireless device.

19. The apparatus according to claim 18 wherein the master controller is further operable
responsive at least in part to the transceiver messages, to communicate at least one further wireless message to the water conditioner slave controller, wherein the water conditioner slave controller, responsive at least in part to the at least one further wireless message, is operative to cause the water conditioner to be in the shutoff condition.

20. The apparatus according to claim 18 wherein the master controller is further operable
to receive at least one portable device wireless message from the portable wireless device,
responsive at least in part to the at least one portable wireless device message, communicate at least one further wireless message to the water conditioner slave controller, wherein the water conditioner slave controller, responsive at least in part to the at least one further wireless message, is operative to cause the water conditioner to be in the shutoff condition.

* * * * *